US006809790B2

United States Patent
Yamagishi et al.

(10) Patent No.: US 6,809,790 B2
(45) Date of Patent: Oct. 26, 2004

(54) MATRIX SUBSTRATE, LIQUID CRYSTAL DISPLAY DEVICE USING IT, AND METHOD FOR PRODUCING THE MATRIX SUBSTRATE

(75) Inventors: Koichi Yamagishi, Kanagawa-ken (JP); Katsumi Kurematsu, Kanagawa-ken (JP); Osamu Koyama, Tokyo (JP); Toru Nakazawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/142,846

(22) Filed: May 13, 2002

(65) Prior Publication Data

US 2002/0126233 A1 Sep. 12, 2002

Related U.S. Application Data

(62) Division of application No. 09/176,276, filed on Oct. 21, 1998, now Pat. No. 6,512,566.

(30) Foreign Application Priority Data

Oct. 24, 1997 (JP) ............................................. 9/292468
Oct. 27, 1997 (JP) ............................................. 9/294467

(51) Int. Cl.[7] ..................... G02F 1/1343; G02F 1/1333; G02F 1/1335; H01L 29/00
(52) U.S. Cl. ........................ 349/139; 349/158; 349/146; 257/549
(58) Field of Search ................................ 349/139, 158, 349/5, 95, 146, 113, 42; 257/549; 430/30

(56) References Cited

U.S. PATENT DOCUMENTS

| 4,936,656 A | * | 6/1990 | Ymashita et al. ............ 350/333 |
| 5,459,592 A | | 10/1995 | Shibatani et al. ............. 359/40 |
| 5,592,318 A | | 1/1997 | Majima et al. ............. 349/122 |
| 5,756,372 A | | 5/1998 | Wakui et al. .................. 438/30 |
| 5,760,850 A | | 6/1998 | Nakanishi et al. ............. 349/5 |
| 5,764,318 A | | 6/1998 | Kurematsu et al. ............. 349/5 |
| 5,933,204 A | * | 8/1999 | Fukumoto ..................... 349/43 |
| 5,978,056 A | * | 11/1999 | Shintani et al. ............. 349/137 |
| 6,014,232 A | | 1/2000 | Clarke ......................... 358/482 |
| 6,045,228 A | * | 4/2000 | Kuramochi et al. .......... 353/20 |
| 6,064,460 A | | 5/2000 | Ohta et al. .................. 349/141 |
| 6,157,430 A | | 12/2000 | Kubota et al. ............. 349/147 |
| 6,163,349 A | | 12/2000 | Nakanishi et al. ............. 349/5 |
| 6,281,867 B2 | * | 8/2001 | Kurematsu et al. ........... 345/88 |

FOREIGN PATENT DOCUMENTS

JP 9-73103 * 3/1997

* cited by examiner

Primary Examiner—Tarifur R. Chowdhury
Assistant Examiner—Mike Qi
(74) Attorney, Agent, or Firm—Fitzpatrick, Cella, Harper & Scinto

(57) ABSTRACT

A matrix substrate having, on a substrate, a plurality of electroconductive members to constitute pixel electrodes arrayed in a matrix pattern, and an electrically insulating member comprising a projecting region disposed between the electroconductive members to separate the pixel electrodes from each other, wherein a metal material having a higher melting point than that of the electroconductive members is placed at the base of the projecting region.

21 Claims, 40 Drawing Sheets

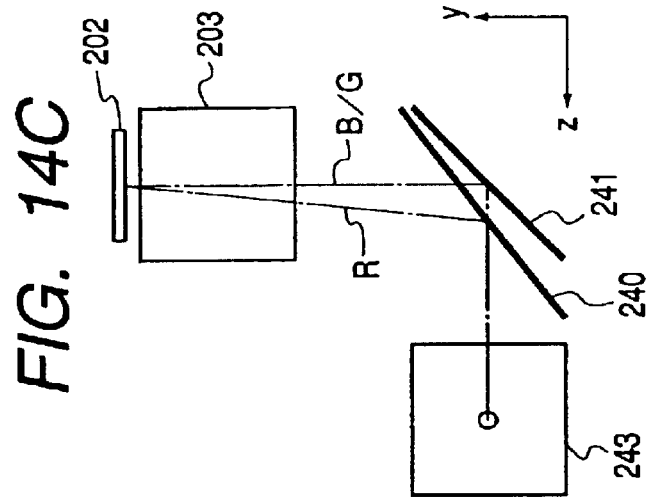
FIG. 14C
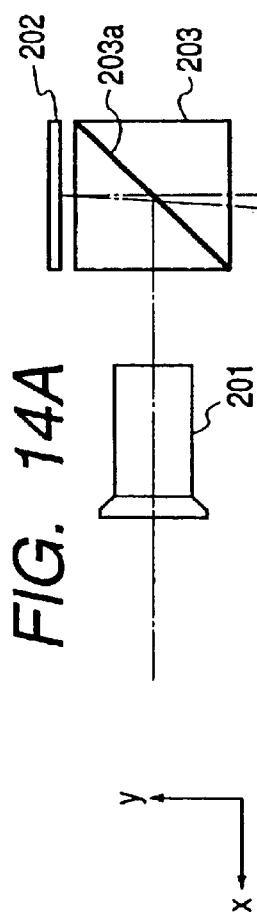
FIG. 14A
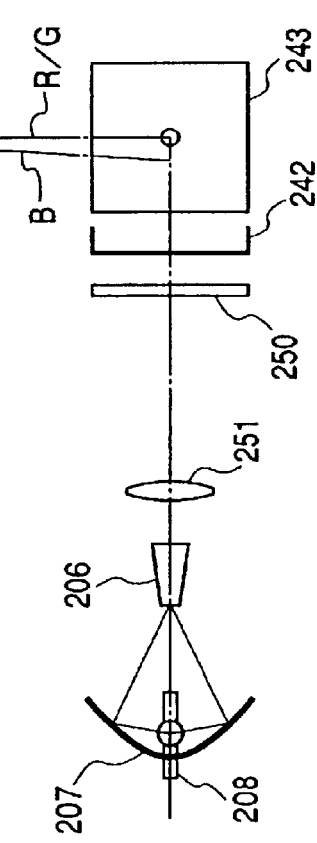
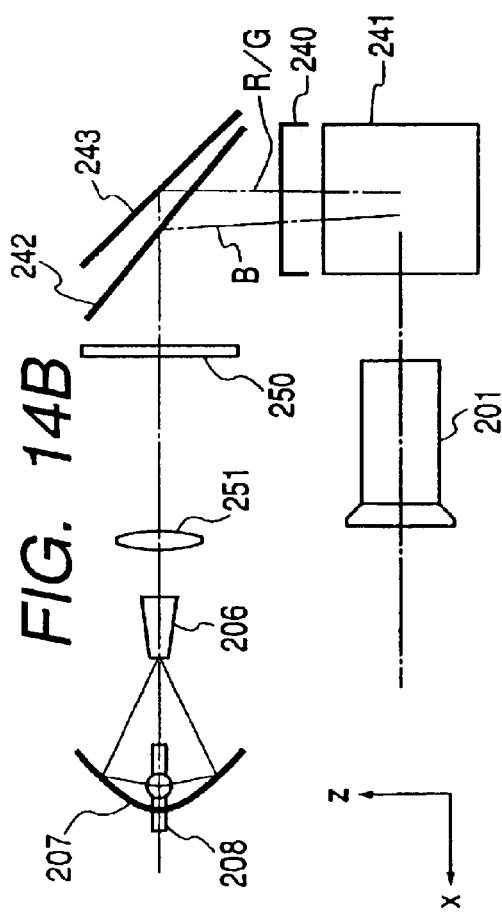
FIG. 14B

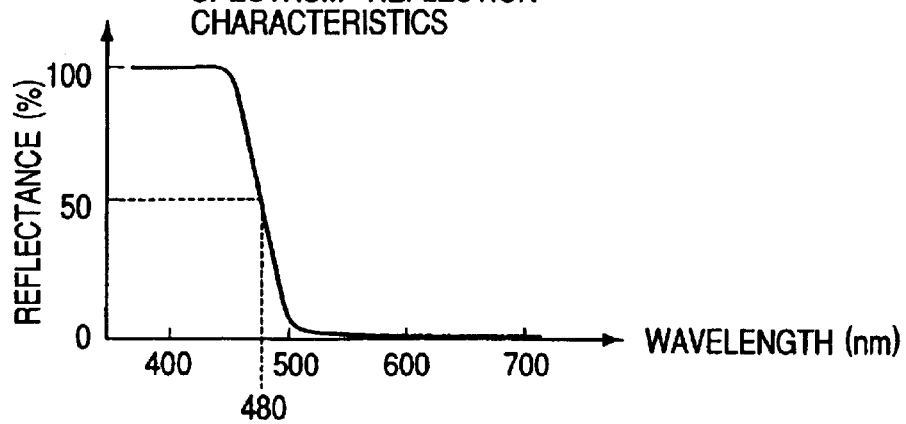
FIG. 15A  242 : B REFLECTION DICHROIC MIRROR SPECTRUM REFLECTION CHARACTERISTICS
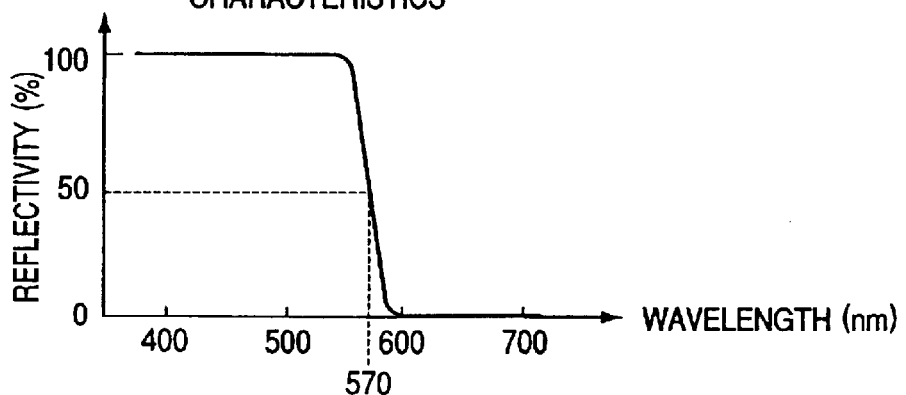
FIG. 15B  241 : B/G REFLECTION DICHROIC MIRROR SPECTRUM REFLECTION CHARACTERISTICS
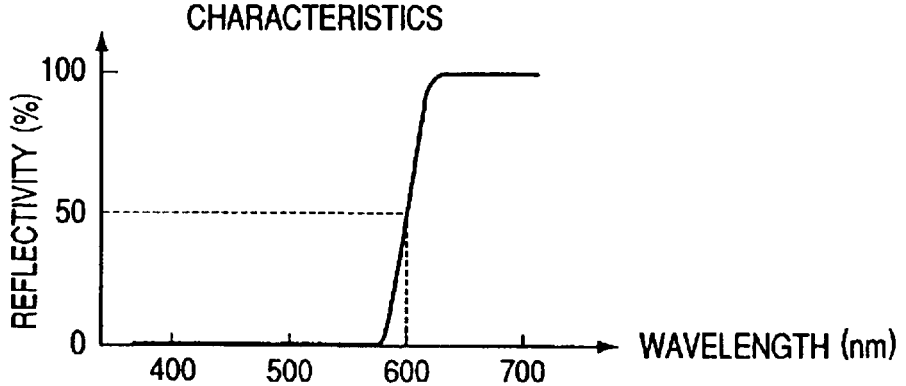
FIG. 15C  240 : R REFLECTION DICHROIC MIRROR SPECTRUM REFLECTION CHARACTERISTICS

RGB MIXED ARBITRARY COLOR 18-1 : P-SiO LAYER
18-2 : SOG LAYER

DISCONTINUITY SURFACE = LEAK PATH

MATRIX SUBSTRATE, LIQUID CRYSTAL DISPLAY DEVICE USING IT, AND METHOD FOR PRODUCING THE MATRIX SUBSTRATE

This is a division of application Ser. No. 09/176,276 filed Oct. 21, 1998 now U.S. Pat. No. 6,512,566.

BACKGROUND OF THE INVENTION

1. Field of the Invention

The present invention relates to a matrix substrate, a liquid crystal device using the substrate, and a method for producing the matrix substrate.

2. Related Background Art

The world of today is a multimedia world, and equipment for communication by image information is becoming more and more important. Among others, the liquid crystal display devices are drawing attention because of their slimness and low power consumption. The liquid crystal display industry has grown to be a basic industry comparable to the semiconductor industry. Liquid crystal display devices are mainly used for 10-inch notebook-size personal computers at present. It is expected that liquid crystal display devices of larger screen sizes will be used not only for personal computers, but also for workstations and televisions for home use in the future. With an increase in screen size, however, manufacturing equipment becomes expensive, and, in addition, electrically exacting characteristics are demanded for driving of such large screens. The manufacturing cost will thus increase abruptly in proportion to the square to cube of the size with increasing screen size.

Recently, attention has been drawn to a projection method for preparing a compact liquid crystal display panel and optically enlarging a liquid crystal image to display an enlarged image. This is because the microstructure tendency of semiconductors permits decrease in size, improvement in the characteristics, and decrease in the cost, similar to the scaling rule to improve performance and cost. From these aspects, in the case of the liquid crystal display panel of the TFT type, TFTs have to be compact and have sufficient driving force, and transition is now occurring from TFTs using amorphous Si to those using polycrystal Si. Video signals of the resolution level conforming to the NTSC system, etc. used in ordinary televisions do not require so quick processing.

This allows not only the TFTs but also peripheral driving circuits such as shift registers or decoders to be made of polycrystal Si, whereby liquid crystal display devices can be constructed in a monolithic structure of a display region and a peripheral driving circuit region. Polycrystal Si is inferior to single crystal Si, however. For realizing high definition televisions having a higher resolution level than the NTSC system or display of the XGA (eXtended Graphics Array) or SXGA (Super eXtended Graphics Array) class in resolution standards for computers by polycrystal Si, a shift register needs to be composed of a plurality of segments. In this case, noise, called ghost, appears in the display region at portions corresponding to borders between the segments. A solution to this problem is desired in this field.

On the other hand, focus is also drawn to display devices using a single crystal Si substrate, which can realize extremely high driving force as compared to display devices of the monolithic structure of polycrystal Si. In this case, the transistors of the peripheral driving circuitry have sufficient driving force, and thus the divisional driving described above is not necessary. This solves the problem of the noise and the like.

Even with either of these polycrystal Si and single crystal Si, a reflection-type liquid crystal device can be provided in such a structure that a reflection-type liquid crystal element is formed by connecting the drain of each TFT to a reflective electrode and interposing the liquid crystal between the reflective electrodes and a transparent common electrode and that horizontal and vertical shift registers for scanning of the liquid crystal element are formed on the same semiconductor substrate. The applicant of the present application filed Japanese Laid-Open Patent Application No. 9-73103 to disclose the reflection-type liquid crystal device using a substrate of polycrystal Si or single crystal Si. The invention disclosed in the application solves the following problems: when light is incident to a pixel electrode, the incident light is scattered in all directions by unevenness of the surface, and reflection efficiency of light thus becomes very small; and this unevenness of surface becomes the cause of alignment failure in a rubbing step of the alignment layer in a liquid crystal packaging process, and this results in causing alignment failure of the liquid crystal, so as to degrade the display image due to lowering of contrast.

In the Japanese Laid-Open Patent Application No. 9-73103, the pixel electrode surface is polished by chemical mechanical polishing (hereinafter referred to as "CMP"). This smooths the pixel electrode surface like a mirror-finished surface and makes the whole pixel electrode surface be in a common plane. This prevents the irregular reflection and alignment failure caused by the unevenness and thus permits display of an image with high quality.

A method for producing an active matrix substrate, disclosed in the Japanese Laid-Open Patent Application No. 9-73103, will be described referring to FIGS. 39A to 39E and FIGS. 40F to 40H. FIGS. 39A to 39E and FIGS. 40F to 40H show a pixel section and, at the same time as a step of forming the pixel section, the peripheral driving circuits such as the shift registers for driving the switching transistors in the pixel section can also be made on the same substrate.

An n-type silicon semiconductor substrate 201 with an impurity concentration of not more than $10^{15}$ cm$^{-3}$ is locally thermally oxidized to form LOCOS 202, and, with the LOCOS 202 as a mask, ions of boron are implanted in a dose of about $10^{12}$ cm$^{-2}$ to form PWL 203, which represents p-type impurity regions with an impurity concentration of about $10^{16}$ cm$^{-3}$. This substrate 201 is again thermally oxidized to form gate oxide film 204 having an oxide film thickness of not more than 1000 Å (FIG. 39A).

Gate electrodes 205 made of n-type polysilicon doped with phosphorus of about $10^{20}$ cm$^{-3}$ are formed, and thereafter ions of phosphorus are implanted in a dose of about $10^{12}$ cm$^{-2}$ over the entire surface of substrate 201 to form NLD 206, which represents n-type impurity regions having an impurity concentration of about $10^{16}$ cm$^{-3}$. Subsequently, using a patterned photoresist as a mask, ions of phosphorus are implanted in the dose of about $10^{15}$ cm$^{-2}$ to form source and drain regions 207, 207' having an impurity concentration of about $10^{19}$ cm$^{-3}$ (FIG. 39B).

PSG 208, which is an interlayer film, is formed over the entire surface of substrate 201. This PSG 208 can be replaced by NSG (Nondoped Silicate Glass)/BPSG (Boro-Phospho-Silicate Glass) or TEOS (Tetraethoxy-Silane). The PSG 208 is patterned to form contact holes immediately above the source and drain regions 207, 207', Al is evaporated by sputtering, and thereafter the Al layer is patterned to form Al electrodes 209 (FIG. 39C). In order to improve ohmic contact characteristics of the Al electrodes 209 with the source and drain regions 207, 207', a barrier metal such as Ti/TiN is desirably placed between the Al electrodes 209 and the source/drain regions 207, 207'.

Plasma SiN 210 is deposited in a thickness of about 3000 Å over the entire surface of substrate 201, and then PSG 211 is deposited in a thickness of about 10000 Å thereon (FIG. 39D).

Using the plasma SiN 210 as a dry etching stopper layer, the PSG 211 is patterned so as to leave only separating regions between pixels, and thereafter the plasma SiN 210 is patterned by dry etching to form through holes 212 immediately above the Al electrodes 209 in contact with the drain regions 207' (FIG. 39E).

Then a pixel electrode layer 213 is deposited in a thickness of not less than 10000 Å on the substrate 201 by sputtering or EB (Electron Beam) evaporation (FIG. 40F). This pixel electrode layer 213 is a metal film of Al, Ti, Ta, W, or the like, or a compound film of these metals.

The surface of the pixel electrode layer 213 is then polished by CMP (FIG. 40G).

An alignment layer 215 is further formed on the surface of the active matrix substrate formed by the above steps, and the surface thereof is subjected to an alignment process such as a rubbing process. The substrate is bonded through a spacer (not illustrated) to an opposite substrate, and then liquid crystal 214 is injected into the gap between them to complete a liquid crystal clement (FIG. 40H). In this case, the opposite substrate is composed of a color filter 221, a black matrix 222, a common electrode 223 of ITO or the like, and an alignment layer 215' on a transparent substrate 220.

A driving method of this reflection-type liquid crystal element is as follows. By the peripheral circuits such as the shift registers formed in an on-chip fashion on the substrate 201, a signal potential is applied to a source region 207 and, at the same time, a gate potential is applied to the associated gate electrode 205 to switch the switching transistor of that pixel on, thereby supplying signal charge to the drain electrode 207'. The signal charge is accumulated in a capacitor of the depletion layer of the pn junction created between the drain region 207' and the PWL 203 to give a potential through the Al electrode 209 to the pixel electrode 213. When the potential of the pixel electrode 213 reaches a desired value, the potential applied to the gate electrode 205 is switched off to turn the pixel switching transistor off. Since the signal charge is accumulated in the pn junction capacitor part described above, the potential of the pixel electrode 213 is fixed before the pixel switching transistor is next driven. This fixed potential of the pixel electrode 213 drives the liquid crystal 214 encapsulated between the substrate 201 and the opposite substrate 220 illustrated in FIG. 40H.

In the reflection type liquid crystal display device described above, the surface of the pixel electrode 213 is smooth, and the insulating layer is filled in the gap between adjacent pixel electrodes; therefore, the surface of the alignment layer 215 formed thereon is also smooth without unevenness. This prevents the decrease of light utilization efficiency due to scattering of incident light, the decrease of contrast due to inappropriate rubbing, and occurrence of bright lines due to a horizontal electric field raised by a level difference between the pixel electrodes. Therefore, the quality of a display image is improved.

The liquid crystal display device has excellent characteristics as described above, but studies by the present inventors have shown that the device is still susceptible to further improvement.

Specifically, the formation of the pixel electrode layer 213 is carried out by deposition of the electrode material at a high temperature and further thermal treatment so as to sufficiently densely pack the electrode material in recessed portions, which raises a possibility that residue or gas or the like will evolve and heat brings about reaction thereof.

The heat could bring about reaction between the pixel electrodes and the base layer thereof at the corners of the bottom of the pixel electrodes (or at the base of the insulating separation regions between the pixel electrodes) in some cases. Particularly, in the case where there are the pixel electrodes and a shielding layer or an electroconductive layer for formation of a capacitor placed through an insulating layer below the pixel electrodes, there is a possibility that the state of the insulating layer becomes imperfect at the base of the separation regions between the pixel electrodes, whereby the pixel electrodes react with the electroconductive layer or whereby leak current flows between them.

This will be described in more detail referring to FIG. 41 and FIG. 42.

FIG. 41 is a sectional view of a reflection-type liquid crystal display device, which is similar to that illustrated in FIG. 40H, but which clearly shows the shielding layer 7 provided in the matrix substrate 410. In FIG. 41, the liquid crystal display device is constructed in a structure in which the liquid crystal layer 14 is interposed between the matrix substrate 410 and the opposite substrate 420. The opposite substrate 420 is constructed of a common electrode 15 and an anti-reflection film 20 provided on a transparent substrate 16.

In the matrix substrate 410, numeral 10 represents the source electrode of each transistor being a switching device of pixel electrode 12, and numeral 11 represents the drain electrode connected to the pixel electrode 12. Numeral 7 indicates the shielding film made of an electroconductive metal material. The shielding film 7 is separated from the pixel electrodes 12 by insulating film 21. Numeral 9 designates an electrically insulating member for separating the pixel electrodes from each other.

In the liquid crystal panel illustrated in FIG. 41, the pixel electrode 12 and shielding film 7 compose a capacitor through the insulating film 21, which works as a storage capacitor during application of an electric field to the liquid crystal.

FIG. 42 is an enlarged view of the part near the insulating member 9 for separation of the pixel electrodes in FIG. 41.

As illustrated in FIG. 42, a discontinuity surface is likely to be formed at the root part of the insulating member 9 during deposition of the insulating film 21 because of the nearly vertical configuration of the insulating member 9. This increases the possibility that dielectric breakdown may occur with this discontinuity surface as a leak path at a lower voltage than the withstand voltage against dielectric breakdown of the insulating film 21.

Since the separation region part 9 between the pixel electrodes 12 also serves as a stopper on the occasion of CMP or the like, it needs to have some mechanical strength, and there are some cases where further increase of the mechanical strength is demanded of the separation region part between the pixel electrodes in view of the tendency toward higher density and the like.

SUMMARY OF THE INVENTION

The present invention has been accomplished in view of the above aspects.

An object of the present invention is to provide a matrix substrate having, on a substrate, a plurality of electroconductive members to constitute pixel electrodes arrayed in a matrix pattern and an electrically insulating member comprising a projecting region disposed between the electroconductive members to separate the pixel electrodes from each other, wherein a metal material having a higher melting point than that of said electroconductive members is placed at the base of said projecting region.

Another object of the present invention is to provide a matrix substrate having, on a substrate, a plurality of electroconductive members to constitute pixel electrodes arrayed in a matrix pattern, an electrically insulating member disposed between the electroconductive members to separate the pixel electrodes from each other, and an electroconductive film disposed through an electrically insulating film with respect to said electroconductive members and forming a capacitor with said electroconductive members, wherein another electrically insulating film is placed between said insulating member and said electroconductive film and between said insulating film and said electroconductive film.

Still another object of the present invention is to provide a liquid crystal display device constructed in such a structure that a liquid crystal material is placed between a matrix substrate, said matrix substrate having, on a substrate, a plurality of electroconductive members to constitute pixel electrodes arrayed in a matrix pattern, and an electrically insulating member comprising a projecting region disposed between the electroconductive members to separate the pixel electrodes from each other, and an opposite substrate having an opposite electrode opposed to said pixel electrodes, wherein a metal material having a higher melting point than that of said electroconductive members is placed at the base of said projecting region.

Still another object of the present invention is to provide a liquid crystal display device constructed in such a structure that a liquid crystal material is placed between a matrix substrate, said matrix substrate having, on a substrate, a plurality of electroconductive members to constitute pixel electrodes arrayed in a matrix pattern, an electrically insulating member disposed between the electroconductive members to separate the pixel electrodes from each other, an electroconductive film disposed through an electrically insulating film with respect to said electroconductive members and forming a capacitor with said electroconductive members, and an opposite substrate having an opposite electrode opposed to said pixel electrodes, wherein another electrically insulating film is placed between said insulating member and said electroconductive film and between said insulating film and said electroconductive film.

Still another object of the present invention is to provide a method for producing a matrix substrate, the method comprising a step of forming a matrix pattern of apertures in portions corresponding to pixel electrode forming portions in an electrically insulating layer on a substrate, a step of depositing a metal layer having a higher melting point than that of a material for forming pixel electrodes and thereafter removing the higher melting point metal layer by etching so as to leave corners thereof at the bottom of the apertures, a step of depositing an electroconductive material for forming the pixel electrodes, and a step of flattening the electroconductive material so as to expose a surface of the insulating layer between said pixel electrode forming portions, thereby forming the pixel electrodes separated from each other by the insulating layer.

The present invention increases the mechanical strength of the separation regions between the pixel electrodes, suppresses the reaction with the base layer when thermally treated, and increases heat resistance.

The present invention improves the dielectric withstand voltage of the capacitor film provided on the substrate and thus decreases the capacitor leak. This makes reduction of cost possible.

BRIEF DESCRIPTION OF THE DRAWINGS

FIGS. 14A, 14B and 14C are drawings illustrating the whole of an optical system of a projection-type liquid crystal display device which makes use of the present invention;

FIGS. 15A, 15B and 15C are diagrams showing the spectral reflection characteristics of dichroic mirrors used in the optical system of the projection-type liquid crystal display device which makes use of the present invention;

DETAILED DESCRIPTION OF THE PREFERRED EMBODIMENTS

Embodiments of the present invention will be described in detail by reference to the drawings.

First Embodiment

An active matrix substrate will be described as a first example of the present invention.

Figure 1A:
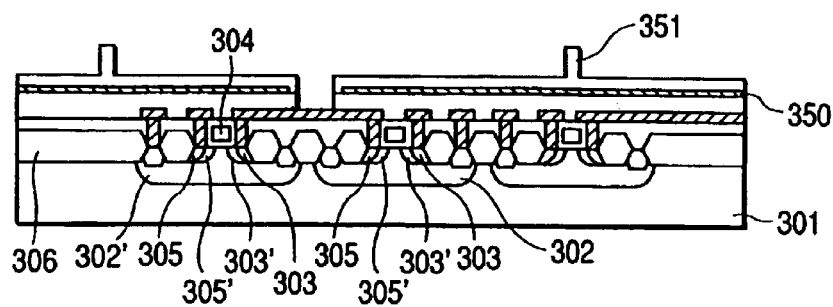
FIGS. 1A, 1B, 1C, 1D and 1E are drawings explaining exemplary steps for producing an active matrix substrate used in a liquid crystal device in a first embodiment of the present invention.
Figure 1B:
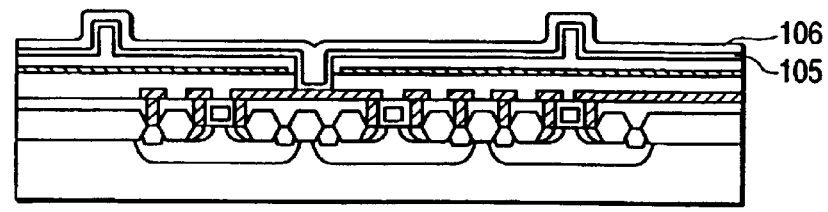
Figure 1C:
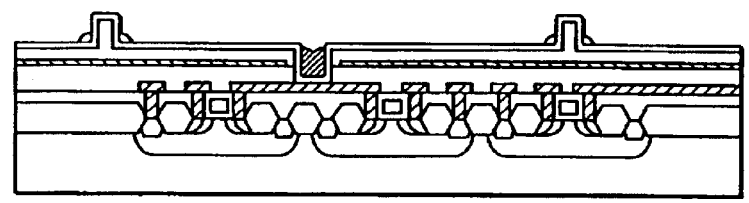
Figure 1D:
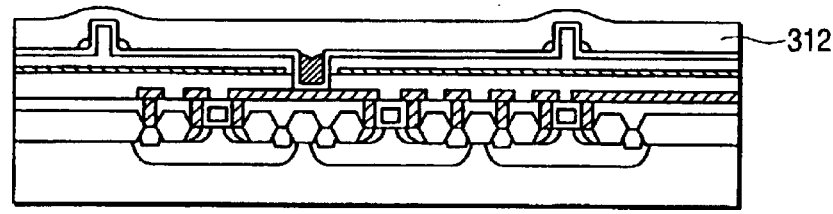
Figure 1E:
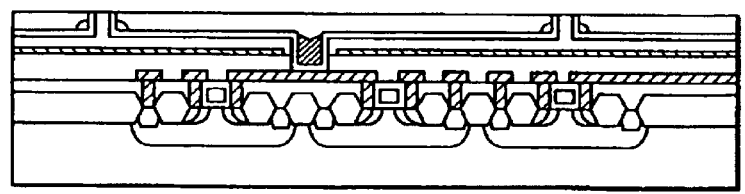

The production steps of this liquid crystal display device will be described referring to FIGS. 1A to 1E. First, a p-type silicon semiconductor substrate 301 is oxidized to form SiN partially on the surface. Using this as a mask, ions of phosphorus are implanted in a dose of about $10^{12}$ cm$^{-2}$ to form NWL 302', which represents n-type impurity regions. Then, the SiN film is peeled off, and thermal oxidation is effected to form a LOCOS (Local Oxidation of Silicon) oxide film 306. Using this LOCOS oxide film 306 as a mask, ions of boron are implanted in a dose of about $10^{12}$ cm$^{-2}$ to form PWL 302, which represents p-type impurity regions. This substrate 301 is again thermally oxidized to form a gate oxide film having an oxide film thickness of no more than 1000 Å. Ions of boron are implanted in a dose of about $10^{11}$ cm$^{-2}$ over the entire surface of the substrate 301 for adjusting the threshold of the device. Then, gate electrodes 304 of polysilicon are formed, and thereafter ions of phosphorus are implanted in a dose of about $10^{13}$ cm$^{-2}$ over the entire surface of the substrate 301 to form regions 303', 305', which are n-type impurity regions. Subsequently, using a patterned photoresist as a mask, ions of phosphorus are implanted in a dose of about $10^{15}$ cm$^{-2}$ to form source and drain regions 303, 305. Ions of boron are then implanted in a dose of about $10^{12}$ cm$^{-2}$ over the entire surface of the substrate 301 to form regions 303', 305', which are p-type impurity regions. Subsequently, using a patterned photoresist as a mask, ions of boron are implanted in a dose of about $10^{15}$ cm$^{-2}$ to form source and drain regions 303, 305. BPSG being an interlayer film is formed over the entire surface of the substrate 301. Contact holes are formed by patterning immediately above the source and drain regions 303, 305, Al is evaporated by sputtering, and then the Al film is patterned to form Al electrodes. Over the entire surface of the substrate 301, a plasma SiO film is deposited in a thickness of about 5000 Å, then an SOG film in a thickness of about 4000 Å, and a plasma SiO film is further deposited in a thickness of about 4000 Å over the entire surface of the substrate 301. A Ti film 350 is deposited over the entire surface of the substrate 301, and regions thereof except for a patterned photoresist part are subjected to dry etching. Then, a plasma SiO film is deposited over the entire surface of the substrate 301. Then, the film is patterned so as to leave only the separation regions between the pixels, and thereafter a plasma SiN film 351 is deposited over the entire surface of the substrate 301. This SiN film 351 composes an electrically insulating member including a projecting region for separating the pixel electrodes from each other. Then, a pattern of through holes are formed by dry etching immediately above the Al electrodes in contact with the drain regions (FIG. 1A). TiN 105 is then deposited over the entire surface of the substrate 301. Then, tungsten 106 is deposited over the entire surface of the substrate 301 by plasma enhanced CVD using the raw material of WF$_6$ (FIG. 1B). Then, the entire surface of the substrate 301 is etched by parallel plate plasma etching with SF$_6$/Ar mixed gases (FIG. 1C). Then, a pixel electrode layer 312 is deposited over the entire surface of the substrate 301 (FIG. 1D). Then, the surface of the pixel electrode layer 312 is polished by chemical mechanical polishing (CMP) to be in the same plane as the top of the separation regions between the pixels (FIG. 1E). The etch selectivity of tungsten to TiN is high in this structure; however, it is difficult for etching ions to reach the base of the separation regions between the pixels, so some tungsten remains there. This increases the mechanical strength at the base of the separation regions between the pixels. In addition, since tungsten has a higher melting point than that of the aluminum layer forming the pixel electrodes, or than that of an aluminum alloy layer, reaction thereof with the base layer is suppressed when thermally treated. The heat resistance is thus increased. Particularly, it is harder to form the plasma SiN film at the base part of the separation regions between the pixels, so that the film may become thinner at the base part than in the other portion. As a result, the pixel electrodes may react with the base layer there in certain cases. It is more effective in such cases to form the tungsten region at the base of the separation regions between the pixels.

Unevenness is eliminated from the surface of the pixel electrode layer 312, so as to prevent the decrease of light utilization efficiency due to the scattering of incident light, which used to be caused by the unevenness. Therefore, the quality of display image is improved.

The present example showed a silicon nitride film as the electrically insulating member including the projecting region for separating the pixel electrodes from each other, but this electrically insulating member can be selected from electrically insulating films such as a silicon oxide film, PSG (Phospho Silicate Glass), BPSG (Boron-Phospho-Silicate Glass), an insulating film using TEOS (TetraethoxySilane), an SiON film, and a tantalum oxide film, in addition to the silicon nitride film stated herein. Among others, the insulating films containing Si atoms are more advantageous, because they can be formed relatively easily by use of the ordinary semiconductor processes.

In the present invention, the pixel electrodes can be made, for example, of a material containing a principal component which is Al, AlSi, AlSiCu, AlGeCu, AlC, Cr, Au, or Ag.

In the present invention, high melting point metals applicable are metals having higher melting points than that of the material used for the pixel electrodes. For example, when aluminum is employed for the pixel electrodes, a high melting point metal can be selected from materials whose principal component is titanium, vanadium, chromium, manganese, iron, cobalt, nickel, copper, zirconium, niobium, molybdenum, palladium, silver, hafnium, tantalum, tungsten, platinum, or gold, alloys using these metals, and so on. In practice, it is preferred to employ a material which is capable of being formed by vapor phase growth such as sputtering, evaporation, or CVD and which is easy to process in view of efficiency of formation. Such materials include titanium, tungsten, platinum, gold, titanium nitride, materials whose principal component is one of these, and so on.

Second Embodiment

Figure 2A:
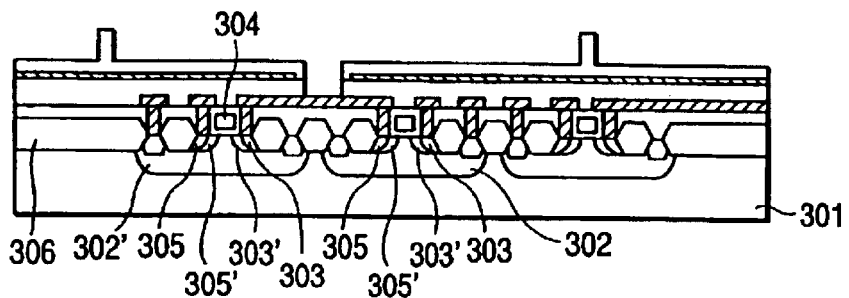
FIGS. 2A, 2B, 2C, 2D and 2E are drawings explaining exemplary steps for producing an active matrix substrate used in a liquid crystal device in a second embodiment of the present invention.
Figure 2B:
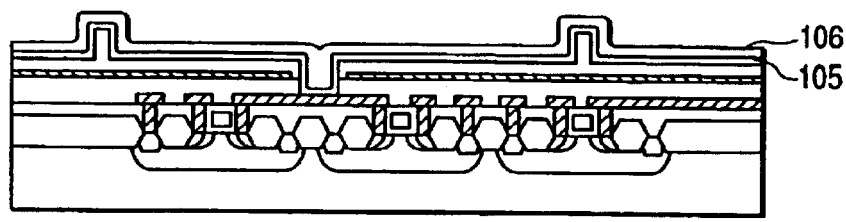

Described herein along FIGS. 2A to 2E are production steps for producing an active matrix substrate of a reflection-type liquid crystal display device different from Embodiment 1. In the same manner as in Embodiment 1, the gate electrodes 304, BPSG, and Al electrodes are formed on the substrate 301, and the interlayer films are deposited. Thereafter, a Ti film is deposited and a pattern of through holes is formed by dry etching immediately above the Al electrodes in contact with the drain regions (FIG. 2A). TiN 105 is deposited over the entire surface of the substrate 301, and tungsten 106 is deposited over the entire surface of the substrate 301 by plasma enhanced CVD using the raw material of $WF_6$ (FIG. 2H). At this time, the TiN 105 deposited is a Ti-rich composition which lowers the etch selectivity of TiN to tungsten. FIG. 3 shows the relationship between percentage of flow rate of $N_2$ and etching rate.

Figure 2C:
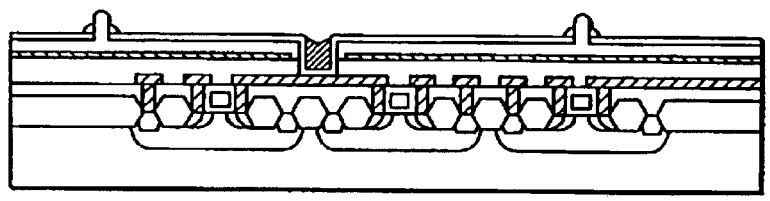
Figure 2D:
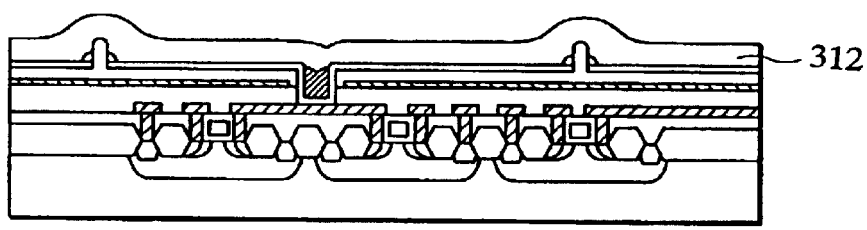
Figure 2E:
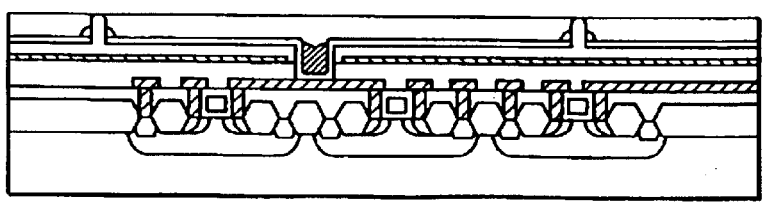
Figure 3:
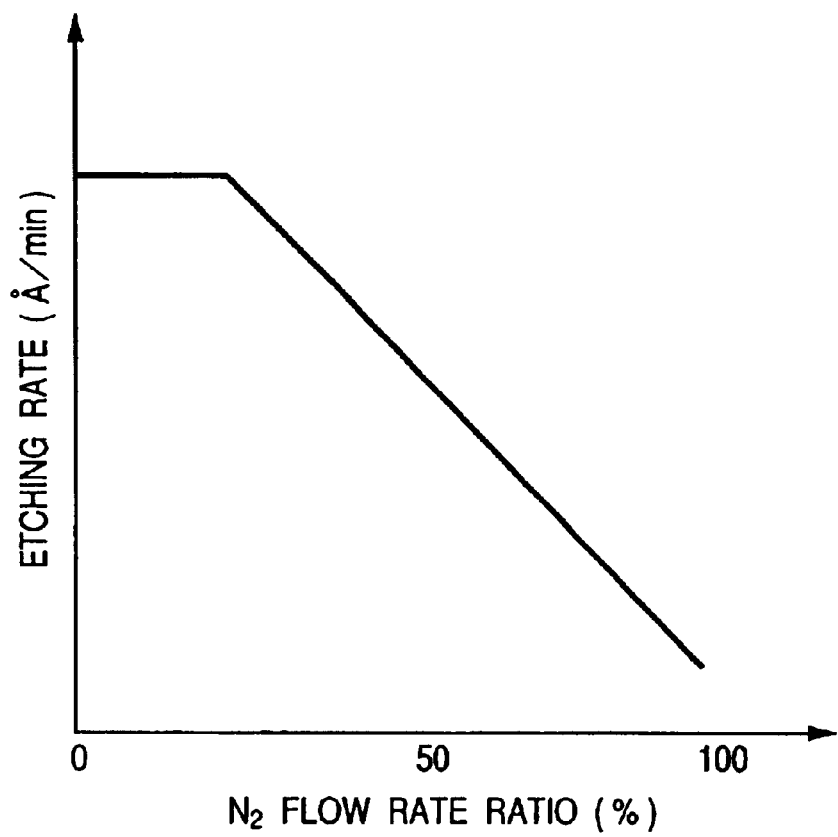
FIG. 3 is a diagram illustrating the relation between flow rate of $N_2$ and etching rate in the second embodiment of the present invention.
Figure 6A:
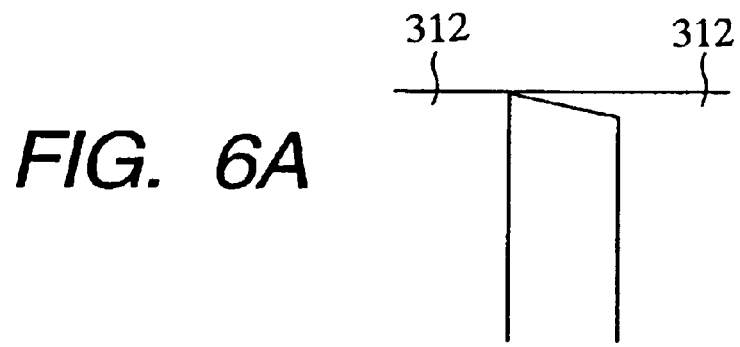
FIGS. 6A, 6B and 6C are drawings illustrating the action of the substrate for display device according to the present invention.
Figure 6B:
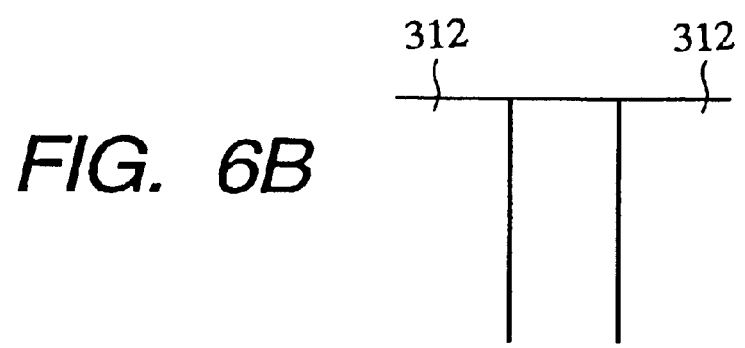
Figure 6C:
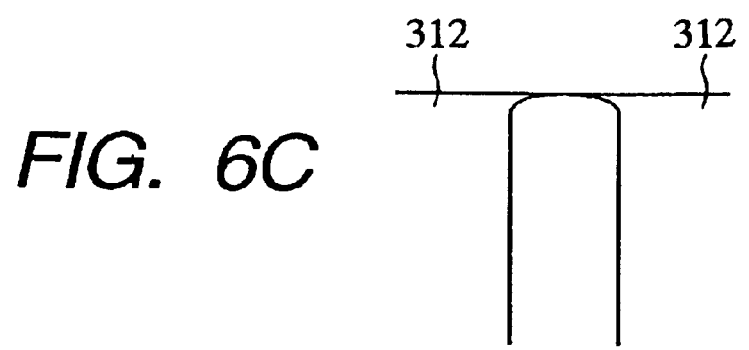

Then, the entire surface of the substrate 301 is etched by parallel plate plasma etching with $SF_6$/Ar mixed gases (FIG. 2C). Then, the pixel electrode layer 312 is deposited over the entire surface of the substrate 301 (FIG. 2D). Then, the surface of the pixel electrode layer 312 is polished by chemical mechanical polishing (CMP) to be in the same plane as the top of the separation regions between the pixels (FIG. 2E). The etch selectivity of tungsten to TiN is high in this structure, but it is even harder for the etching ions to reach the base of the separation regions between the pixels, so tungsten remains there. Further, because the TiN film of the lower etch selectivity is deposited, sputtering of Ar ions occurs more at the corner of the top part of the separation regions between the pixels, and thus the separation regions are formed in a shape in which the corner of the top part is removed. This shape reduces loads on CMP. For example, when the top part of the separation regions is not flat, as illustrated in FIG. 6A, it is necessary to carry on the CMP before almost the whole of the top part of the separation regions is exposed, as illustrated in FIG. 6B, so as to separate the pixel electrodes from each other. In contrast, in the case of the shape without the corner of the top part of the separation regions as in the present embodiment, separation of the pixel electrodes can be achieved almost at the time when the top part of the separation region is exposed as illustrated in FIG. 6C.

Further, the reflective regions of the pixel electrodes are increased, thereby increasing reflectance. The mechanical strength is increased at the base of the separation regions between the pixels, and the reaction with the base layer is suppressed, for example, when thermally treating, thereby increasing the heat resistance. Unevenness is eliminated from the surface of the pixel electrodes 312 and the decrease of light utilization efficiency due to the scattering of incident light, which used to be caused by the unevenness, is, prevented, thereby improving the quality of display image.

Third Embodiment

Figure 4A:
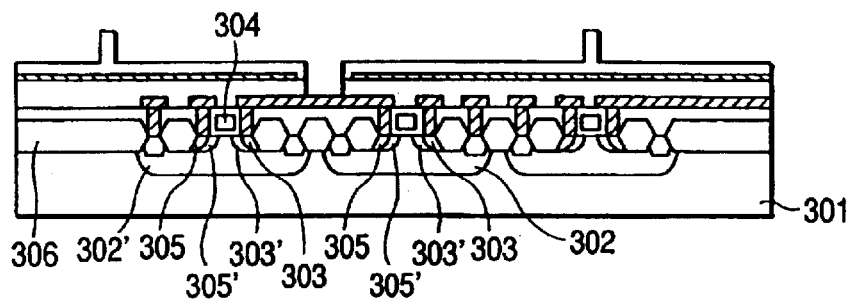
FIGS. 4A, 4B, 4C, 4D and 4E are drawings explaining exemplary steps for producing an active matrix substrate used in a liquid crystal device in a third embodiment of the present invention.
Figure 4B:
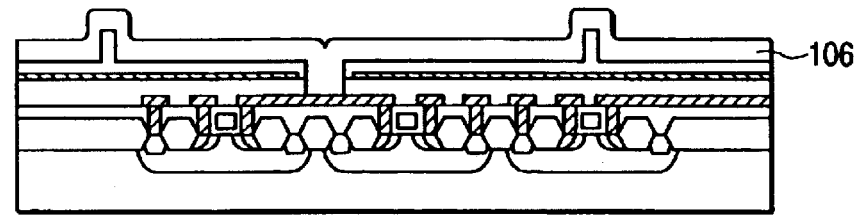
Figure 4C:
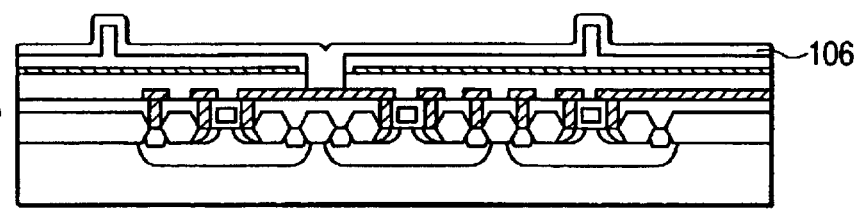
Figure 4D:
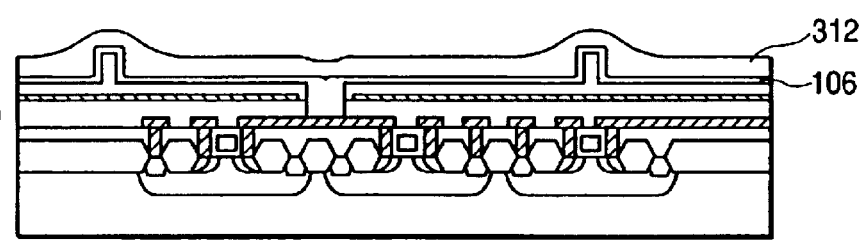
Figure 4E:
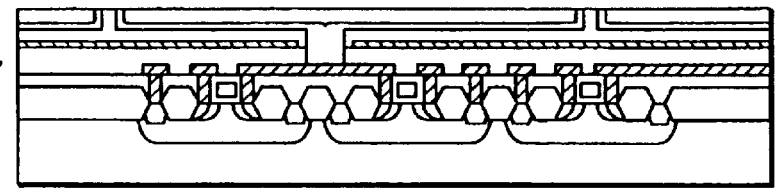

Described herein along FIGS. 4A to 4E are production steps of an active matrix substrate of a reflection-type liquid crystal display device different from Embodiments 1 and 2. In the same manner as in Embodiments 1 and 2, the gate electrodes 304, BPSG, and Al electrodes are formed on the substrate 301, and the interlayer films are deposited. Thereafter, a Ti film is deposited and is patterned by dry etching to form through holes immediately above the Al electrodes in contact with the drain regions (FIG. 4A). Then, TiN 105 is deposited over the entire surface of the substrate 301, and tungsten 106 is deposited over the entire surface of the substrate 301 by plasma enhanced CVD using the raw material of $WF_6$ (FIG. 4B). The entire surface of the substrate 301 is etched by parallel plate plasma etching with $SF_6$/Ar mixed gases (FIG. 4C). At this time, the etching is controlled by a parameter such as time so that the tungsten 106 remains in the surface (FIG. 4C). Then, the pixel electrode layer 312 is deposited over the entire surface of the substrate 301 (FIG. 4D). Next, the surface of the pixel electrode layer 312 is polished by chemical mechanical polishing (CMP) to be in the same plane as the top of the separation regions between the pixels (FIG. 4E). This method can decrease the film-forming time of the pixel electrode layer 312 and further increase the mechanical strength at the base of the separation regions between the pixels and the heat resistance. In addition, the mechanical strength is increased at the base of the separation regions between the pixels, and the reaction with the base layer is suppressed, for example, when heat treating, thereby increasing the heat resistance. Unevenness is eliminated from the surface of the pixel electrode layer 312, and the decrease of light utilization efficiency due to the scattering of incident light, which used to be caused by this unevenness, is prevented, thus improving the quality of display image.

Fourth Embodiment

Figure 5:
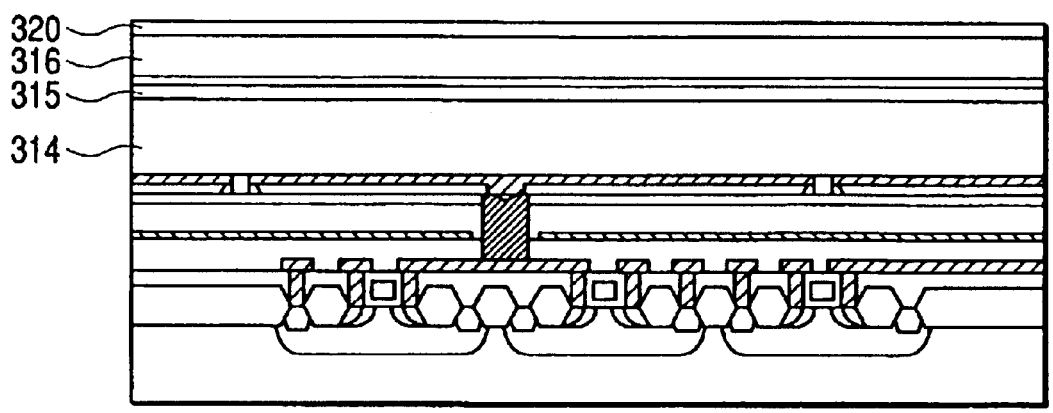
FIG. 5 is a drawing illustrating an example of a liquid crystal display panel used in a liquid crystal device in a fourth embodiment of the present invention.

A reflection-type active matrix liquid crystal display panel will be described as an example of the display panel of the present invention. FIG. 5 is a schematic diagram of this liquid crystal display panel. The liquid crystal panel is formed by interposing the liquid crystal 314 between either active matrix substrate in Embodiments 1, 2, and 3, and an opposite substrate 316 having a transparent electrode 315. The liquid crystal material is the polymer network liquid crystal PNLC. It should be noted, however, that the polymer dispersed liquid crystal PDLC or the like may also be used as the polymer network liquid crystal. The configuration of the present example improves the filling property of the metal film in the through holes of the pixel section and flattens the surface of the pixel electrode layer without unevenness. Further, this configuration makes it possible to expand the reflection regions, thereby increasing reflectance. Therefore, the present embodiment prevents the decrease of light utilization efficiency due to the scattering of incident light, which used to be caused by the unevenness in the conventional technology, and increases the quantity of light to make the display image brighter, thereby increasing the contrast and improving the quality of display image.

Fifth Embodiment

Embodiments of the present invention will be described with a plurality of liquid crystal panels, but it should be noted that the present invention is by no means intended to be limited to the embodiments. The effect is enhanced by combining techniques of the embodiments with each other. The structure of the liquid crystal panels will be described by those using a semiconductor substrate, but, without having to be limited to the semiconductor substrate, the structure described below may also be formed on an ordinary transparent substrate. The liquid crystal panels all described below-are of the MOSFET or TFT type, but they may also be of the two terminal type such as the diode type. Further, the liquid crystal panels described below can be effectively applied not only to televisions for home use, but also to display devices of projectors, head mounted displays, three-dimensional video game devices, laptop computers, electronic notes, video conference systems, car navigation units, airplane panels, and so on.

Figure 7:
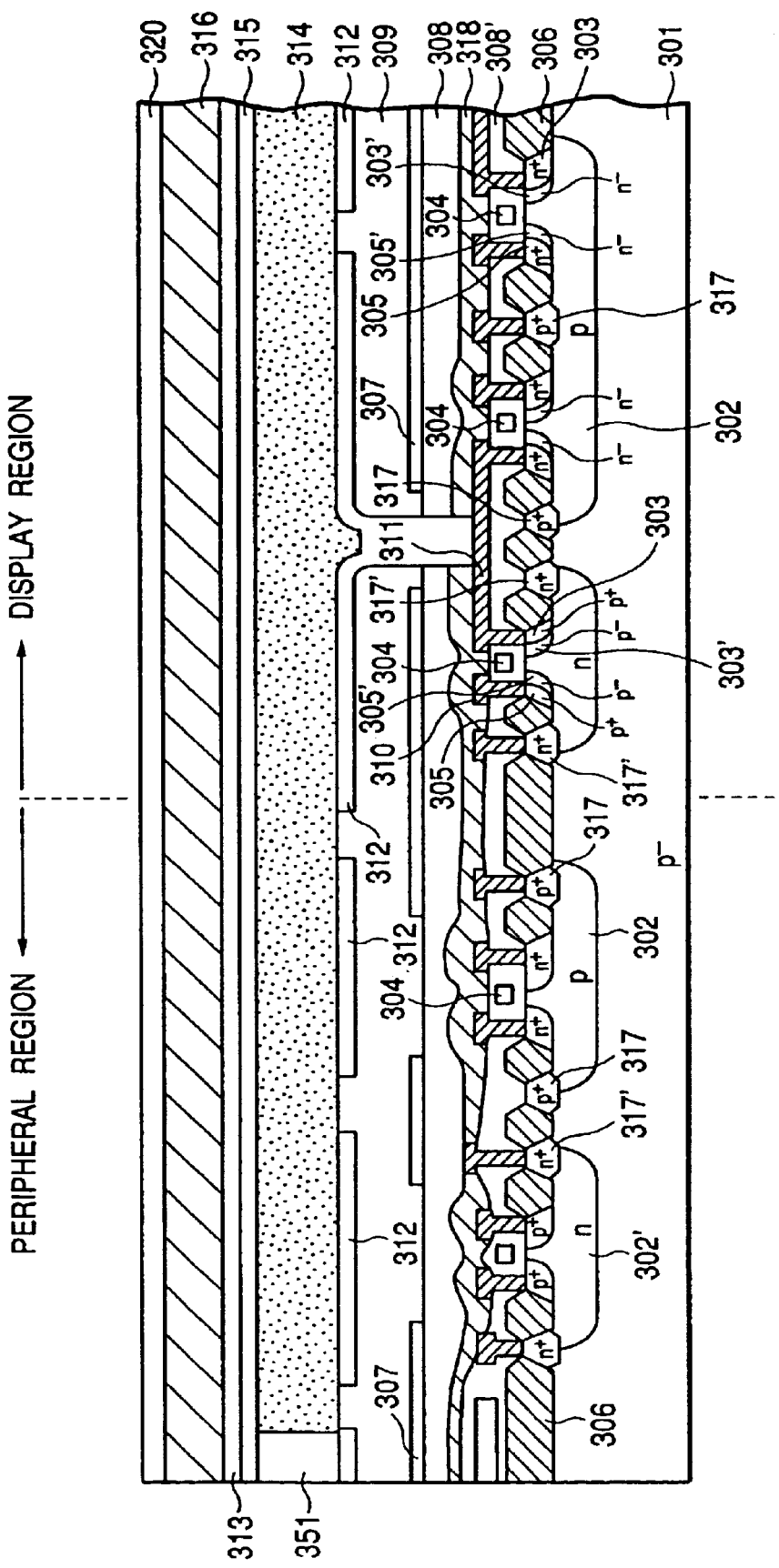
FIG. 7 is a sectional view of a liquid crystal element produced by CMP according to the present invention.

A cross-section of the liquid crystal panel section of the present embodiment is illustrated in FIG. 7. In the figure, reference numeral 301 denotes a semiconductor substrate, 302, 302' p-type and n-type wells, respectively, 303, 303', 303" source regions of transistors, 304 gate regions, and 305, 305', 305" drain regions.

Figure 8:
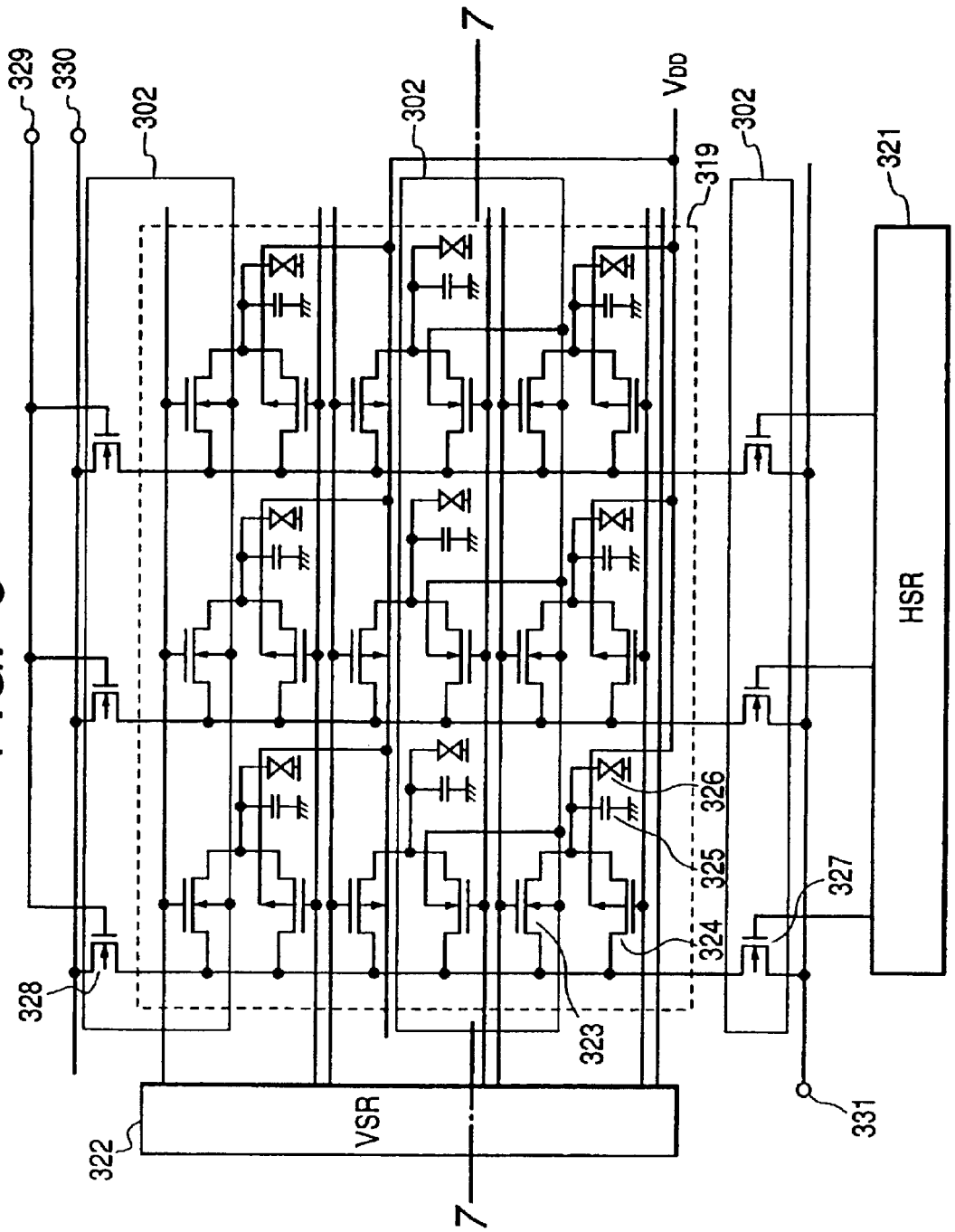
FIG. 8 is a schematic circuit diagram of a liquid crystal device according to the present invention.

As illustrated in FIG. 7, the high voltage of 20–35 V is applied to the transistors in the display region; the source and drain layers are not formed in a self-aligned manner with respect to the gates 304, but they are offset with low concentration layers in the p-well and with low concentration p layers in the n-well, as indicated by the source regions 303' and drain regions 305', between them. For reference, the offset amounts are preferably 0.5–2.0 μm. On the other hand, a partial circuit of the peripheral circuitry is illustrated in FIG. 8, and the source and drain layers are formed in the self-aligned manner with respect to the gate in some circuits of the peripheral part.

The offsets of the sources and drains were described herein, but, in addition to the presence or absence of those, it is also effective to change the offset amounts according to the withstand voltages of the respective layers and to optimize the gate length. This is because some of the peripheral circuits are logical circuits, and such parts can be normally driven by 1.5 to 5 V; therefore, the above self-aligned structure is employed in order to decrease the transistor size and increase the driving force of the transistors. The present substrate 301 is made of a p-type semiconductor, the substrate is kept at the lowest potential (normally, at the ground potential), and the voltage applied to the pixels, i.e., 20 to 35 V, is applied to the n-type well in the case of the display region, while the logic driving voltage 1.5 to 5 V is applied thereto in the logic part of the peripheral circuitry. This structure permits the optimum devices to be constructed according to the respective voltages, thereby implementing not only the decrease of chip size, but also high pixel density display with increase in driving speed.

In FIG. 7, 306 denotes field oxide film, 310 source electrodes connected to a data wire, 311 drain electrodes connected to the pixel electrodes, 312 the pixel electrodes also serving as a reflector, and 307 a shielding layer for covering the display region and peripheral region, which is preferably made of Ti, TiN, W, Mo, or the like. As illustrated in FIG. 7, the above shielding layer 307 is overlaid except for the connecting portions between the pixel electrode 312 and the drain electrode 311 in the display region; in the peripheral pixel region, a transferable means is provided in such a design that the above shielding layer 307 is removed from regions with heavy wire capacitance, such as some video lines or clock lines, but they cover the layer of pixel electrodes 312 if the illumination light is mixed in fast signals in the portions without the above shielding layer 307, thereby causing circuitry malfunction. Numeral 308 is an electrically insulating layer below the shielding layer 307, a flattening process by SOG is carried out on the P—SiO layer 318, the P—SiO layer 318 is further covered by P—SiO layer 308, and stability of the insulating layer 308 is thus ensured. In addition to the flattening process by SOG, the flattening can be performed by using a flattening method for forming a P-TEOS (Phospho-Tetraethoxy-Silane) film to further cover the P—SiO layer 318 and thereafter subjecting the insulating layer 308 to CMP.

Numeral 309 designates an electrically insulating layer provided between the reflective electrodes 312 and the shielding layer 307, and charge storage capacitors of the reflective electrodes 312 are formed through this insulating layer 309. For creating a capacitor of large capacitance, it is effective to employ a layered film or the like with P—SiN, $Ta_2O_5$, or $SiO_2$ of high permittivity, as well as $SiO_2$. The insulating layer is preferably formed on a flat metal of Ti, TiN, Mo, W, or the like as the shielding layer 307 and in a thickness of about 500 to 5000 Å.

Further, numeral 314 represents the liquid crystal material, 315 the common transparent electrode, 316 the opposite substrate, 317, 317' high concentration impurity regions, 319 the display region, and 320 an anti-reflection film.

As illustrated in FIG. 7, the high concentration impurity layer 317, 317' having the same polarity as that of the corresponding well 302, 302' formed in the lower part of the transistor is formed in the peripheral part and inside of the well 302, 302', and the well potential is stable even with application of a high amplitude signal to the source because it is a low resistance layer and is fixed at the desired potential. This implements high quality image display. Further, there are the above high concentration impurity layers 317, 317' provided through the field oxide film between the n-type well 302' and the p-type well 302, and this structure eliminates the need for the channel stop layer immediately below the field oxide film, which is normally used in the MOS transistors.

These high concentration impurity layers 317, 317' can be formed at the same time as the source and drain layer forming process, which decreases the number of masks and the number of manhours in the production process, thus decreasing the cost.

Next, reference numeral 313 designates an anti-reflection film provided between the common transparent electrode 315 and the opposite substrate 316, which is adapted so as to reduce the reflectance at the interface in view of the refractive index of the liquid crystal at the interface. In that case, the anti-reflection film is preferably made of an electrically insulating film having a smaller refractive index than those of the opposite substrate 316 and transparent electrode 315.

Next, a plan view of the panel of the present example is illustrated in FIG. 8. In the figure, numeral 321 denotes a horizontal shift register, 322 a vertical shift register, 323 an n-channel MOSFET, 324 a p-channel MOSFET, 325 a storage capacitor, 326 the liquid crystal layer, 327 a signal transfer switch, 328 a reset switch, 329 a reset pulse input terminal, 330 a reset power supply terminal, and 331 a video signal input terminal. The semiconductor substrate 301 is of the p-type in FIG. 7, but it may be of the n-type.

The well regions 302' are of an opposite conduction type to that of the semiconductor substrate 301. Therefore, the well regions 302 are of the p-type in FIG. 7. The p-type well regions 302 and n-type well regions 302' are desirably doped with a higher concentration of impurities than the semiconductor substrate 301 is. Specifically, when the impurity concentration of the semiconductor substrate 301 is $10^{14}$ to $10^{15}$ (cm$^{-3}$), the impurity concentration of the well regions 302 is desirably $10^{15}$ to $10^{17}$ (cm$^{-3}$).

The source electrodes 310 are connected to the data wires through which signals for display are sent, and the drain electrodes 311 to the pixel electrodes 312. Al, AlSi, AlSiCu, AlGeCu, or AlCu wires are normally used for these electrodes 310, 311. When a barrier metal layer of Ti and TiN is used for a contact surface between the bottom of these electrodes 310, 311 and the semiconductor, stable contact can be implemented. In addition, the contact resistance can also be decreased. The pixel electrodes 312 desirably have flat surfaces and are made of a highly reflective material, which can be selected from such materials as Cr, Au, or Ag, as well as the ordinary wire metals such as Al, AlSi, AlSiCu, AlGeCu, or AlC. For improving flatness, the surfaces of the base insulating layer 309 and pixel electrode layer 312 are processed by chemical mechanical polishing (CMP).

The storage capacitors 325 are capacitors for storing a signal between the pixel electrode 312 and the common transparent electrode 315. The substrate potential is applied to the well regions 302. In the present embodiment, the transmission gate configuration of each row is such that in the first row from the top, there are n-channel MOSFETs 323 above and p-channel MOSFETs 324 below, in the second row there are p-channel MOSFETs 324 above and n-channel MOSFETs 323 below, and so on, which is the configuration in which the order is switched between adjacent rows. As described above, the stripe wells are in contact with the power supply lines in the periphery of the display region, but contact is also achieved by providing the display region with fine power supply lines as well.

At this time, the point is stabilization of the resistance of the wells. Therefore, in the case of the p-type substrate, the present embodiment employs the configuration for making the contact area or the number of contacts inside the display area of the n-wells larger than those of the p-wells. Since the p-wells are at a constant potential from the p-type substrate, the substrate plays a role as a low resistance body. This configuration thus tends to be more affected by deflection due to input/output of signal to or from the source and drain of the n-wells of an island pattern, but it was able to be prevented by enhancing the contact from the upper wire layer. This realized a stable and high definition display.

The video signals (video signals, digital signals pulse-modulated, etc.) are input through the video signal input terminal 331 and then are outputted to each data wire by switching the signal transfer switches 327 on or off according to pulses from the horizontal shift register 321. The vertical shift register 322 supplies a high pulse to the gates of the n-channel MOSFETs 323 in a selected row and supplies a low pulse to the gates of the p-channel MOSFETs in the selected row.

As described above, the switches in the pixel section are constructed of the single crystal CMOS transmission gates, and this configuration has such an advantage that a signal of the source can be fully written as a signal written into a pixel electrode, independent of the threshold of MOSFET.

The switches are constructed of single crystal transistors, so that high speed driving without variations and with high reliability can be implemented without instable behaviors or the like at grain boundaries of polysilicon-TFT.

Figure 9:
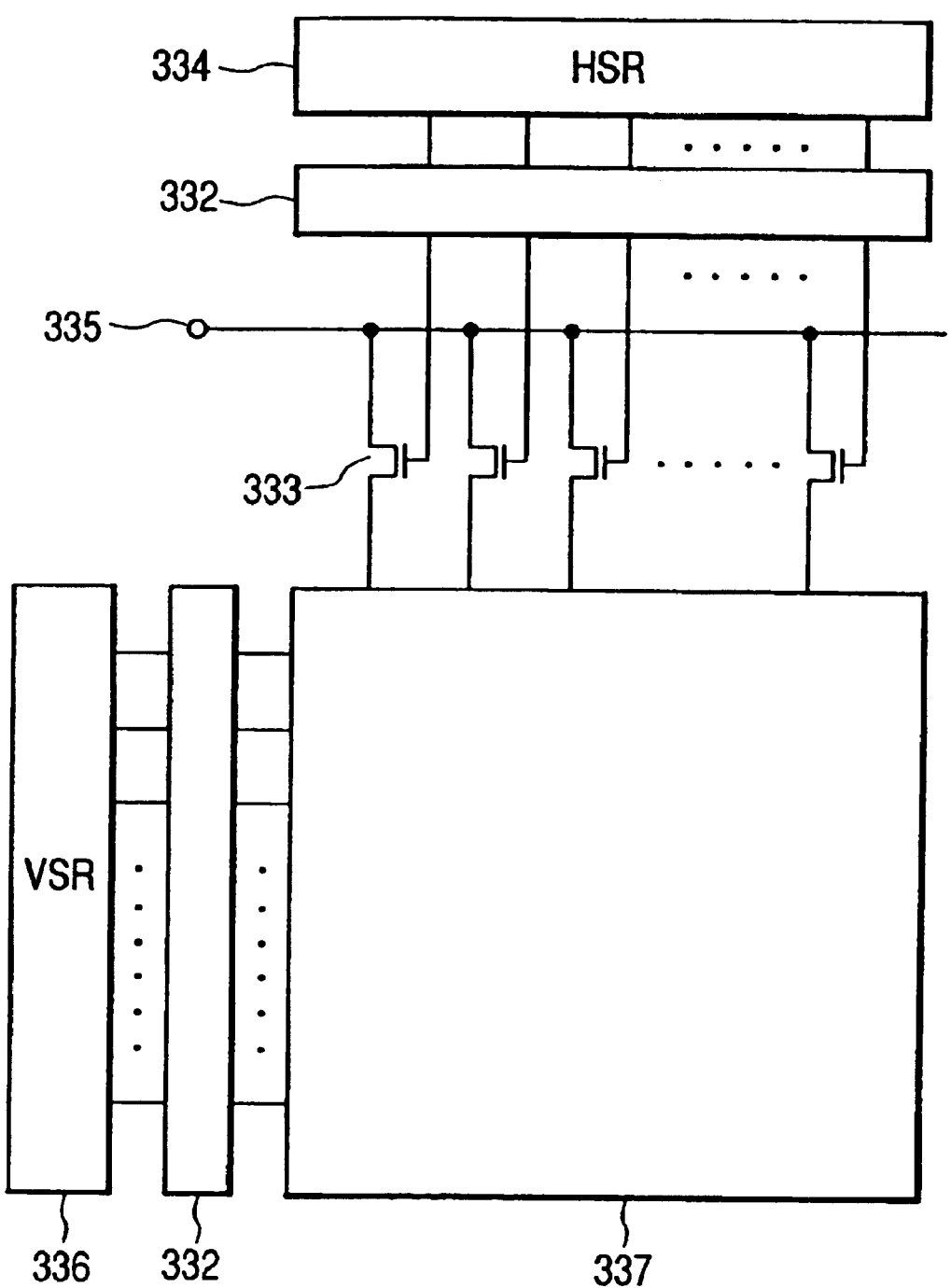
FIG. 9 is a block diagram of a liquid crystal device according to the present invention.

The structure of the peripheral circuitry of the panel will be described below using FIG. 9. In FIG. 9, reference numeral 337 denotes the display region of the liquid crystal element, 332 level shifter circuits, 333 video signal sampling switches, 334 a horizontal shift register, 335 a video signal input terminal, and 336 a vertical shift register.

The structure described above achieves high speed and low power consumption, because the logic circuits including the shift registers for both the horizontal and vertical driving can be driven by an extremely low voltage of about 1.5 to 5 V, while the amplitude of about 25 V or 30 V is supplied via the video signal input terminal 335. The horizontal and vertical shift registers herein can undergo scanning in both ways by a selection switch, they are ready for alteration of placement, etc. of the optical system without any change of the panel, and thus the same panel can be used for different series of products, which presents an advantage of reduction of cost. In FIG. 9, the video signal sampling switches are illustrated as those of one transistor structure of single polarity, but it is not necessary to mention that, without being limited to this structure, they may be constructed in the CMOS transmission gate structure which permits the whole input video line to be written into the signal line.

With the CMOS transmission gate structure, a problematic deflection of video signal will occur because of the difference between the gate areas of the NMOS gate and the PMOS gate and the difference between overlap amounts of the gate with the source and drain. This was solved as follows. The sources and drains of MOSFETs having gate amounts equal to approximately half of gate amounts of MOSFETs of the sampling switches of the respective polarities are connected respectively to signal lines, and negative-phase pulses are applied thereto, thereby preventing deflection. This allowed very good video signals to be written into the signal lines. This made higher definition display possible.

Figure 10:
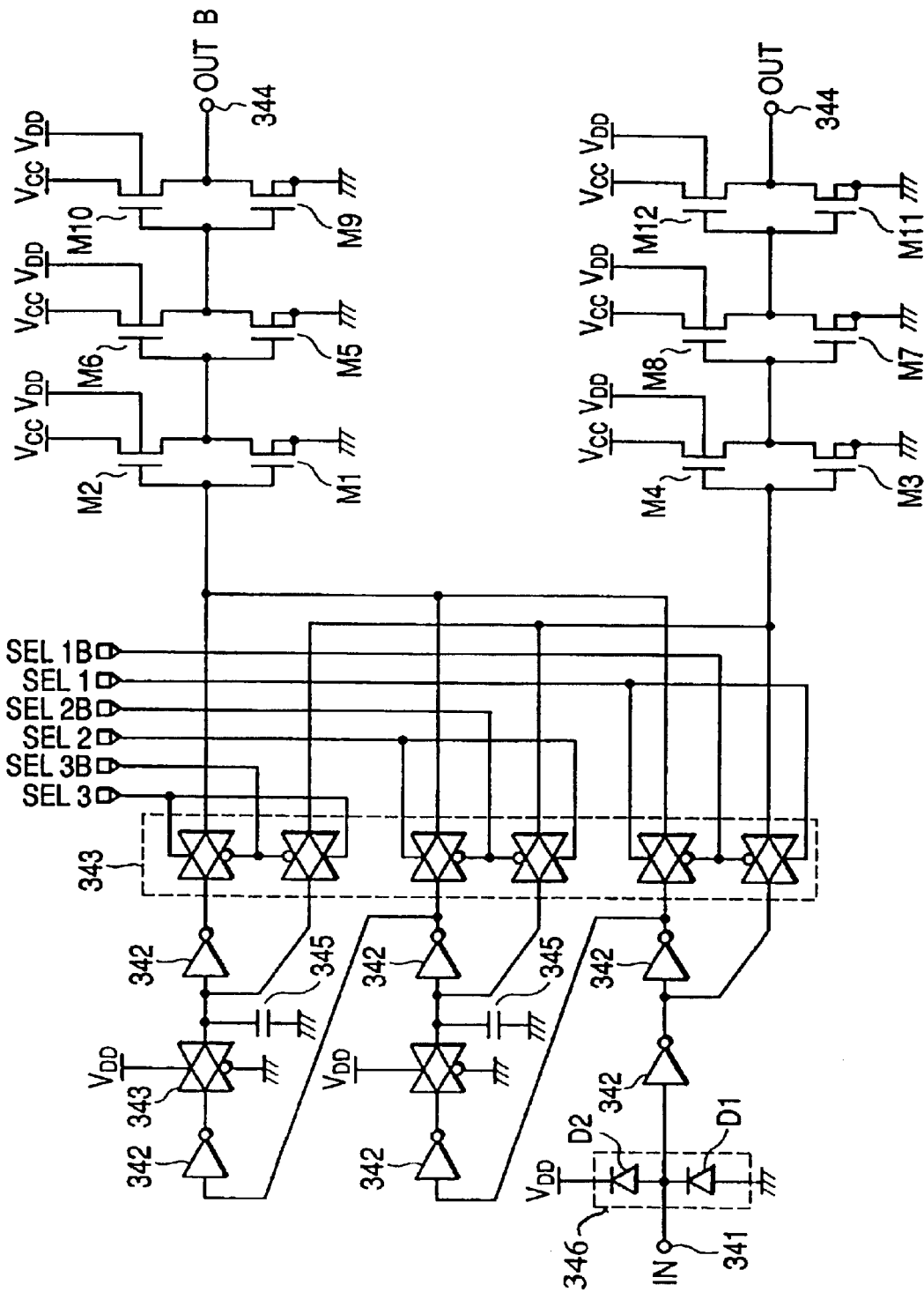
FIG. 10 is a circuit diagram including a delay circuitry in an input section of a liquid crystal device according to the present invention.

Next described with FIG. 10 is a method for achieving accurate synchronization of sampling pulse with the video signal. For this, a delay amount of the sampling pulse needs to be varied. Numeral 342 denotes inverters for delay of pulse, 343 switches for determining which inverter for delay should be selected, 344 outputs as a result of control of delay amount, and 345 capacitors (outB represents the negative-phase output while "out" the common-mode output). Numeral 346 represents a protection circuit.

The number of inverters 342 for delay to be passed can be selected by combinations of SEL 1 (SEL 1B) to SEL 3 (SEL 3B).

It was verified that incorporation of this synchronous circuit in the panel permitted the delay amounts of pulses from the outside of the panel to be adjusted by the above selection switches, even with disorder of symmetry due to the relation with a jig or the like in the case of the three sheet panels of R, G, and B, thereby obtaining a good display image without positional deviation due to the high pulse phase region of R, G, and B. It is also effective to place a temperature-measuring diode inside the panel and perform temperature compensation for the delay amounts according to an output from the diode and a reference table.

Next described is the relationship with the liquid crystal material. FIG. 7 showed the flat opposite substrate structure, but the common electrode substrate 316 is provided with unevenness for preventing reflection at the interface with the common transparent electrode 315, and the common transparent electrode 315 is placed on the surface. The anti-reflection film 320 is disposed on the opposite side of the common electrode substrate 316. This uneven configuration can be made by a method for performing sand polishing with abrasive grains of fine grain sizes, which is effective in enhancing contrast.

The liquid crystal material used was the Polymer Network Liquid Crystal (PNLC). It should be, however, noted that PDLC (Polymer Dispersed Liquid Crystal) or the like may also be used as the polymer network liquid crystal. Further, the vertical alignment liquid crystal can also be applied. The polymer network liquid crystal PNLC is made by the polymerization phase separation method. A solution is made of the liquid crystal and a polymerizable monomer or oligomer, it is poured into a cell by an ordinary method, thereafter UV polymerization takes place to bring about phase separation between the liquid crystal and a polymer, and the polymer is formed in a network pattern in the liquid crystal. The PNLC contains many liquid crystal molecules (70 to 90 wt %).

Among the PNLCs, optical scattering is not so strong when using nematic liquid crystal having high anisotropy of refractive index ($\Delta n$), whereas driving by low voltage can be implemented by the use of nematic liquid crystal having large dielectric anisotropy ($\Delta \in$). When the size of the polymer network, i.e., center-to-center distance of the network is 1 to 1.5 ($\mu$m), the optical scattering becomes sufficiently strong enough to obtain high contrast.

Figure 11:
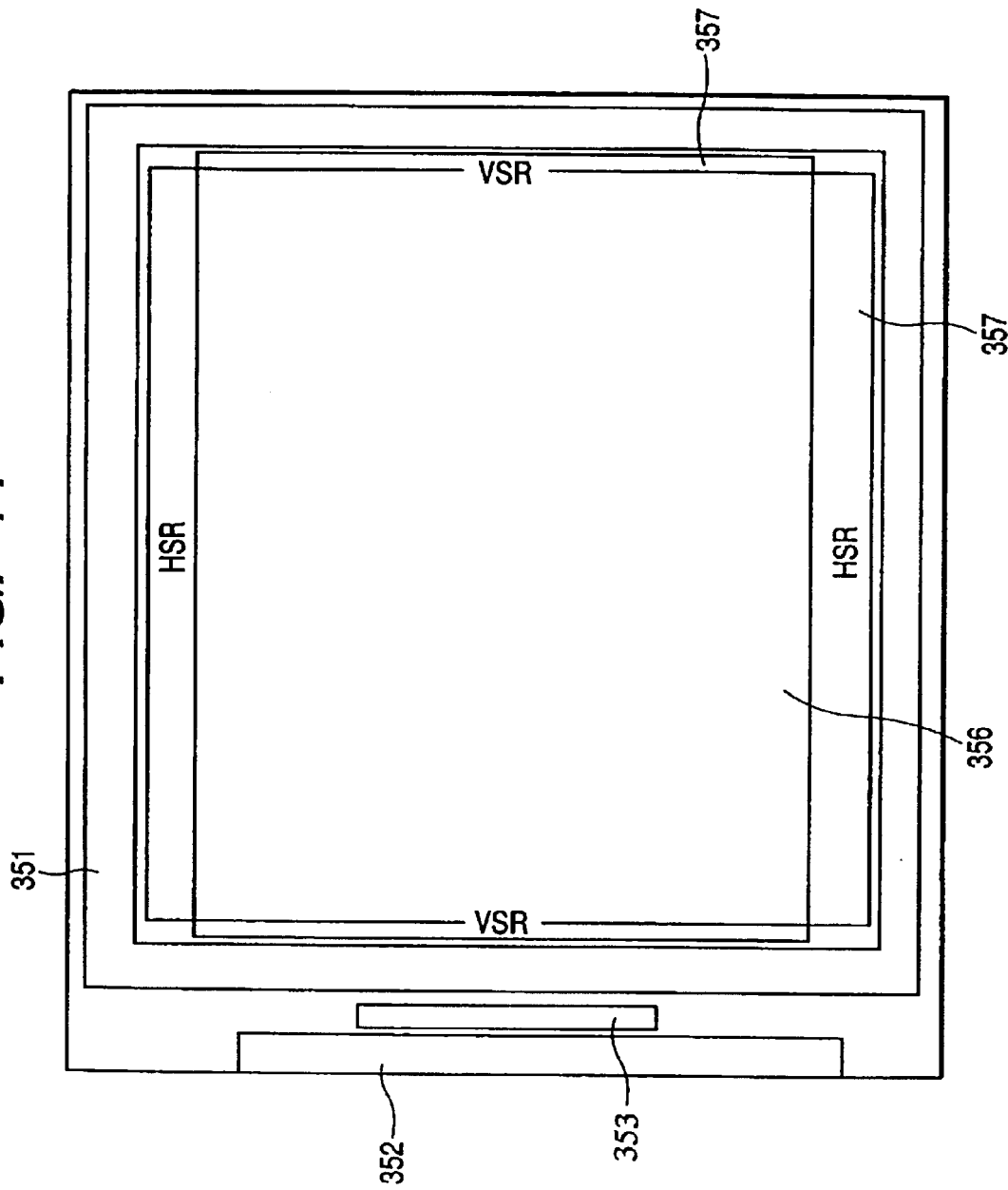
FIG. 11 is a conceptual drawing of a liquid crystal panel in a liquid crystal device according to the present invention.

Next described with FIG. 11 is the relation of the panel structure with the seal structure. In FIG. 11, reference numeral 351 designates a seal portion, 352 an electrode pad, and 353 a clock buffer circuit. An amplifier section not illustrated is used as an output amplifier during electric inspection of the panel. There is an Ag paste section, not illustrated, for taking the potential for the opposite substrate, numeral 356 represents the display section of the liquid crystal element, and 357 represents the peripheral circuit section including the horizontal and vertical shift registers (SR) and other parts. The seal section 351 is a contact region of a pressurebonding material or an adhesive for bonding the glass substrate having the common electrode 315 to the semiconductor substrate 301 having the pixel electrodes 312 therein, around the four sides of the display section 356; after they are bonded at the seal section 351, the liquid crystal is encapsulated in the display section 356 and in the shift register section 357.

As illustrated in FIG. 11, the circuits are disposed both inside and outside the seal in the present embodiment in order to decrease the total chip size. The present embodiment employs the configuration in which leads of the pad are concentrated on one side of the panel, but they can also be provided on both longer sides or on multiple sides, instead of the one side configuration. This modification is effective in handling quick clocks.

Since the panel of the present invention uses the semiconductor substrate such as the Si substrate, there is a possibility that if it is exposed to strong light like a projector while the light is also illuminating the side wall of the substrate, the substrate potential may vary thereby causing a malfunction of the panel. Therefore, the side wall of the panel, and the peripheral circuit section around the display region in the top surface of the panel are constructed of a substrate holder that can intercept the light, and the bottom surface of the Si substrate is of the holder structure in which a metal such as Cu with a high thermal conductivity is bonded through an adhesive with a high thermal conductivity.

The panel of the present invention uses the semiconductor substrate constructed as described in Embodiments 1, 2, and 3 and has the structure as described in Embodiment 4.

Figure 12:
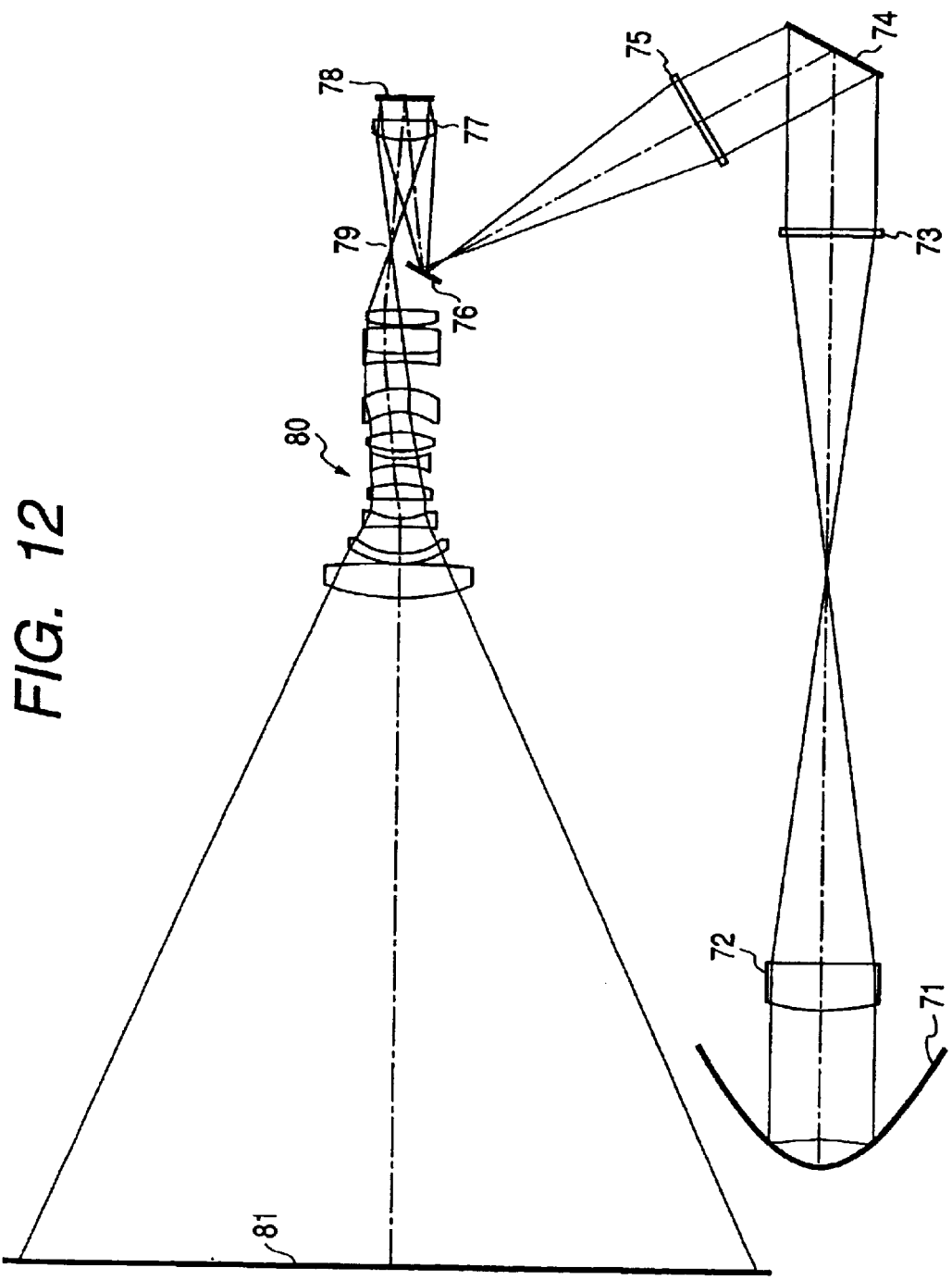
FIG. 12 is a conceptual drawing of a liquid crystal projector which makes use of the present invention.

An optical system incorporating the reflection-type liquid crystal panel which makes use of the present invention will be described below using FIG. 12. In FIG. 12, numeral 71 represents a light source such as a halogen lamp, 72 a condenser Idns for condensing a light source image, 73, 75 plano-convex Fresnel lenses, and 74 a color separation optical element for separating the light into R, G, and B beams, for which a dichroic mirror, a diffraction grating, or the like can be effectively applied.

Further, numeral 76 denotes a mirror for guiding a separate beam of R, G, or B to either one of three panels of R, G, and B, 77 a field lens for illuminating the reflection-type liquid crystal panel with parallel light, 78 the aforementioned reflection-type liquid crystal element, and a stop is placed at the position of 79. Numeral 80 indicates a projection lens for magnifying the image, which is a combination of plural lenses, and 81 a screen, which is normally composed of two sheets of a Fresnel lens for converting projected light into parallel light and a lenticular lens for displaying the image with wide vertical and horizontal field angles, thereby obtaining a bright and clear image with high contrast. Although only a panel of one color is illustrated in the structure of FIG. 12, the space between the color separation optical element 74 and the stop part 79 is separated for the three colors, and there are three panels disposed therein. It is not necessary to mention that the optical system can be realized not only by the three panel structure but also by the single panel structure, where a microlens array is placed on the surface of the reflection-type liquid crystal device panel and where the different incident beams are guided onto different pixel regions. When the voltage is applied to the liquid crystal layer of the liquid crystal element, the light is regularly reflected by each pixel and passes the stop part indicated by 79 to be projected onto the screen.

On the other hand, when the liquid crystal layer is a scattering body without application of the voltage, the light incident to the reflection-type liquid crystal element is isotropically scattered and is not incident to the projection lens, except for scattered light within the angle viewing the aperture of the stop part indicated by 79. This results in displaying black. As apparent from the optical system described above, no polarizing plate is necessary and the signal light is incident with high reflectance to the projection lens from the entire surface of the pixel electrodes. Therefore, a display two to three times brighter than before was accomplished. As described in the previous embodiment, the anti-reflection means are provided on the surface of the opposite substrate and at the interface. Therefore, high contrast display was accomplished with extremely little noise light. Since the panel size is small, all optical elements (lenses, mirrors, etc.) are constructed in a small size. This accomplished low cost and reduction of weight.

Uneven color, uneven luminance, and variation of the light source were overcome by inserting an integrator (of a fly's eye lens type or of a rod type) between the light source and the optical system, which also eliminated uneven color and uneven luminance on the screen.

Figure 13:
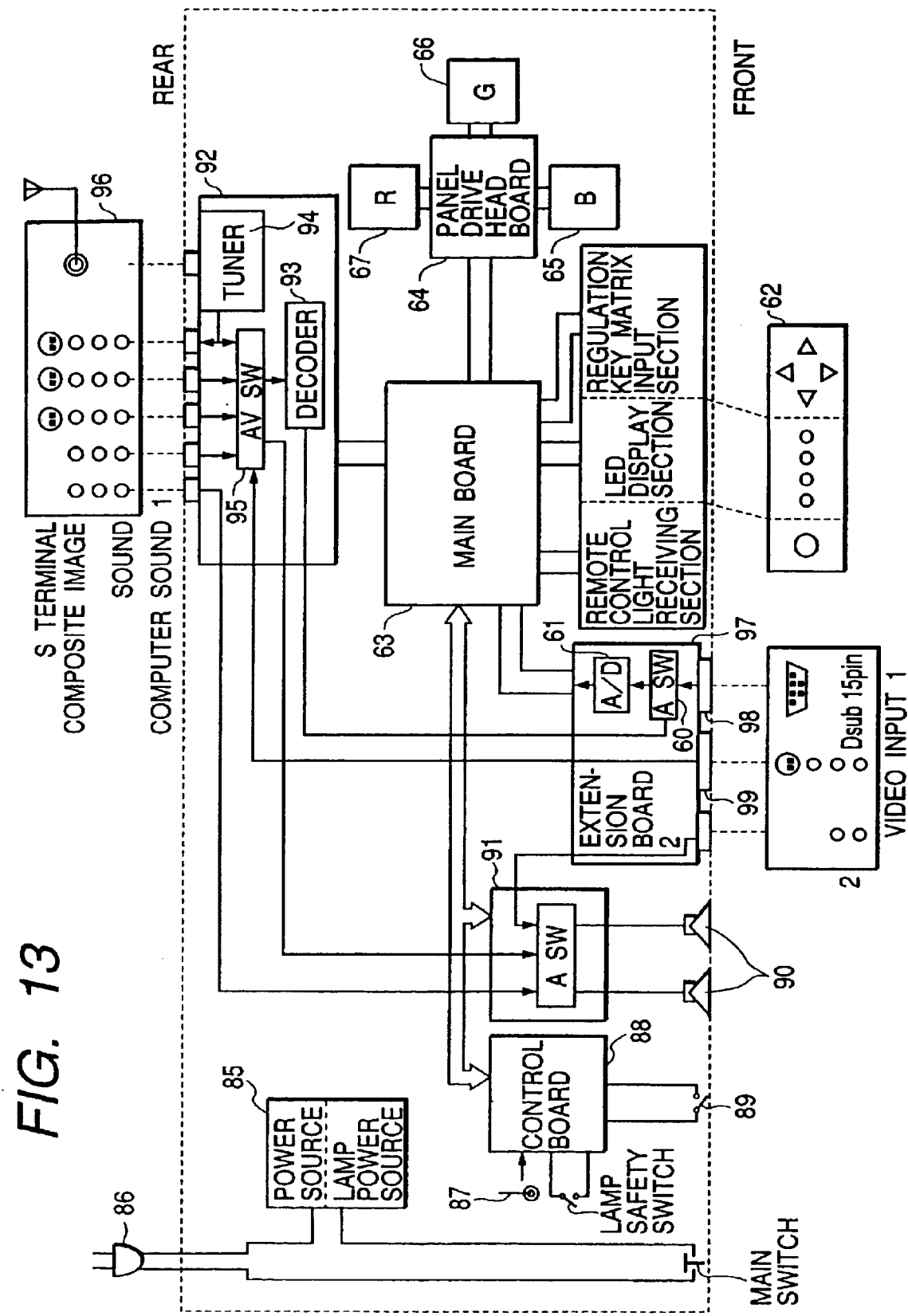
FIG. 13 is a circuit block diagram showing the inside of the liquid crystal projector which makes use of the present invention.

The peripheral electric circuitry except for the above liquid crystal panel will be described using FIG. 13. In the figure, reference numeral 85 designates a power supply, which is separated mainly into a power supply for the lamp and a system power supply for driving the panel and signal processing circuitry. Numeral 86 denotes a plug, and 87 a lamp temperature detector, which is used, for example, for such control as to stop a lamp by control board 88 when an anomaly in the temperature of the lamp occurs. This is not applicable only to the lamp, but is also applicable to the control of a filter safety switch 89. For example, when an operator tries to open a lamp house box at a high temperature, a safety measure is arranged so as to keep the box from opening. Numeral 90 represents speakers, and 91 a sound board, which may include a processor for 3D sound, surround sound, etc. as the occasion may demand. Numeral 92 indicates an extension board 1 which is composed of the S terminal for video signal, input terminals from an external device 96 for input of a composite image, sound, etc. for video signal, a selection switch 95 for selection of either signal, and a tuner 94 from which a signal is sent through decoder 93 to an extension board 2. On the other hand, the extension board 2 has a video input terminal from another system and a Dsub15pin terminal for computer, and also has a switch 60 for switching from the video signal sent from the decoder 93 to a signal from either terminal thereof and vice versa. The signal selected is converted into a digital signal by A/D converter 61.

Numeral 63 represents a main board mainly composed of a memory such as video RAM and a CPU. The NTSC signal after the A/D conversion in the A/D converter 61 is temporarily stored in the memory and signal processing is carried out, for example, in such a manner that insufficient signals for vacant pixels because of mismatch in the number of liquid crystal pixels are produced by interpolation in order to assign the signals well to the large number of pixels or that the signals are subjected to signal processing such as γ correction, edge enhancement, bright adjustment, or bias adjustment suitable for the liquid crystal display element. When computer signals, for example signals of VGA, are received instead of the NTSC signals, they are also subjected to a resolution conversion process in the case of the XGA panel of high resolution. Without handling only one image data, the main board 63 also performs processing such as combining the computer signals with the NTSC signals of plural image data. The output of the main board 63 is subjected to serial-parallel conversion into the form less affected by the noise and is then supplied to a head board 64. This head board 64 again performs parallel-serial conversion and thereafter performs D/A conversion. Then the head board 64 divides the signal into those according to the number of video lines of the panel and writes the signals through a drive amplifier into the liquid crystal panels of B, G, and R colors 65, 66, 67. Numeral 62 represents a remote control panel, through which the computer screen can also be manipulated readily in the same sense as TV. As described above, an image that is not always of a high resolution can be converted to a high definition image by processing, so that the display result of the present embodiment can be a display of an extremely beautiful image.

Sixth Embodiment

The present embodiment will be described as a liquid crystal display device of the so-called single screen type in which only one liquid crystal panel according to the present invention is used, each pixel is irradiated with light of the three colors of R, G, and B, and an image is displayed by reflected light therefrom.

Figure 16:
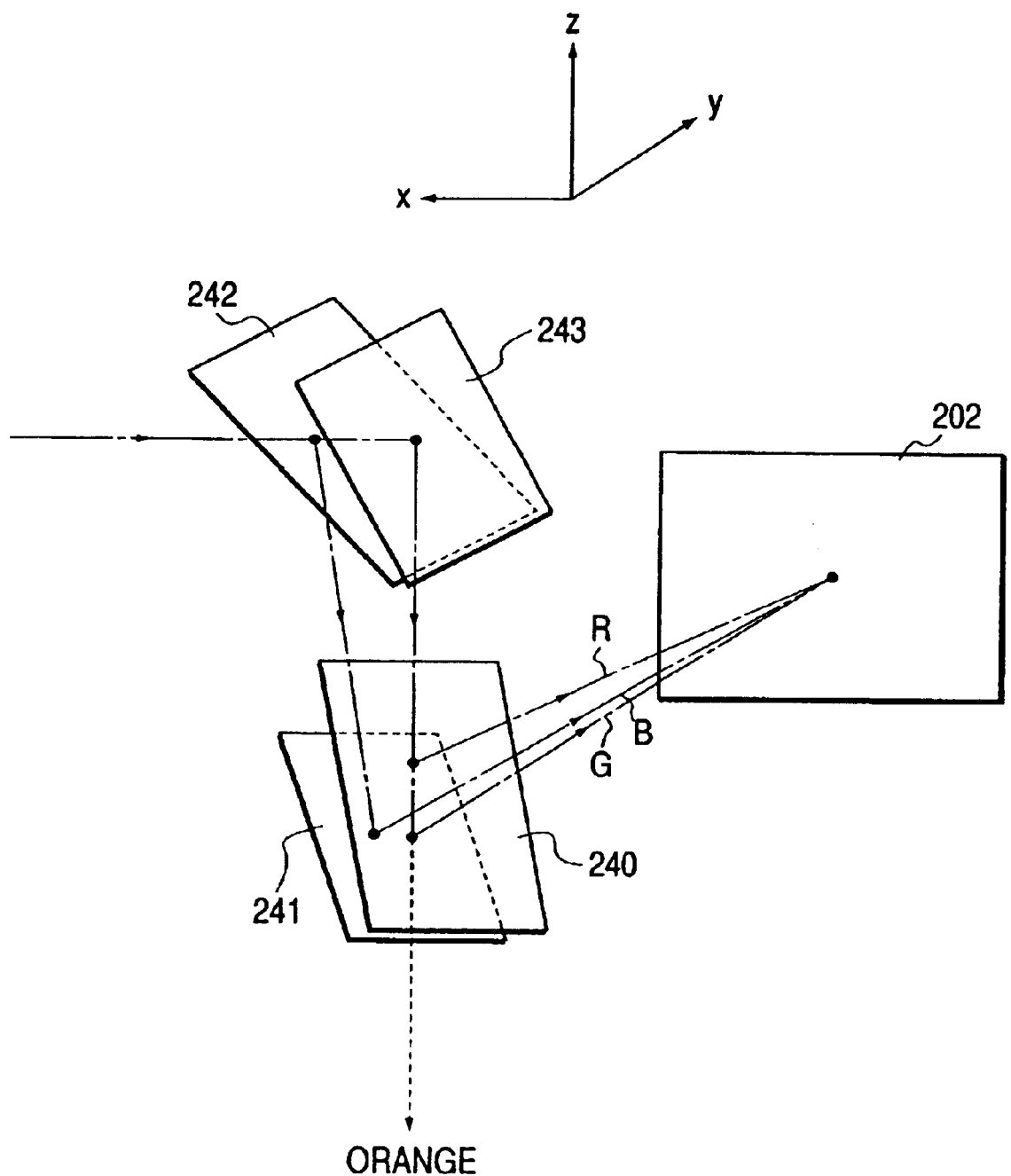
FIG. 16 is a perspective view of a color separation/illumination section in the optical system of the projection-type liquid crystal display device which makes use of the present invention.

FIGS. 14A to 14C are structural diagrams showing the structure of an optical system of a projection-type liquid crystal display device for incorporating the liquid crystal panel of the present invention. FIG. 14A is a top plan view of the optical system, FIG. 14B is a front elevation thereof, and FIG. 14C is a side view thereof. In the figures, reference numeral 201 designates a projection lens for projecting an image onto a screen, 202 a liquid crystal panel with microlenses, 203 a polarization beam splitter (PBS), 240 an R (red light) reflecting dichroic mirror, 241 a B/G (blue and green light) reflecting dichroic mirror, 242 a B (blue light) reflecting dichroic mirror, 243 a highly reflective mirror for reflecting light of all the colors, 250 a Fresnel lens, 251 a convex lens, 206 a rod-type integrator, 207 an ellipsoidal reflector, and 208 an arc lamp such as a metal halide lamp or UHP. Here, the R (red light) reflecting dichroic mirror 240, B/G (blue and green light) reflecting dichroic mirror 241, and B (blue light) reflecting dichroic mirror 242 have such spectral reflection characteristics as illustrated in FIG. 15C, FIG. 15B, and FIG. 15A, respectively. These dichroic mirrors, together with the highly reflective mirror 243, are arranged on a three-dimensional basis as illustrated in the perspective view of FIG. 16, and they perform color separation of white illumination light into color beams of R, G, and B as detailed hereinafter and make each beam of the primary colors illuminate the liquid crystal panel 202 in three different directions in the three-dimensional space.

The operation of the optical system will be described along the advance process of beam. First, the light emitted from the lamp 208 of the light source is white light and the ellipsoidal reflector 207 condenses the white light at the entrance of the integrator 206 disposed in front thereof. As the light advances with repeating reflections in this integrator 206, the spatial intensity distribution of the beam is made uniform. Then, the beam emerging from the integrator 206 is converted into a beam parallel to the negative direction of the x-axis (with respect to the reference in the front elevation of FIG. 14B) by the convex lens 251 and Fresnel lens 250. Then, the parallel bean first reaches the B reflecting dichroic mirror 242. This B reflecting dichroic mirror 242 reflects only the B light (blue light), and the B light is directed at a predetermined angle with respect to the z-axis in the negative direction of the z-axis or downward (with respect to the reference in the front elevation of FIG. 14B) toward the R reflecting dichroic mirror 240. On the other hand, the beams of the colors except for the B light (i.e., the RIG light beams) pass through this B reflecting dichroic mirror 242 and then are reflected at a right angle in the negative direction of the z-axis (downward) by the highly reflective mirror 243 to travel toward the R reflecting dichroic mirror 240 as well. Speaking here based on the front elevation of FIG. 14B, the B reflecting dichroic mirror 242 and highly reflective mirror 243 are arranged so as to reflect the beam (along the negative direction of the x-axis) from the integrator 206 into the negative direction of the z-axis (downward), and the highly reflective mirror 243 is inclined just at 45° to the xy plane about the rotational axis of the y-axis direction. In contrast, the B reflecting dichroic mirror 242 is set at an angle smaller than 45° with respect to the x-y plane about the rotational axis of the y-axis direction as well. Accordingly, the R/G light reflected by the highly reflective mirror 243 is reflected at the right angle into the negative direction of the z-axis, whereas the B light reflected by the B reflecting dichroic mirror 242 travels downward at the predetermined angle with respect to the z-axis (with a tilt in the x-z plane). Here, shift amounts and tilt amounts of the highly reflective mirror 243 and B reflecting dichroic mirror 242 are selected so that the principal rays of the respective color beams intersect with each other on the liquid crystal panel 202 in order to equalize the illumination areas of the B light and the R/G light on the liquid crystal panel 202.

Then the R/G/B beams travelling downward (in the negative direction of the z-axis) as described above travel toward the R reflecting dichroic mirror 240 and B/G reflecting dichroic mirror. 241. These are positioned below the B reflecting dichroic mirror 242 and highly reflective mirror 243. First, the B/G reflecting dichroic mirror 241 is arranged at an inclination of 45° with respect to the x-z plane about the rotational axis of the x-axis direction. The R reflecting dichroic mirror 240 is also set at an angle smaller than 45° with respect to the x-z plane about the rotational axis of the x-axis direction. Therefore, among the R/G/B beams incident to these, the B/G light first passes through the R reflecting dichroic mirror 240 and then is reflected at a right angle into the positive direction of the y-axis by the B/G reflecting dichroic mirror 241. Then the B/G light is polarized through the PBS 203 and thereafter illuminates the liquid crystal panel 202 placed horizontally on the x-z plane. Among the B/G beams, the B light is traveling at the predetermined angle with respect to the x-axis (with the tilt in the x-z plane) as described previously (see FIG. 14A and FIG. 14B), and, therefore, it maintains the predetermined angle with respect to the y-axis (the tilt in the x-y plane) after being reflected by the B/G reflecting dichroic mirror 241. Then, the B light illuminates the liquid crystal panel 202 at that angle as an angle of incidence (in a direction on the x-y plane).

The G light is reflected at a right angle by the BIG reflecting dichroic mirror 241 and travels in the positive direction of the y-axis and then is polarized through the PBS 203. After that, the G light illuminates the liquid crystal panel 202 at the angle of incidence of 0°, i.e., normally. The R light is reflected into the positive direction of the y-axis by the R reflecting dichroic mirror 240 placed in front of the BIG reflecting dichroic mirror 241 as described previously, but the R light travels at the predetermined angle with respect to the y-axis (with the tilt in the y-z plane) in the positive direction of the y-axis as illustrated in FIG. 14C (the side view) and is polarized through the PBS 203. After that, the R light illuminates the liquid crystal panel 202 at this angle to the y-axis, as an angle of incidence (in a direction on the y-z plane). Shift amounts and tilt amounts of the B/G reflecting dichroic mirror 241 and R reflecting dichroic mirror 240 are selected so that the principal rays of the respective color beams intersect with each other on the liquid crystal panel 202 in order to equalize the illumination areas of the R, G and B color beams on the liquid crystal panel 202 in the same fashion as described above. Further, the cut wavelength of the B reflecting dichroic mirror 241 is 480 nm as illustrated in FIG. 15A, the cut wavelength of the B/G reflecting dichroic mirror 241 is 570 nm as illustrated in FIG. 15B, and the cut wavelength of the R reflecting dichroic mirror 240 is 600 nm as illustrated in FIG. 15C; therefore, unnecessary orange light passes through the B/G reflecting dichroic mirror 241 to be discarded. This achieves an optimum color balance.

As described hereinafter, each R, G and B beam undergoes reflection and polarization modulation in the liquid crystal panel 202 and then returns to the PBS 203. Beams reflected in the positive direction of the x-axis by PBS surface 203a of the PBS 203 compose image light, which is enlarged and projected through the projection lens 201 onto the screen (not illustrated). Incidentally, the R, G and B beams illuminating the liquid crystal panel 202 have mutually different angles of incidence, so that the R, G and B beams reflected therefrom also have different angles of emergence. The projection lens 201 used herein is one having a lens diameter and aperture enough to capture all these beams. It is, however, noted that inclinations of the beams incident to the projection lens 201 are rather paralleled as each color beam passes twice through the microlenses, and they thus maintain the inclinations of the incident light to the liquid crystal panel 202. Since in the present embodiment the spread of the beams from the liquid crystal panel 202 is relatively small, a sufficiently bright projection image can be obtained on the screen even with the use of a projection lens having a smaller numerical aperture. Thus, the present embodiment permits use of a cheaper projection lens.

Figure 17:
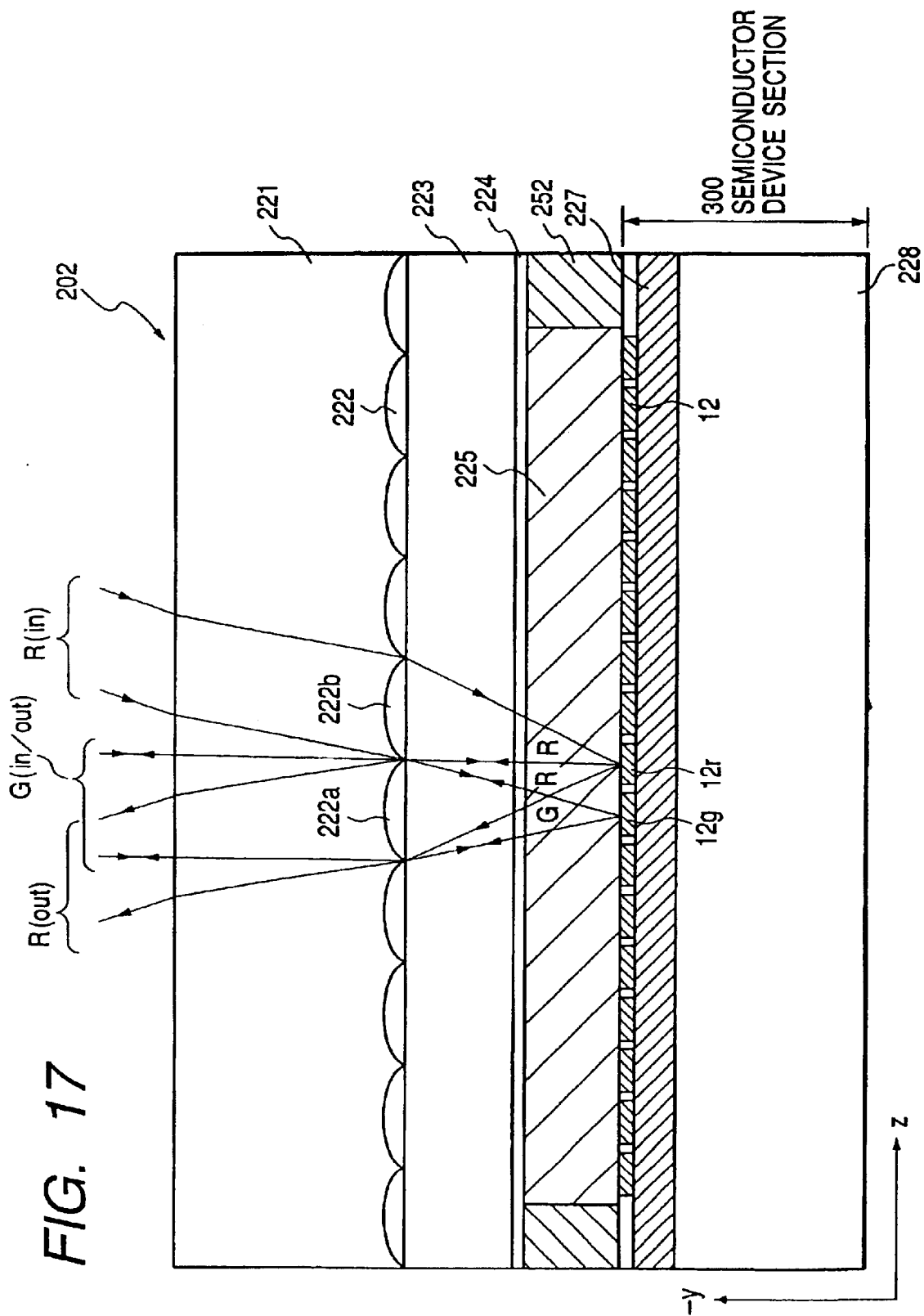
FIG. 17 is a sectional view of a liquid crystal panel which makes use of the present invention.

Next described is the liquid crystal panel 202 of the present invention used herein. FIG. 17 is a schematic diagram of an enlarged cross-section (corresponding to the y-z plane of FIGS. 14A to 14C) of the liquid crystal panel 202. In the figure, numeral 221 represents a microlens substrate, 222 microlenses, 223 a glass sheet, 224 a transparent opposite electrode, 225 a liquid crystal layer, 12 pixel electrodes, 227 an active matrix driving circuit section, and 228 a silicon semiconductor substrate. The microlenses 222 are formed on the surface of the glass substrate (alkaline glass) 221 by the so-called ion exchange method and arc arrayed in the two-dimensional array structure at a pitch equal to double the pitch of the pixel electrodes 12.

The liquid crystal layer 225 employs the nematic liquid crystal of the ECB (Electrically Controlled Birefringence) mode such as so-called DAP (Deformation of Aligned Phase) or HAN (Hybrid Aligned Nematic) adapted for the reflection-type and is maintained in a predetermined alignment by alignment layers not illustrated. The pixel electrodes 12 are made of Al and also serve as a reflector. The active matrix driving circuit section 227 is a semiconductor circuit section provided on the so-called silicon semiconductor substrate 228 and drives the above pixel electrodes 12 in the active matrix manner. In the peripheral part of the circuit matrix, there are provided a gate line driver (the vertical register etc.) and a signal line driver (the horizontal register etc.) not illustrated (the details will be described hereinafter). These peripheral drivers and active matrix driving circuit are constructed so as to write the video signals of the respective primary colors of R, G and B into the predetermined R, G and B pixels, respectively. Each of the pixel electrodes 12 does not have a color filter, but they are distinguished as R, G and B pixels by the primary color video signals written by the active matrix driving circuit, thus forming a predetermined array of R, G and B pixels detailed hereinafter.

Let us now check the G beam illuminating the liquid crystal panel 202. As described above, the G beam is polarized by the PBS 203 and thereafter is incident normally to the liquid crystal panel 202. Among rays of the G light, an example of rays incident to one microlens 222a are illustrated by arrows G (in/out) in the figure. As illustrated herein, the G rays are condensed by the microlens 222 to illuminate the G pixel electrode 12g. Then, the rays are reflected by the pixel electrode 12g of Al and again pass through the same microlens 222a to go out of the panel. As the G rays travel back and forth through the liquid crystal layer 225 in this way, the G rays (polarized light) undergo modulation because of the action of the liquid crystal induced by an electric: field established between the pixel electrode and the opposite electrode 224 by the signal voltage applied to the pixel electrode 12g, go out of the liquid crystal panel, and return to the PBS 203.

Since the quantity of the light reflected by the PBS surface 203a and traveling toward the projection lens 201 varies depending upon the degree of modulation, the so-called density gradation display of the pixels is achieved thereby. On the other hand, concerning the R light incident in the oblique direction in the cross-section of FIG. 17 (in the y-z plane) as described above, let us focus attention on R rays also polarized by the PBS 203 and thereafter entering, for example, the microlens 222b. As indicated by arrows R (in) in the figure, the rays are condensed by the microlens 222b and then illuminate the R pixel electrode 12r located at a position shifted to the left from the position immediately below the microlens 222b. Then, the rays are reflected by the pixel electrode 12r and pass through the microlens 222a next thereto (in the negative z-direction) this time, as illustrated, to go out of the panel (R(out)).

On this occasion, the R rays (polarized light) also undergo modulation because of the action of the liquid crystal induced by an electric field according to an image signal established between the pixel electrode 12r and the opposite electrode 224 by the signal voltage applied to the pixel electrode 12r, then go out of the liquid crystal panel, and return to the PBS 203. In the subsequent process, they are projected as part of the image light in the same manner as in the case of the G light described above. Incidentally, in the depiction of FIG. 17, the G light and the R light appears to overlap and interfere with each other above the pixel electrode 12g and above the pixel electrode 12r, but this results from the enlarged and emphasized depiction of the thickness of the liquid crystal layer in the schematic diagram; such interference does not occur in, practice irrespective of the pixel size, because the actual thickness of the liquid crystal layer is 1 to 0.5 pm, which is much smaller than 50 to 100 μm of the glass sheet 223.

Figure 18A:
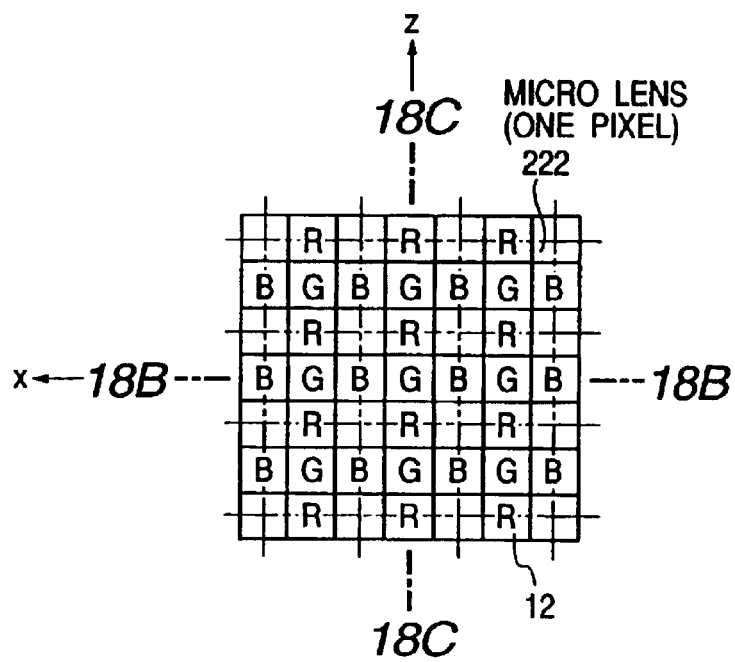
FIGS. 18A, 18B and 18C are explanatory drawings illustrating the principles of color separation and color synthesis in the liquid crystal panel which makes use of the present invention.
Figure 18C:
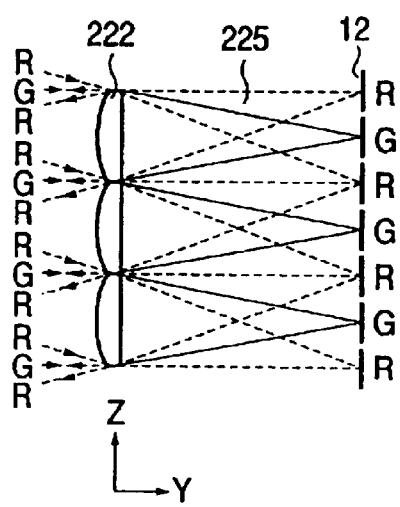
Figure 18B:
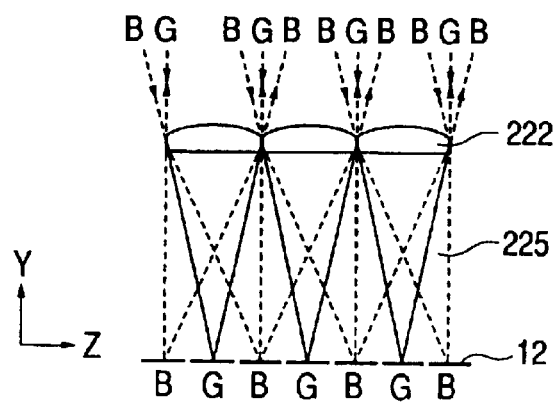

Next, FIGS. 18A to 18C are explanatory diagrams showing the principles of color separation and color synthesis in the present example. FIG. 18A is a schematic top plan view of the liquid crystal panel 202, and FIG. 18B and FIG. 18C are schematic sectional views along 18B—18B (in the x-direction) and along 18C—18C in FIG. 18A (in the z-direction) of the schematic top plan view of the liquid crystal panel, respectively. Here, each microlens 222 corresponds to an area covering a pixel of G light and halves of twocolor pixels adjacent thereto on either side, as indicated by the chain lines in FIG. 18A. FIG. 18C corresponds to above FIG. 17 to show the y-z cross-section, showing states of incidence and emergence of the G light and R light incident to each microlens 222. As seen from this figure, each G pixel electrode is positioned immediately below the center of each microlens and each R pixel electrode immediately below the border between microlenses. It is thus preferable that the angle of incidence of: the R light be set so that tanG thereof may become equal to a ratio of the pixel pitch (of B and R pixels) to the distance between the microlenses and the pixel electrodes. On the other hand, FIG. 18B corresponds to the x-y cross-section of the liquid crystal panel 202. In this x-y cross-section, the B pixel electrodes and G pixel electrodes are arranged in an alternate manner, as in FIG. 18C, and each G pixel electrode is positioned immediately below the center of each microlens while each B pixel electrode is positioned immediately below the border between microlenses.

Incidentally, the B light to illuminate the liquid crystal panel is polarized by the PBS 203 and thereafter enters the liquid crystal panel in the oblique direction in the cross-section of FIG. 14A (in the x-y plane) as described previously, so that, in the same manner as in the case of the R light, the B rays incident to each microlens 222 are reflected by the B pixel electrodes as illustrated and then emerge from the microlenses 222 adjacent in the x-direction to the incident microlenses 222. The modulation by the liquid crystal on the B pixel electrodes and the projection of the B emergent light from the liquid crystal panel are substantially the same as those of the G light and R light described above.

Each B pixel electrode is positioned immediately below the border between microlenses, and it is also preferable that the angle of incidence of the B light to the liquid crystal panel be set so that tanθ thereof may become equal to the ratio of the pixel pitch (of the G and B pixels) to the distance between the microlenses and the pixel electrodes, as was the case with the R light. Incidentally, the liquid crystal panel of the present example has the array of R, G and B pixels as described above, specifically the sequence of RGRGRG . . . in the z-direction and the sequence of BGBGBG . . . in the x-direction, and FIG. 18A shows the array on the plan view. As described, the size of each pixel is approximately half of the microlens both in the vertical direction and in the horizontal direction, and the pixel pitch is half that of the microlenses both in the x- and z-directions. Further, the G pixels are located immediately below the centers of the microlenses in the plan view as well, the R pixels are located between the G pixels and at the borders between the microlenses in the z-direction, and the B pixels are located between the G pixels and at the borders between the microlenses in the x-direction. The shape of one microlens unit is square (double the size of each pixel).

Figure 19:
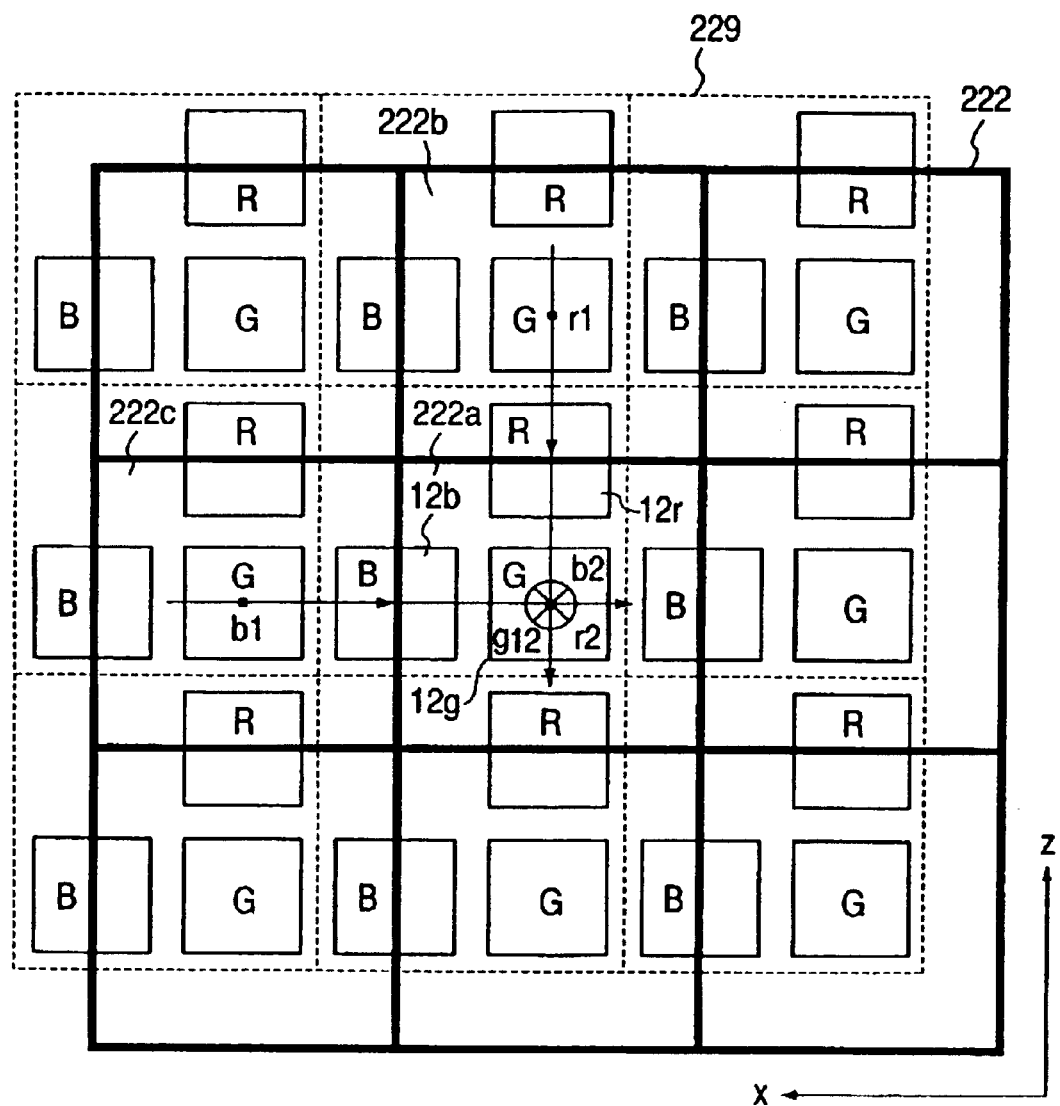
FIG. 19 is a partly enlarged, top plan view of the liquid crystal panel which makes use of the present invention.

FIG. 19 is a partially enlarged, top plan view of the present liquid crystal panel. In the figure, each square 229 indicated by the dashed lines represents an assembly of R, G and B pixels composing one picture element. This means that when the R, G and B pixels are driven by the active matrix driving circuit section 227 of FIG. 17, each RGB pixel unit indicated by a dashed-line square 229 is driven by R, G and B video signals corresponding to a common pixel position. Let us focus here attention on one picture element composed of the R pixel electrode 12r, the G pixel electrode 12g, and the B pixel electrode 12b. First, the R pixel electrode 12r is illuminated by the R light obliquely incident from the microlens 222b as indicated by arrow r1 and as described previously. The R reflected light thereof emerges through the microlens 222a as indicated by arrow r2. The B pixel electrode 12b is illuminated by the B light obliquely incident from the microlens 222c as indicated by arrow r1 and as described previously. The B reflected light thereof also emerges through the microlens 222a as indicated by arrow b2. The G pixel electrode 12g is illuminated by the G light incident normally (in the direction going into the plane of the drawing) from the microlens 222a as indicated by the ingoing/outgoing arrow g12 and as described previously. The G reflected light thereof also emerges normally (in the direction outgoing from the plane of the drawing) through the same microlens 222a.

As described, in the present liquid crystal panel, the incident illumination positions of the respective primary color illumination beams are different from each other in each RGB pixel unit composing one picture element, but the beams emerging therefrom pass through the same microlens (222a in this case). This also holds for the all other picture elements (the RGB pixel units).

Figure 20:
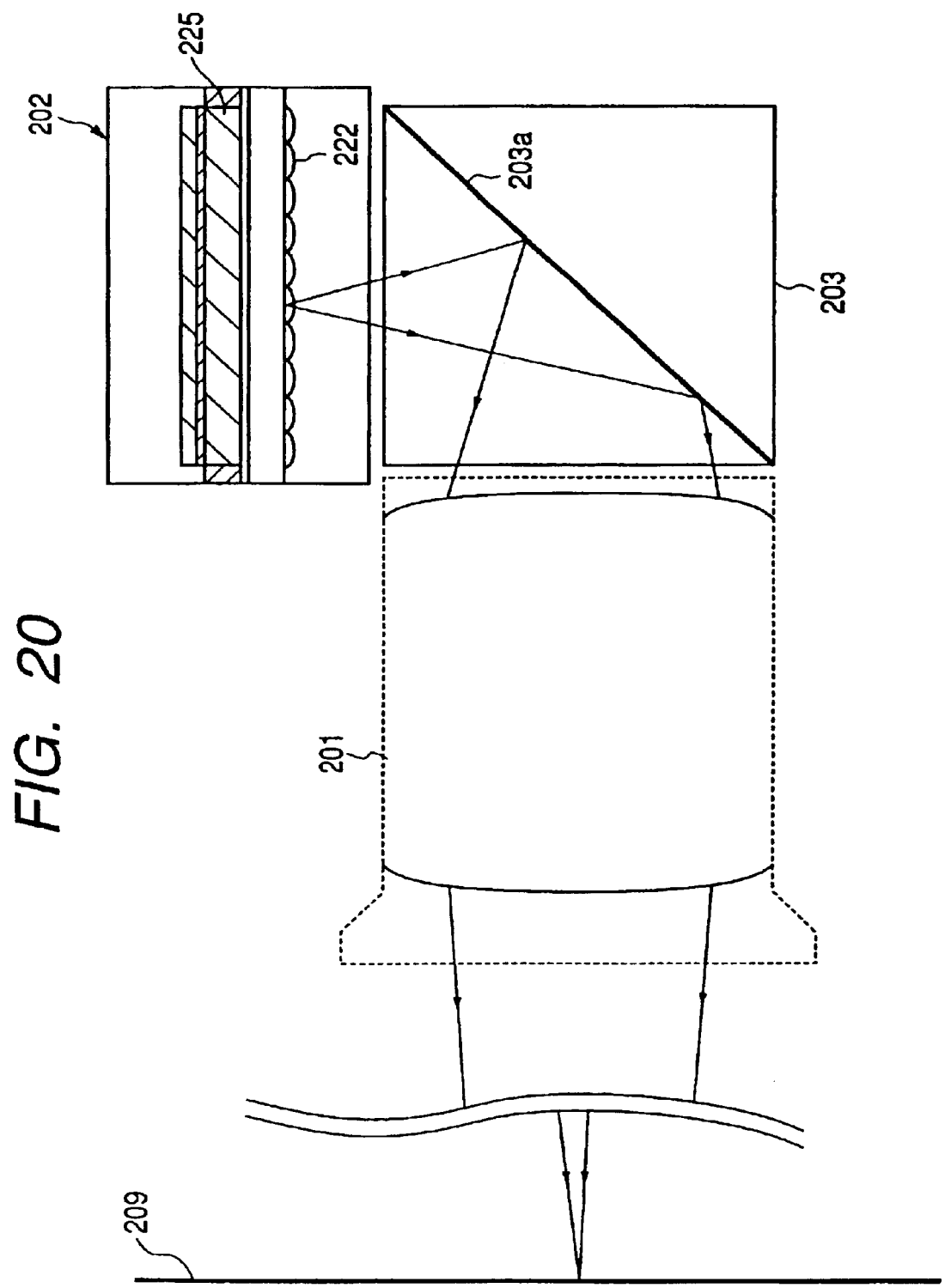
FIG. 20 is a partial, structural drawing to show the projection optical system of the projection-type liquid crystal display device which makes use of the present invention.
Figure 21:
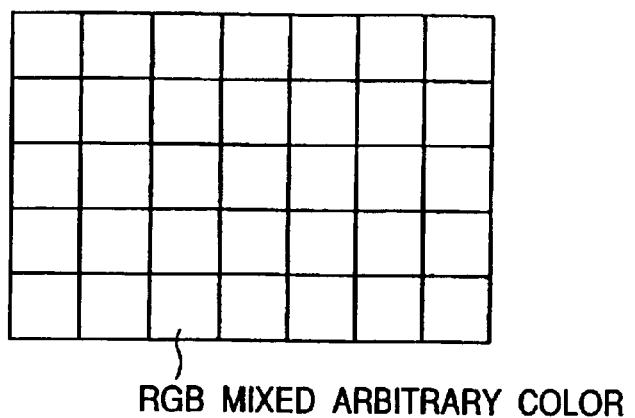
FIG. 21 is a partially enlarged view of a projected image on a screen in the projection-type liquid crystal display device which makes use of the present invention.

When the whole emerging light from the present liquid crystal panel is projected through the PBS 203 and projection lens 201 onto the screen 209 and when optical adjustment is achieved so that the positions of the microlenses 222 in the liquid crystal panel 202 are imaged and projected onto the screen 209 as illustrated in FIG. 20, the projected image is composed of component units of picture elements each in a mixed color state of emerging beams from the RGB pixel unit composing each picture element, i.e., in a state of a mixture of colors in the respective pixels in the grid pattern of the microlenses as illustrated in FIG. 21, accordingly. Thus, display of a good color image with high quality can be achieved without so-called RGB mosaic.

Next, FIG. 17 schematically shows the semiconductor device section 300 in which the active matrix driving circuit section 227 is formed on the silicon semiconductor substrate 228 and in which the pixel electrodes 226 are further formed thereon.

Figure 22:
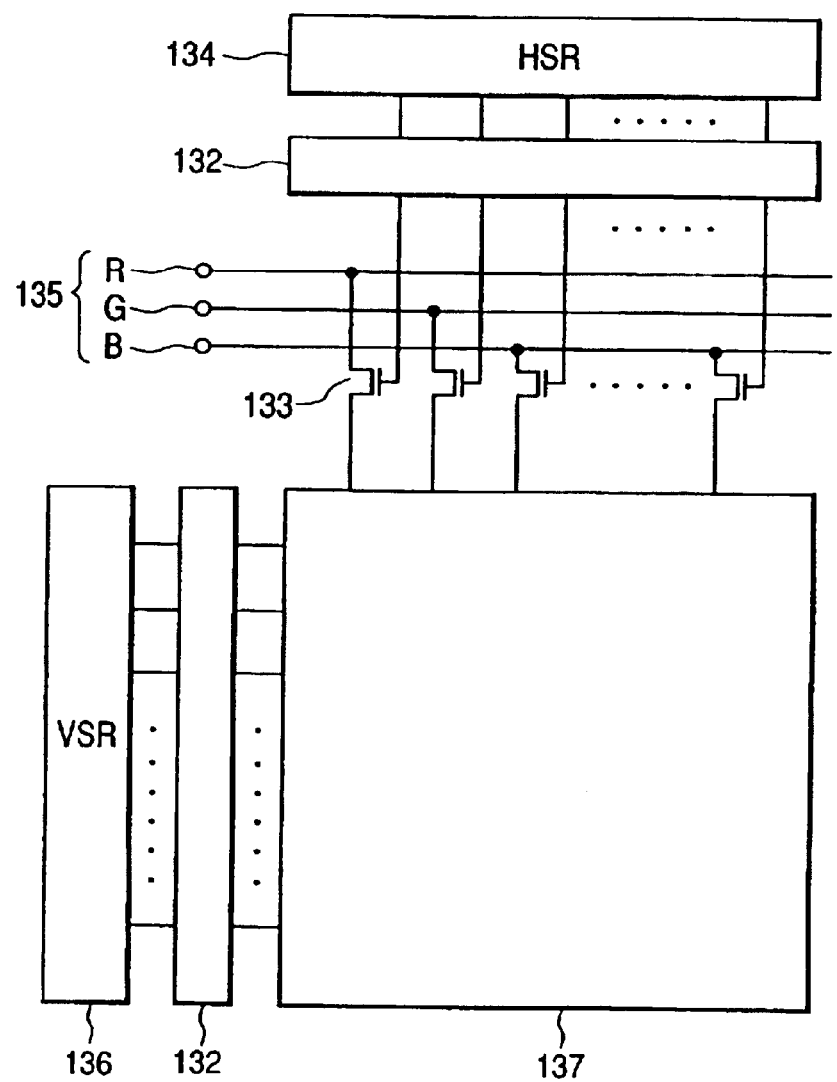
FIG. 22 is a block diagram of a liquid crystal device which makes use of the present invention.

Another structural example of the peripheral driving circuitry of the panel will be described below using FIG. 22. FIG. 22 is a schematic block diagram showing another structure of the peripheral driving circuitry of the panel. In FIG. 22, numeral 132 denotes level shifter circuits, 133 video signal sampling switches, 134 a horizontal shift register, 135 R, G and B video signal input terminals, 136 a vertical shift register, and 137 a display region.

The structure described above permits the logic circuits including the shift registers both for H and V to be driven by a very low value of about 1.5 to 5 V, irrespective of the amplitude of video signal, thereby achieving high speed and low power consumption. The horizontal and vertical shift registers SR herein can be scanned in both ways by a selection switch and are ready for alteration of placement etc. of the optical system without any change of the panel, which presents an advantageous decrease of cost because the same panel can be used for different series of products.

In FIG. 22, the video signal sampling switches 133 are of the one transistor configuration of single polarity, but it is not necessary to mention that they may be of the CMOS transmission gate configuration, whereby all input video lines can be written into the signal lines, without having to be limited to it.

The CMOS transmission gate configuration will exhibit a problematic deflection of video signal because of the difference between the areas of the NMOS gate and the PMOS gate and the difference between overlap amounts of the gate and the source/drain. This is solved as follows. The deflection can be prevented by connecting the source and drain of MOSFETs having the gate amount equal to approximately half the gate amount of MOSFETs of the sampling switches 133 of the respective polarities to the signal lines and applying negative phase pulses thereto. This allowed excellent video signals to be written into the signal lines. This permitted higher definition display.

Figure 23:
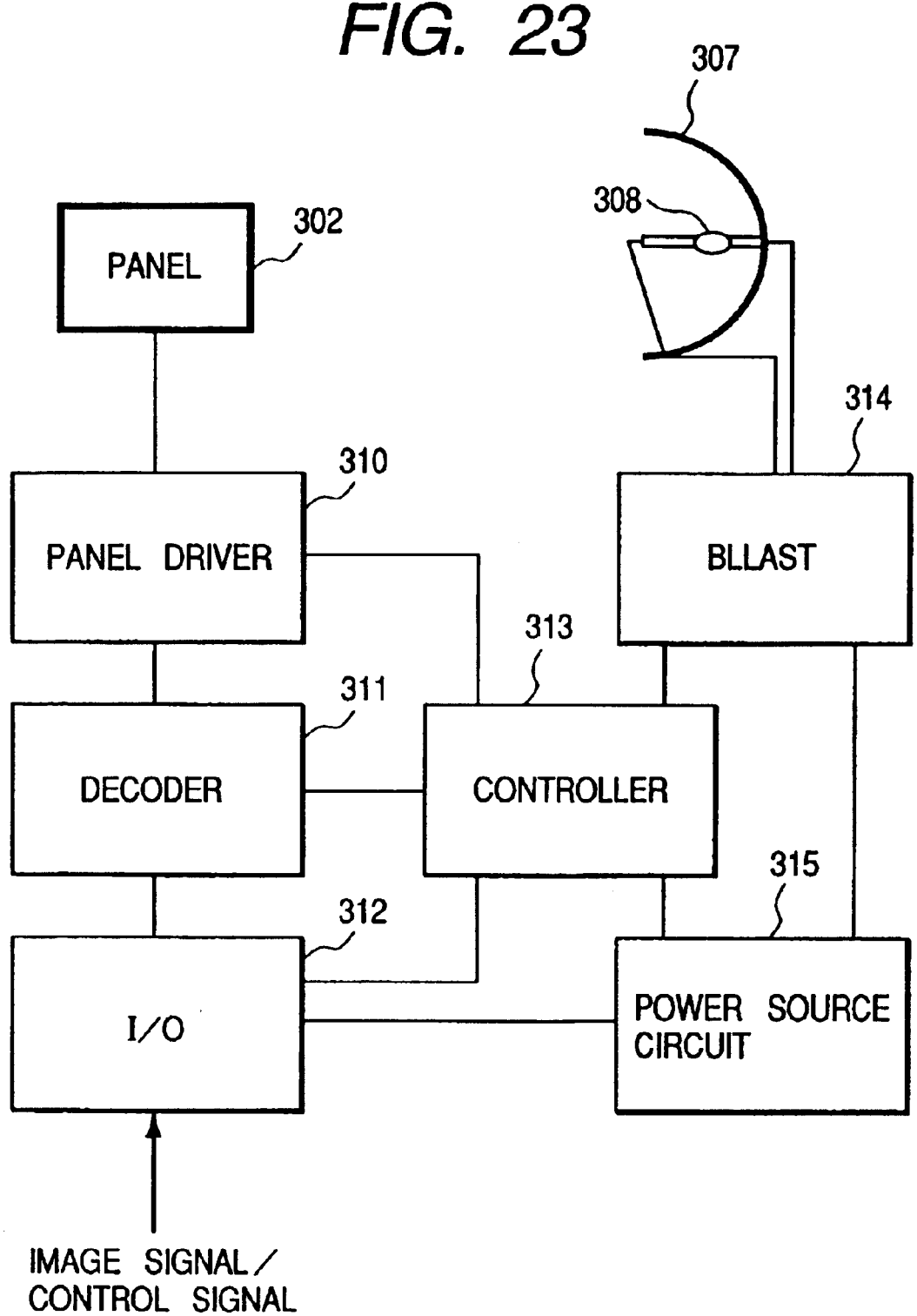
FIG. 23 is a block diagram illustrating a driving circuit system of the projection type liquid crystal display device which makes use of the present invention.

The overall block diagram of the driving circuit system of the present projection-type liquid crystal display device is illustrated in FIG. 23. Numeral 310 represents a panel driver, which inverts the polarities of R, G and B video signals, which forms liquid crystal driving signals amplified by a predetermined voltage amplification and which forms driving signals of the opposite electrode 224, various timing signals, and so on. Numeral 312 is an interface, which decodes various video and control transmission signals to standard video signals and the like. Numeral 311 stands for a decoder, which decodes the standard video signals from the interface 312 to R, G and B primary color video signals and synchronous signals. Numeral 314 indicates a ballast, which activates an arc lamp 308 in an ellipsoidal reflector 307. Numeral 315 is a power supply circuit, which supplies power to each circuit block. Numeral 313 designates a controller including a control section not illustrated, which totally controls each of the above circuit blocks. As described, the present projection-type liquid crystal display device has the driving circuit system which is a very popular one for the single panel projector, and it can display a color image with good quality but without RGB mosaic as stated previously, particularly without imposing loads on the driving circuit system.

Figure 24:
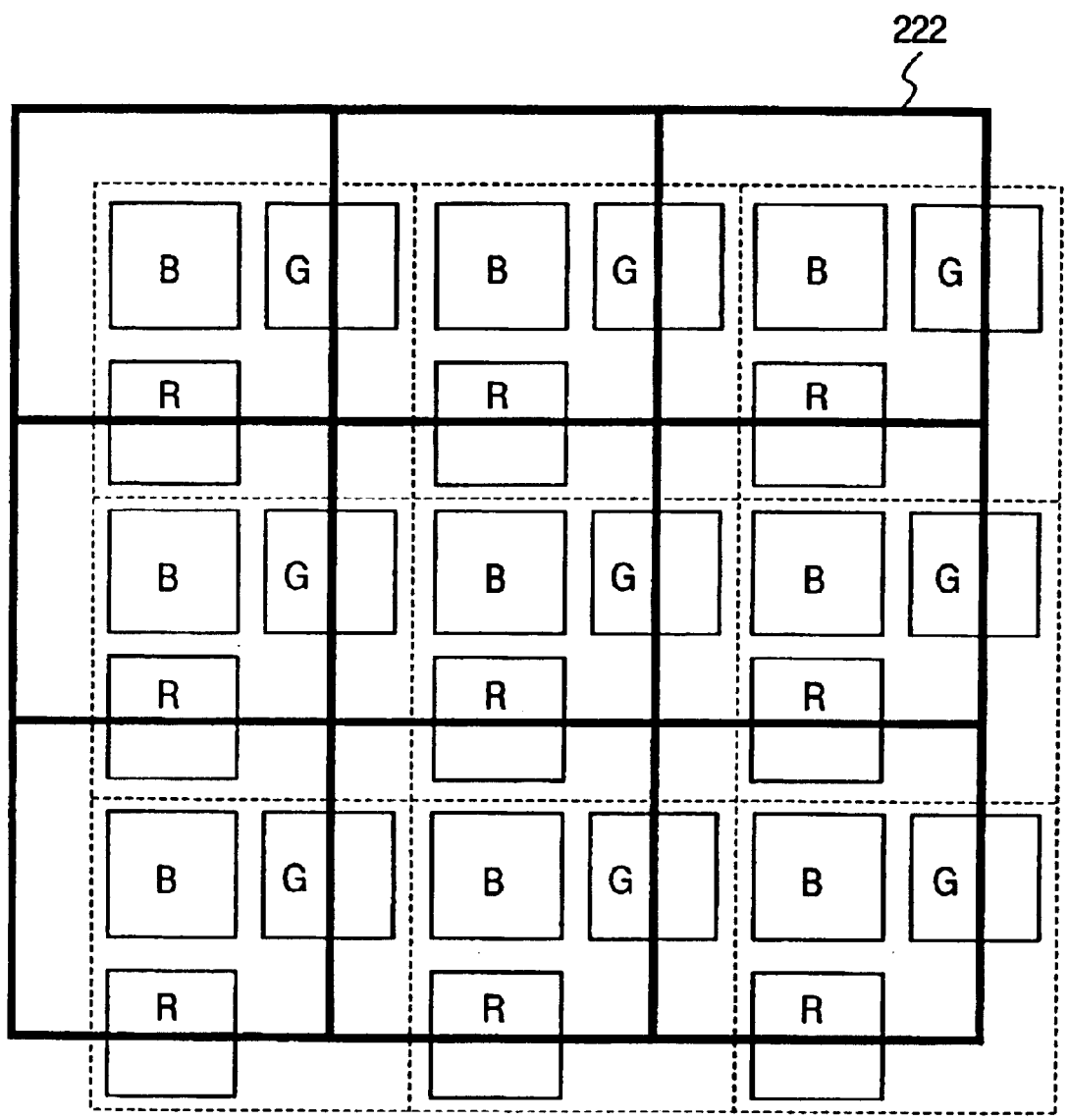
FIG. 24 is a partially enlarged, top plan view of a liquid crystal panel which makes use of the present invention.

FIG. 24 is a partially enlarged, top plan view of another example of the liquid crystal panel in the present embodiment. In this example the B pixel electrodes are arrayed at the positions immediately below the centers of microlenses 222, the G pixels are arrayed alternately and horizontally with respect to the B pixels, and the R pixels are arrayed alternately and vertically with respect to the B pixels. This array can also achieve the same effect as the previous example by employing such a configuration that the B light is incident normally and the R and G light is incident obliquely (at the same angle but in different directions) so as to emit the reflected light from the R, G and B pixel unit composing a picture element through one common microlens. Still another example is such that the R pixels are arrayed at the positions immediately below the centers of the microlenses 222 and the other color pixels, the G and B pixels, are arrayed alternately with respect to the R pixels horizontally or vertically.

Figure 25:
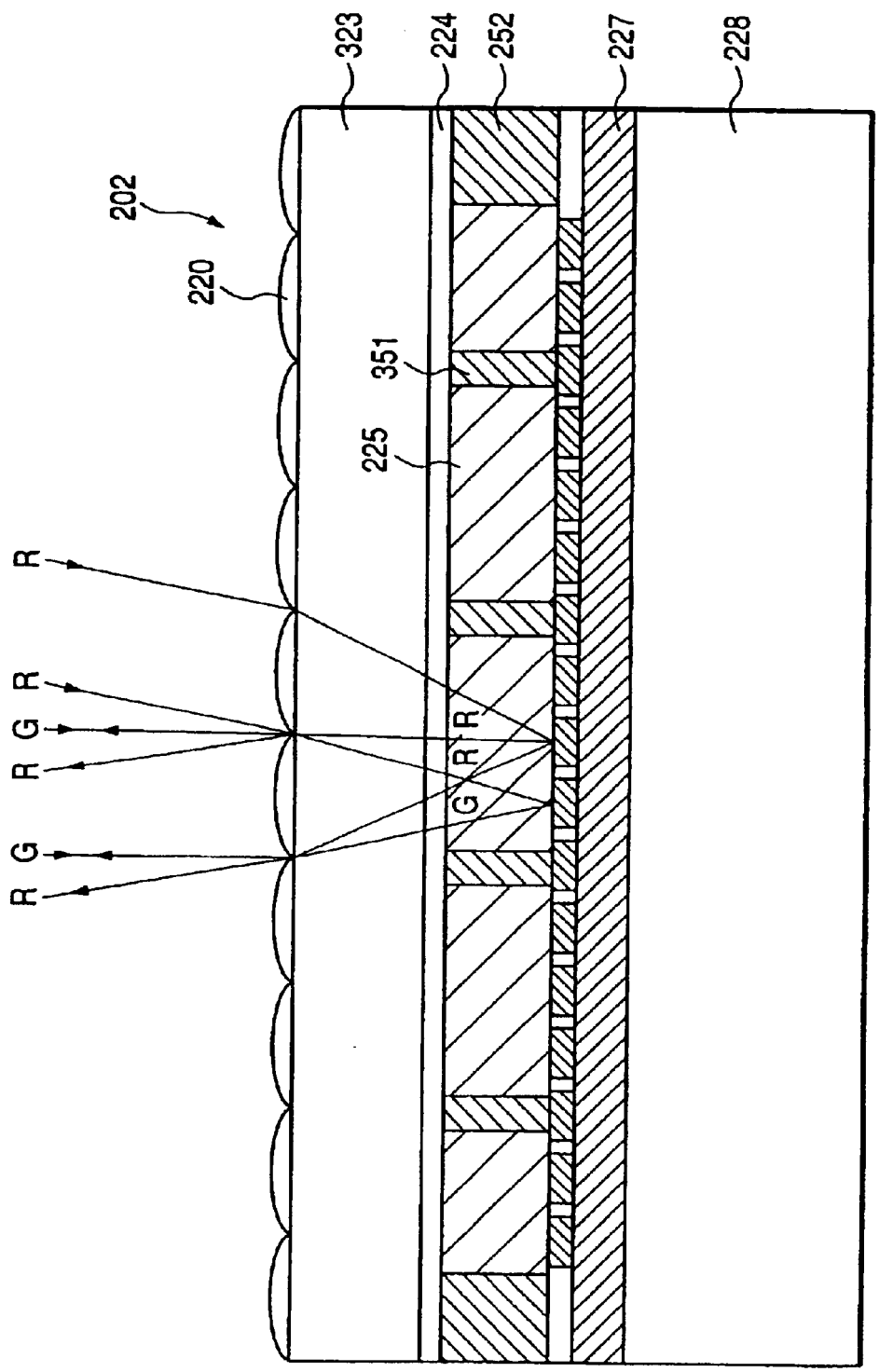
FIG. 25 is a sectional view of a liquid crystal panel which makes use of the present invention.
Figure 26A:
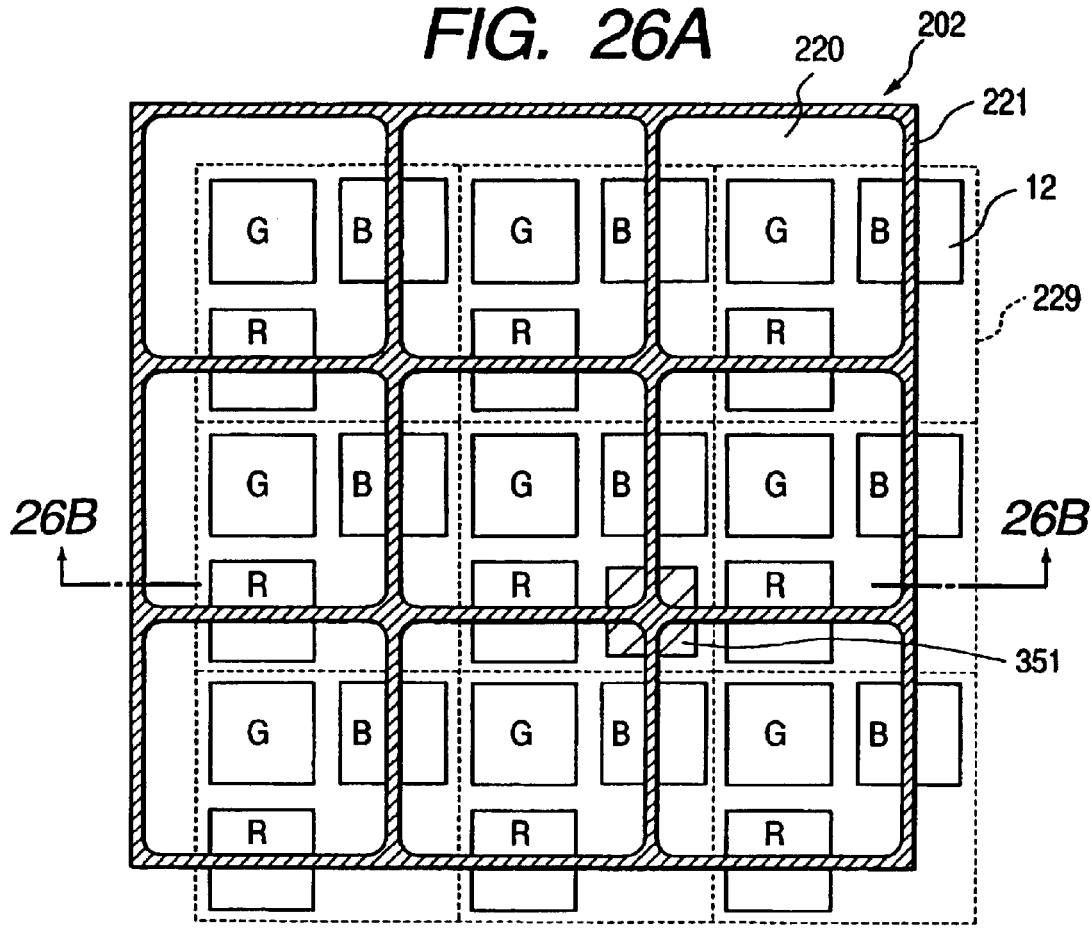
FIGS. 26A and 26B are a partially enlarged, top plan view and a partially enlarged, sectional view of a liquid crystal panel which makes use of the present invention.
Figure 26B:
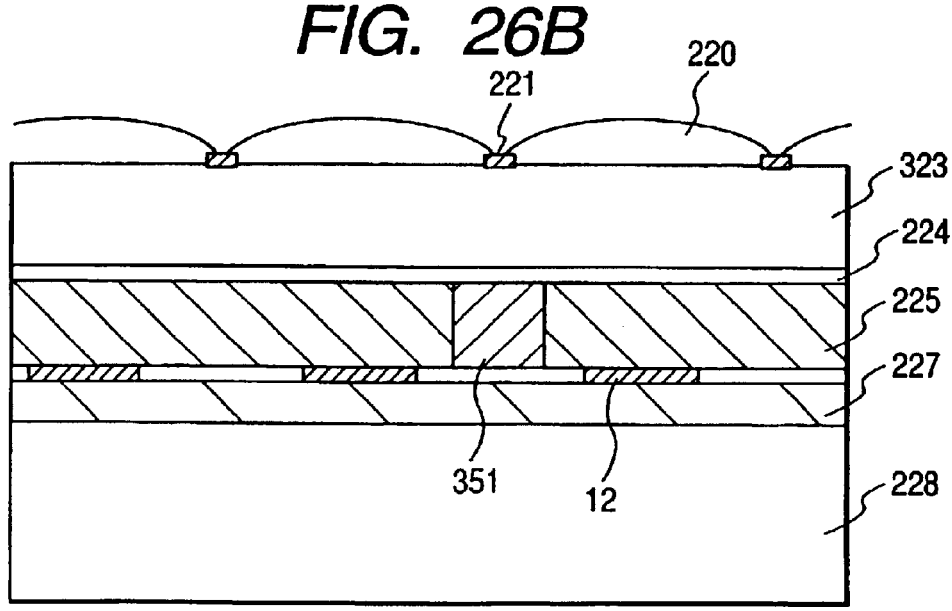

Further, FIG. 25 shows another embodiment of the liquid crystal panel according to the present invention. This figure is a partially enlarged, sectional view of the present liquid crystal panel 202. The present embodiment is different from the previous embodiment in which the opposite glass substrate is a glass sheet 323 and the microlenses 220 are formed on the glass sheet 323 by the so-called reflow method using thermoplastic resin. Further, spacer columns 351 are formed in non-pixel portions by photolithography of photosensitive resin. A partial top plan view of the liquid crystal panel 202 is illustrated in FIG. 26A. As seen from this figure, the spacer columns 351 are formed at a predetermined pitch of pixels in the non-pixel regions at corner portions of the microlenses 220. FIG. 26B is a sectional view along 26B–26B in FIG. 26A through this spacer column 351. The forming density of the spacer columns 351 is preferably determined so as to form a matrix pattern at the pitch of 10 to 100 pixels and has to be set so as to satisfy both reciprocal parameters against the number of spacer columns, i.e., to satisfy planarity of the glass sheet 323 and the injection property of the liquid crystal. The present embodiment is provided with the shielding layer 321 of a metal film pattern, which prevents leakage light from the boundary part of each microlens from entering the inside. This prevents a decrease in saturation (due to a mixture of the colors of the respective primary color image beams) and a decrease in the contrast of the projected image due to the leakage light.

Seventh Embodiment

Figure 27:
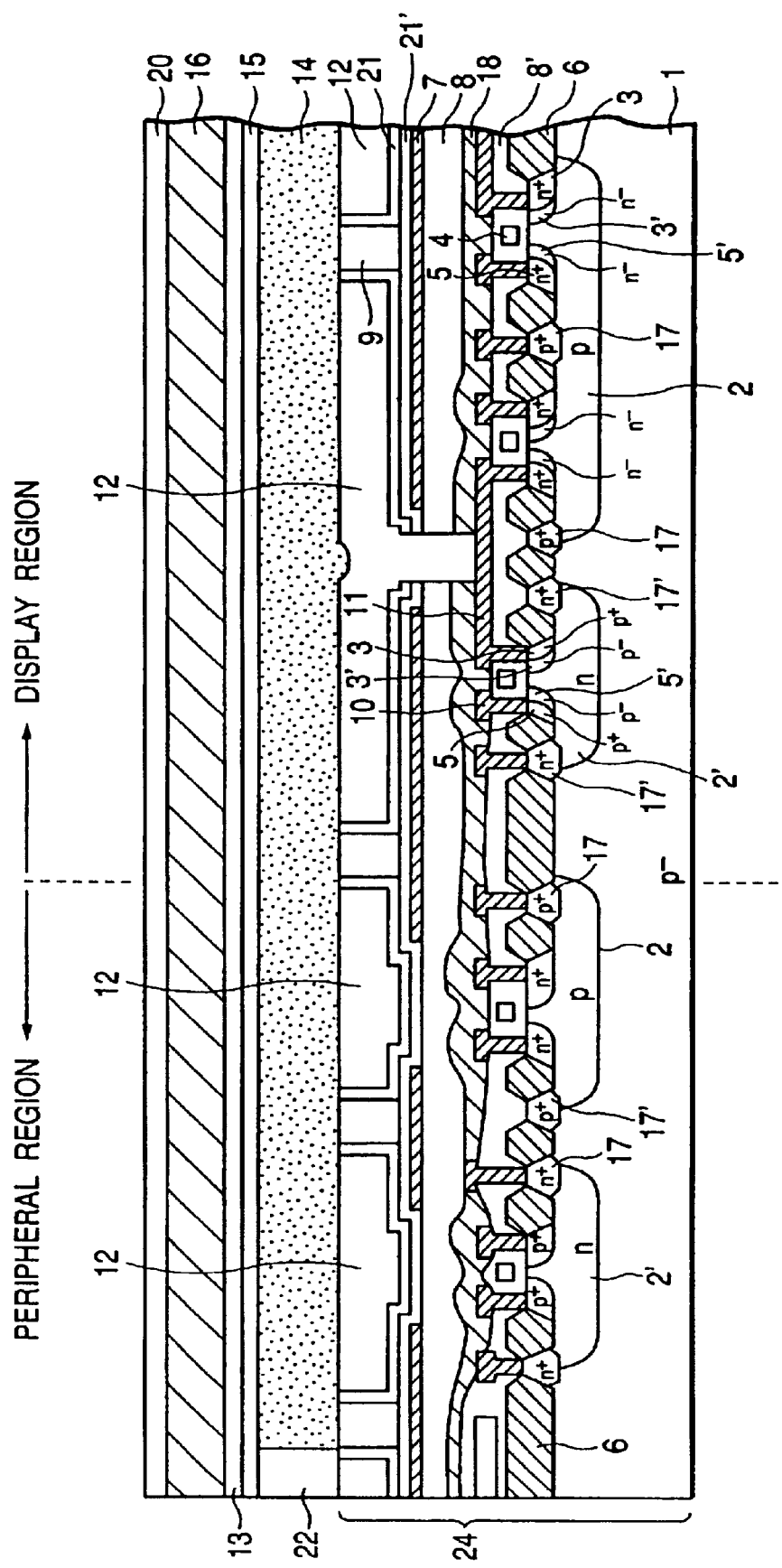
FIG. 27 is a sectional view of a liquid crystal panel which makes use of the present invention.

A cross-section of the liquid crystal panel section making use of the present invention is illustrated in FIG. 27. In the figure, numeral 1 designates a semiconductor substrate, 2, 2' p-type and n-type wells, respectively, 3, 3' source regions of transistors, 4 gate regions, and 5, 5' drain regions.

As illustrated in FIG. 27, since a high voltage of 20 to 35 V is applied to the transistors in the display region, the source and drain layers are not formed in a self-aligned manner with respect to the gate 4, but they are formed with offsets; between them there are low concentration ⁻ layers in the p-wells and low concentration p⁻ layers in the n-wells, as shown by the source regions 3' and drain regions 5'. The offset amounts are preferably 0.5 to 2.0 µm. On the other hand, a partial peripheral region of the peripheral circuits is illustrated on the left side of FIG. 27, and some circuits in the peripheral region have the source and drain regions formed in a self-aligned manner with respect to the gate electrode. The self-alignment structure is employed for some of the peripheral circuits because some of the peripheral circuits are logical circuits which can be driven by 1.5 to 5 V and because the self-alignment structure is desirable for a decrease of the transistor size and for an increase of transistor driving power. The offsets of the source and drain were described herein, but, in addition to the presence or absence thereof, it is also effective to change the offset amounts according to their withstand voltages or to optimize the gate length.

The semiconductor substrate 1 is made of a p-type semiconductor, and the potential of the substrate is the lowest potential (normally, the ground potential). Applied to the n-type wells is the voltage applied to the pixels, i.e., 20 to 35 V, in the case of the display region, but the logic driving voltage of 1.5 to 5 V in general in the case of some of the peripheral circuits, i.e., in the case of the logical circuits. According to the above structure, optimum devices can be constructed according to the respective voltages, and high pixel density display can be implemented not only by a decrease in chip size, but also by an increase in driving speed.

In FIG. 27, reference numeral 6 designates a field oxide film, 8' an insulating layer of PSG (phosphorus glass), NSG (nondoped glass), BPSG, or the like, 10 the source electrodes connected to the data wire, 11 the drain electrodes connected to the pixel electrodes, and 12 the pixel electrodes also serving as a reflector. Numeral 7 represents a shielding layer for covering the display region and peripheral region, which is preferably made of a material selected from Ti, TiN, W, Mo, and layered films being combinations thereof and which is formed not only in the display region but also in the region of the peripheral circuitry by a single step for depositing the film by vacuum evaporation, sputtering, or the like and thereafter patterning it. Since this shielding layer 7 covers almost the entire surface of the chip, it improves the shielding property to intercept the illumination light and has the effect of preventing transistor malfunction due to leakage light. As illustrated in FIG. 27, the above shielding layer 7 covers the transistors, etc. except for connecting parts between the pixel electrodes 12 and the drain electrodes 11 in the display region, but the shielding layer 7 in the peripheral circuit region is formed so that the shielding layer 7 is removed from the regions so as not to have heavy wire capacitance, such as the video lines and clock lines. Since there is a possibility that the illumination light enters the inside through the portions without the shielding layer 7 to cause circuit malfunction, the regions without the shielding layer 7 are designed to be covered by the layer of the pixel electrode 12.

Numeral 8 denotes an insulating layer below the shielding layer 7, and flatness of the insulating layer 8 is assured by performing a flattening process by SOG (Spin On Glass) on a P—SiO (SiO produced by plasma enhanced CVD) layer 18 and further covering the P—SiO layer 18 with a plasma SiN or P—SiO layer 8. It is needless to mention that the flattening process may be a flattening method for forming a P-TEOS (Phospho-Tetraethoxy-Silane) film, covering it by a P—SiO layer 8, and thereafter polishing the insulating layer 8 by CMP to flatten it, as well as the flattening method by SOG.

Further, numeral 9 designates an insulating layer provided between the pixel electrodes 12, this insulating layer 9 separating the pixel electrodes from each other. A material suitable for the insulating layer 9 is selected from silicon oxide films such as P—SiO, NSG, PSG, and BPSG.

Numerical symbols 21 and 21' represent insulating layers provided between the reflective electrode 12 and the shielding layer 7 of each pixel, and the pixel electrode 12 and shielding layer 7 compose a storage capacitor through the insulating layers 21 and 21'. Materials effectively used for the insulating layers 21 and 21' are high permittivity materials such as P—SIN and $Ta_2O_5$.

As to the shielding layer 7, insulating layer 9, insulating layers 21 and 21', and reflective electrodes 12, each layer is formed simultaneously by a single step in the peripheral region and in the display region.

Further, numeral 14 indicates a liquid crystal material such as PNLC, which is the polymer network liquid crystal, or PDLC, which is the polymer dispersed liquid crystal, numeral 15 a common transparent electrode opposed to the reflective electrodes 12, numeral 16 a transparent opposite substrate, 19 the display region, 20 an anti-reflection film, and 22 a seal material for retaining the semiconductor substrate and opposite substrate, which also controls the gap between the substrates. Further, symbols 17, 17' represent high concentration impurity regions.

Next, numeral 13 designates a film for anti-reflection provided between the common transparent electrode 15 and the opposite substrate 16, which is arranged so as to decrease the reflectance at the interface in view of the refractive index of the liquid crystal at the interface. In that case, a preferred material is an insulating film having a smaller index of refraction than those of the opposite substrate 16 and transparent electrode 15.

As illustrated in FIG. 27, the high concentration impurity layers 17, 17', having the same polarities as the wells 2, 2' formed in the lower part of the transistors, are formed in the peripheral part and the inside of the wells 2, 2'; even with application of a signal of high amplitude to the source, the well potential is fixed to the desired potential by the low resistance layer and is stable, which implements a high quality image display. Further, the high concentration impurity layers 17, 17' are provided through the field oxide film between the n-type well 2' and the p-type well 2, and this structure eliminates the need for a channel stop layer immediately below the field oxide film, which is normally used for the MOS transistors.

These high concentration impurity layers 17, 17' can be made at the same time as formation of the source and drain layers, which decreases the number of masks and the number of manhours in the production process, thereby decreasing the cost.

As illustrated in FIG. 27, the well regions 2' are of the conduction type opposite to that of the semiconductor substrate 1. Therefore, the well regions 2 are of the p-type in FIG. 27. The p-type well regions 2 and the n-type well regions 2' are desirably doped with a higher concentration of impurities than the semiconductor substrate 1 is. Specifically, when the impurity concentration-of the semiconductor substrate 1 is $10^{14}$ to $10^{15}$ (cm$^{-3}$), the impurity concentration of the well regions 2 is desirably $10^{15}$ to $10^{17}$ (cm$^{-3}$).

The source electrodes 10 are connected to the data wire through which the signals for display are sent, and the drain electrodes 11 are connected to the pixel electrodes 12. For these electrodes 10, 11, Al, AlSi, AlSiCu, AlGeCu, or AlCu wires are normally used. When a barrier metal layer of Ti and TiN is employed as a contact surface between the bottom of these electrodes 10, 11 and the semiconductor, stable contact can be implemented. The contact resistance can also be decreased. The pixel electrodes 12 desirably have a flat surface and are made of a highly reflective material. Applicable materials are Cr, Au, and Ag, in addition to Al, AlSi, AlSiCu, AlGeCu, AlC, and AlCu being ordinary wire metals. Further, the flat pixel electrodes 12 can be produced by deposition of high temperature Al having a reflow nature.

In the final step for production of a semiconductor device, the surface of the pixel electrode layer 12 is polished by CMP (Chemical Mechanical Polishing), thereby simultaneously achieving improvement in flatness and separation between the pixel electrodes 12.

Next described in detail is a method for producing the pixel electrode structure, including the method for separation between the pixel electrodes, which is characteristic of the present invention.

Figure 28A:
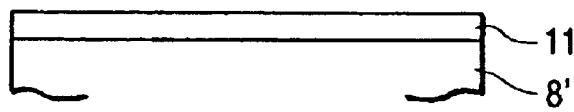
FIGS. 28A, 28B, 28C and 28D are schematic step diagrams showing a method for producing the liquid crystal panel of the present invention.
Figure 28B:
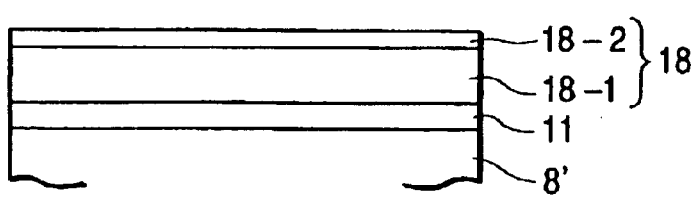

FIG. 28A shows a state after completion of processing of the drain electrode layer 11 on the insulating layer 8'. In FIG. 28B, a layer of P—SiO indicated by 18-1 is deposited in a thickness of 5000 Å by plasma enhanced CVD, and it is further coated with SOG of 2200 Å indicated by 18-2. Here, the double coatings of SOG are given for the purpose of improving flatness.

Figure 28C:
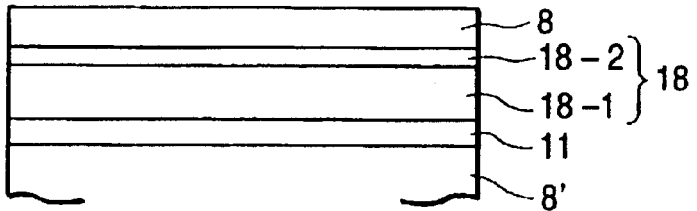

Subsequently, in FIG. 28C, a layer of P—SiO is deposited as an insulating film 8 in a thickness of 4000 Å on the SOG layer by plasma enhanced CVD. As described previously, the insulating layer 8 can also be made of P—SiN or the like by plasma enhanced CVD.

Figure 28D:
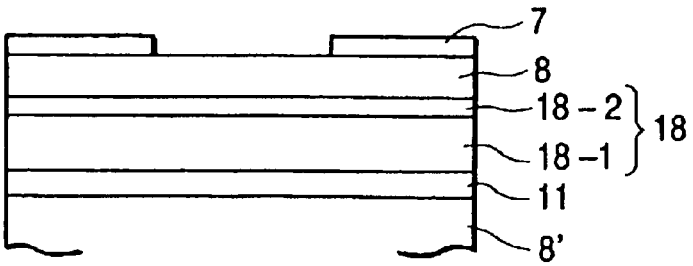

In FIG. 28D, a film of Ti is deposited as a shielding layer 7 in a thickness of 3000 Å by sputtering, and it is then processed in a desired pattern, for example, by removing the regions to form the through hole portions, which will be the contact holes between the pixel electrode and the drain electrode. The processing of Ti is carried out after patterning of photoresist by an ECR plasma etching system with Cl$_2$/BCl$_3$ mixed gases.

Figure 29E:
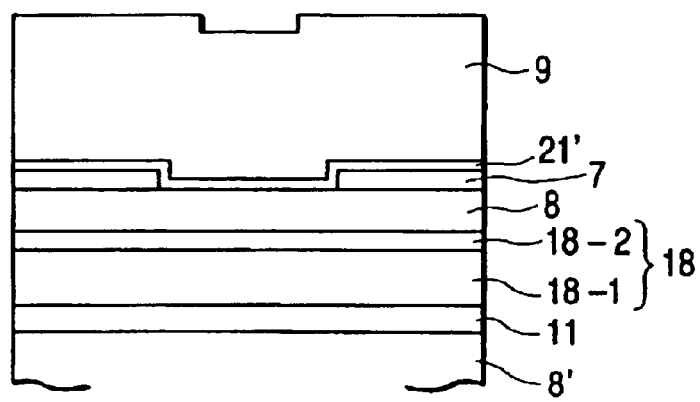
FIGS. 29E, 29F and 29G are schematic step diagrams showing the method for producing the liquid crystal panel of the present invention.

In FIG. 29E, a film of P—SIN is deposited as a capacitor film 21' in a thickness of 2000 Å by P-CVD, and then an insulating layer 9 for separation between the pixel electrodes is deposited. Numeral 9 is a film of P—SiO deposited in a thickness of 14000 Å by plasma enhanced CVD.

Figure 29F:
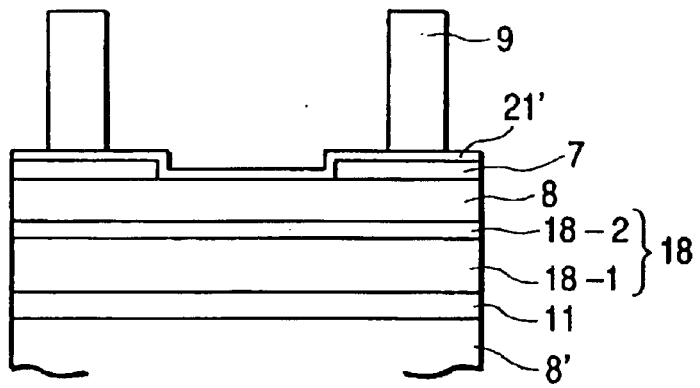

In FIG. 29F, the insulating layer 9 is processed into a pattern for separation between the pixel electrodes. The processing is carried out after patterning of photoresist and by use of a parallel plate plasma etching system with CF$_4$/Ar mixed gases under such conditions as CF$_4$/Ar=60/800 ccm, pressure of 1.0 Torr, high frequency power supply of 380 kHz, and power supply of 750 W. Under the etching conditions herein, the etching rate of P—SiO as an etched film is about 6500 Å/min, whereas the etching rate of P—SiN as a base layer is about 2500 Å/min. Therefore, the etch selectivity is approximately 2.5, so that P—SiN works as an etching stopper layer.

Subsequently, in FIG. 29G, deposited is an insulating layer 21 for the pixel electrodes and shielding layer 7 to form a capacitor with 21'. The layers 21' and 21 are the P—SiN layers of 2000 Å deposited by plasma enhanced CVD; but their preferred thicknesses can be selected in consideration of switching characteristics of devices or the withstand voltage of each film, without having to be limited each to 2000 Å, and Ta$_{2O5}$ or the like can also be selected as a material therefor.

Figure 30H:
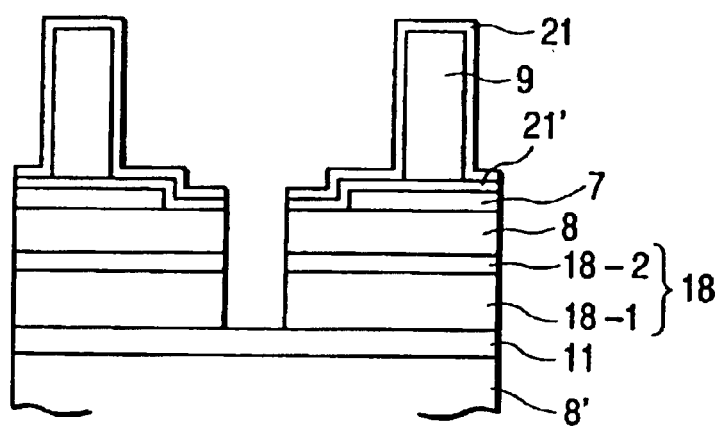
FIGS. 30H, 30I and 30J are schematic step diagrams showing the method for producing the liquid crystal panel of the present invention.

In FIG. 30H, the through holes are made for connection between the drain electrode 11 and the pixel electrode. The processing of the through holes is carried out after, patterning of photoresist and by use of the parallel plate plasma etching apparatus with CF$_4$/CHF$_3$/Ar mixed gases.

Figure 30I:
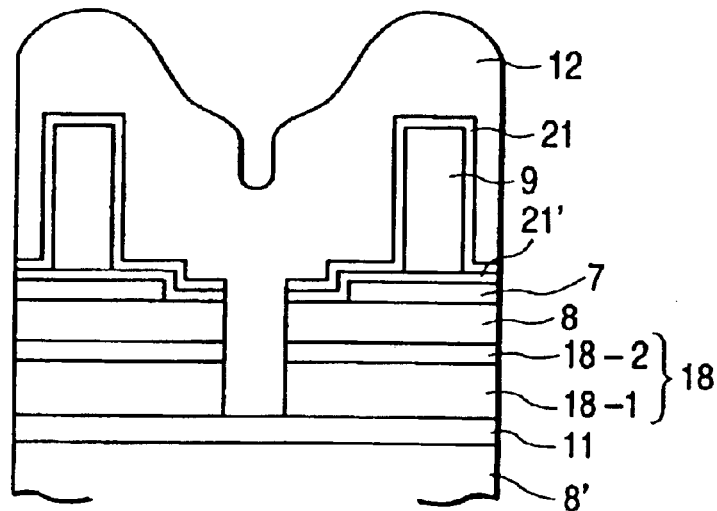

In FIG. 30I, a pixel electrode film 12 is deposited. High temperature Al having a reflow nature is used for the film 12. The structure of the pixel electrode film 12 will be described in detail. First, a film of TiN is deposited in a thickness of 2000 Å by sputtering, and then a film of Ti in a thickness of 300 Å by sputtering, in order to prevent reaction between the insulating film 21 and Al and in order to improve the reflow nature of high temperature Al deposited thereon. If high temperature Al were deposited immediately over the aforementioned film, it would be deposited in island patterns. Therefore, Al is deposited in a thickness of 7000 Å by sputtering without heating the wafer. In the last step, the wafer is heated to 425° C., high temperature Al is deposited in a thickness of 17000 Å by sputtering, and it is kept at 425° C. for several minutes after the deposition to effect so-called Al reflow. The present embodiment uses the pixel electrode film 12 deposited by the above techniques, in which the film structure of the pixel electrode film 12, the thicknesses of the respective films, the wafer temperature and retention time after the deposition of high temperature Al are important factors to determine the reflow nature. Since the filling property of the through holes by reflow is dependent on the diameter of the through holes, the pixel electrode film 12 can be formed by selecting suitable conditions for the diameter of the through holes. Therefore, the pixel electrode film is not limited to that 12 of the present embodiment.

The material for the pixel electrode film 12 can also be selected from Al, AlSi, AlSiCu, AlGeCu, AlCu, Cr, Au, Ag, and so on as described previously, which can be deposited by ordinary sputtering or vacuum evaporation.

Figure 30J:
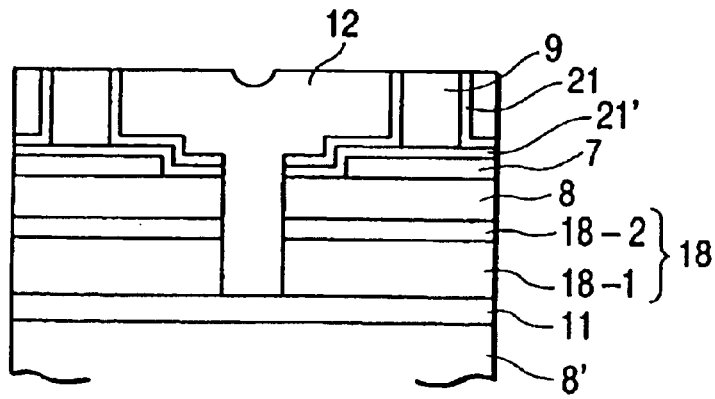

In the step of FIG. 30J, the metal CMP process is carried out as a final step for production of the semiconductor substrate part to effect separation between the pixel electrodes and, at the same time, the surface of Al is polished into a mirror finish state to be available as a reflector.

According to the above techniques, though the total thickness of the capacitor films 21, 21' is 4000 Å of P—SiN, which is equivalent to the thickness of the capacitor film used in conventional technology, the discontinuity surface of the capacitor film 21 at the root part of the insulating film 9 for separation of device is interrupted on the other capacitor film 21' thereby, and this improves the resistance against dielectric breakdown, which drastically decreases electrical failure due to capacitor leak.

Figure 29G:
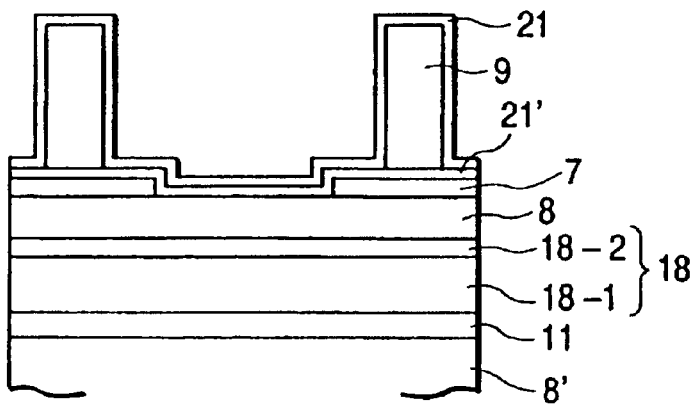

As apparent from FIGS. 28A to 28D, FIGS. 29E to 29G, and FIGS. 30H to 30J, only the film 21 ' can also be utilized as a capacitor film and the step of FIG. 29G can be omitted in that case. In the present embodiment, the film 21' serves as an etching stop layer, and it suffers some roughness of surface and adsorption of fluorine of an etchant to the surface thereof. Therefore, the layer 21 is positively deposited thereon in order to prevent corrosion or degradation of film quality where the pixel electrode film 12 is deposited immediately over it.

Eighth Embodiment

Figure 31:
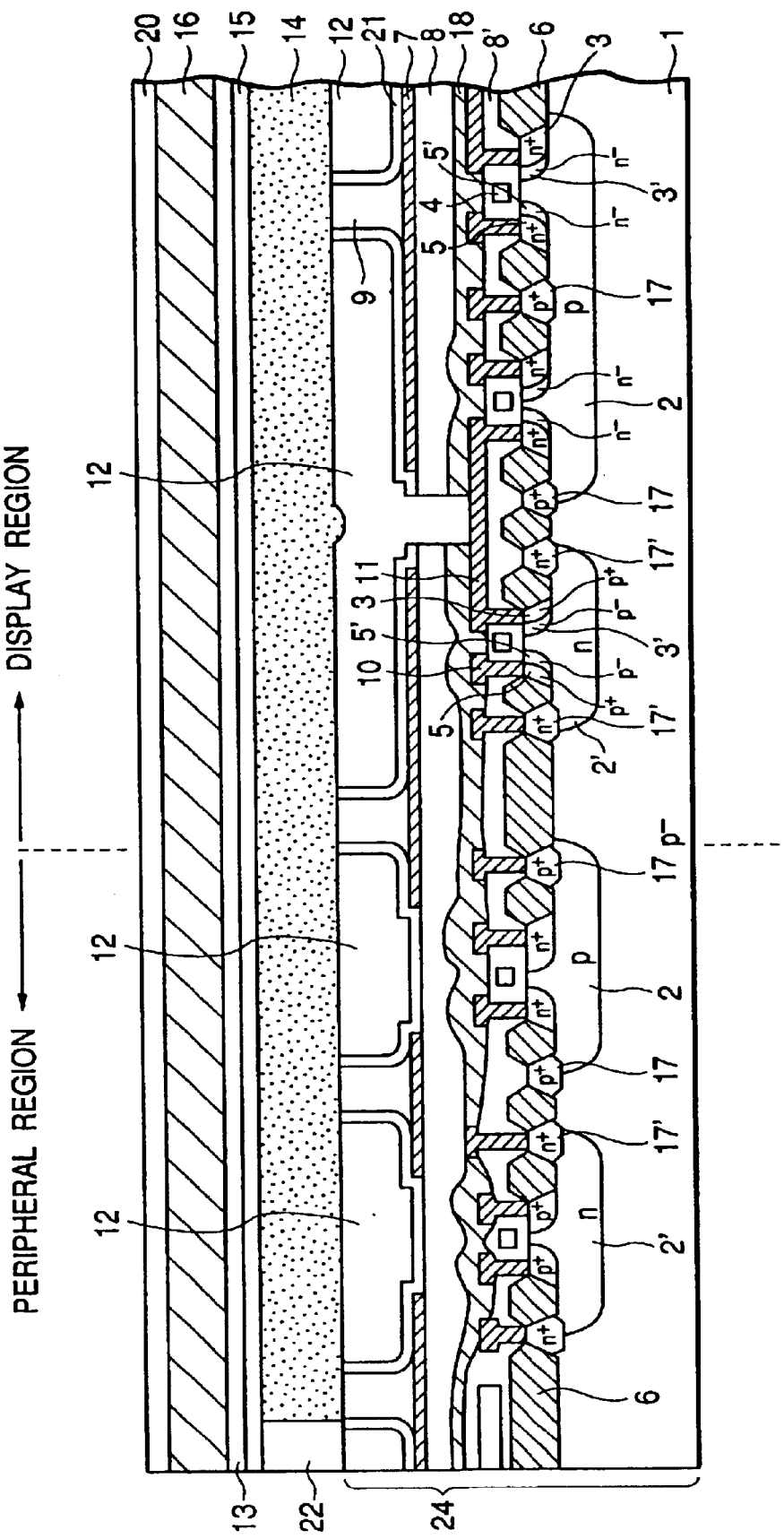
FIG. 31 is a sectional view of a liquid crystal panel which makes use of the present invention.
Figure 32A:
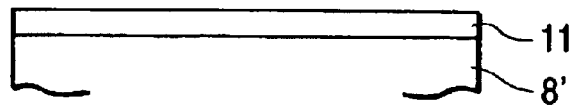
FIGS. 32A, 32B, 32C and 32D are schematic step diagrams showing a method for producing the liquid crystal panel of the present invention.
Figure 32B:
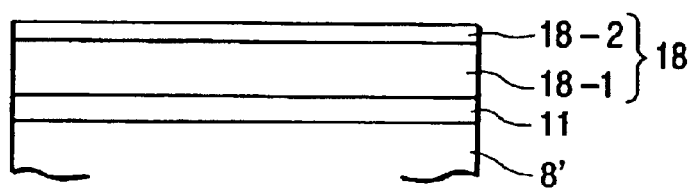
Figure 32C:
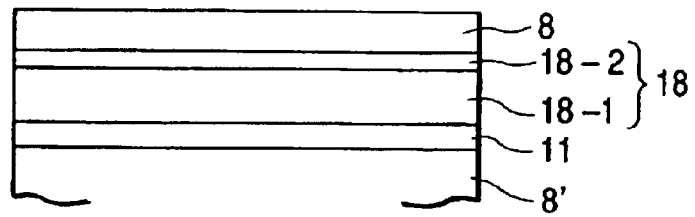
Figure 32D:
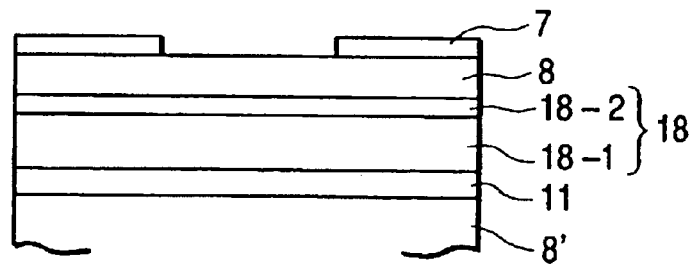

A liquid crystal panel which makes use of the present invention is illustrated in FIG. 31. Reference symbols are the same as in the embodiment illustrated in FIG. 27. The feature of the present embodiment is a round taper structure of the root portions of the insulating film 9 for separation of pixels as illustrated.

A method for producing the pixel electrode structure, including the method for separation between the pixel electrodes, will be described using FIGS. 32A to 32D, FIGS. 33E to 33G, and FIGS. 34H to 34J.

FIGS. 32A to 32D show the same steps as FIGS. 28A to 28D, which were detailed in Embodiment 7.

Figure 33E:
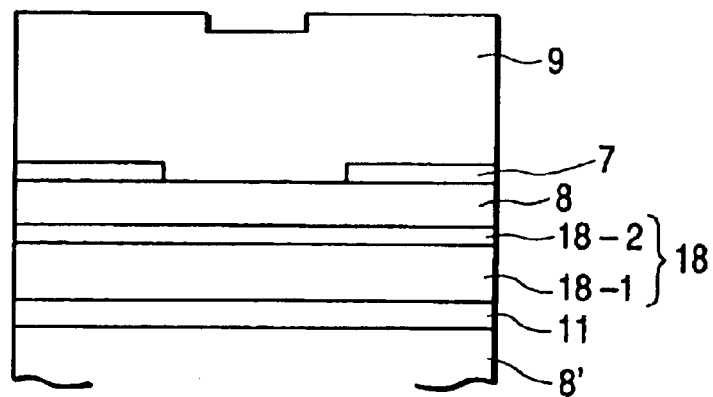
FIGS. 33E, 33F and 33G are schematic step diagrams showing the method for producing the liquid crystal panel of the present invention.

In FIG. 33E, an insulating layer 9 for separation between the pixel electrodes is deposited. The insulating layer 9 is a film of P—SiO deposited in a thickness of 14000 Å by plasma enhanced CVD.

Figure 33F:
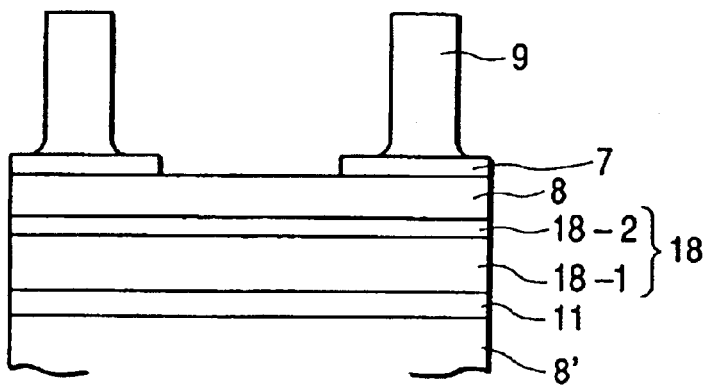

In FIG. 33F, the insulating layer 9 is processed into a shape to separate the pixel electrodes from each other, and in this step the root portions of the insulating layer 9 are made in the round taper structure. The processing is carried out after patterning of photoresist and by use of the parallel plate plasma etching system with $CF_4/CHF_3/Ar$ mixed gases under such conditions as a pressure of 1.0 Torr, high frequency power supply of 380 kHz, and power supply of 750 W.

In order to implement the round taper structure under the above conditions, step etching was employed to carry out etching with stepwise change of gas ratios of $CF_4/CHF_3/Ar$.

In step 1, under $CF_4/CHF_3/Ar$=60/01800 [ccm], etching at an etching rate of 6500 Å/min is carried on for one minute and fifty seconds to remove approximately 12000 Å of P—SiO. In step 2, under $CF_4/CHF_3/Ar$=50/10/800, etching at an etching rate of 5900 Å/min is carried on for ten seconds to remove about 1000 Å of P—SiO. Subsequently, in step 3, under $CF_4/CHF_3/Ar$=40/20/800, etching at an etching rate of 4700 Å/min is carried on for ten seconds to remove about 800 Å of P—SiO. In subsequent step 4, under $CF_4/CHF_3/Ar$=30/30/800, etching at an etching rate of 2700 Å/min is carried on for ten seconds to remove about 400 Å of P—SiO. These steps 1 to 4 complete the etching of P—SiO.

It is known with regard to the etching of an oxide film with $CF_4/CHF_3/Ar$ mixed gases that the etching profile becomes tapered with decreasing ratio of $CF_4$ and increasing ratio of $CHF_3$. The technique of the present embodiment is the step etching to gradually increase angles of the taper, thereby realizing etching in the round taper structure as a finished form.

The present example employs the technique of step etching, and further smoother round structure can be implemented by carrying out the etching under $CF_4+CHF_3$=60 [ccm] and with continuous change of $CF_4/CHF_3$ from 60/0 to 30/30.

Figure 33G:
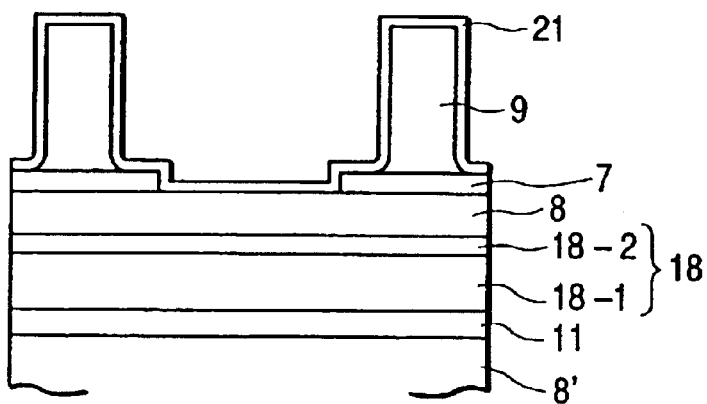

In FIG. 33G, the insulating layer 21 is deposited for the pixel electrode and the shielding layer 7 to form a capacitor. Numeral 21 is a layer of P—SiN deposited in a thickness of 4000 Å by plasma enhanced CVD. It is noted here that, in FIG. 33F, there is no discontinuity surface of P—SiN, because the root portions of the insulating film 9 for separation between the pixel electrodes are of the round taper structure.

Figure 34H:
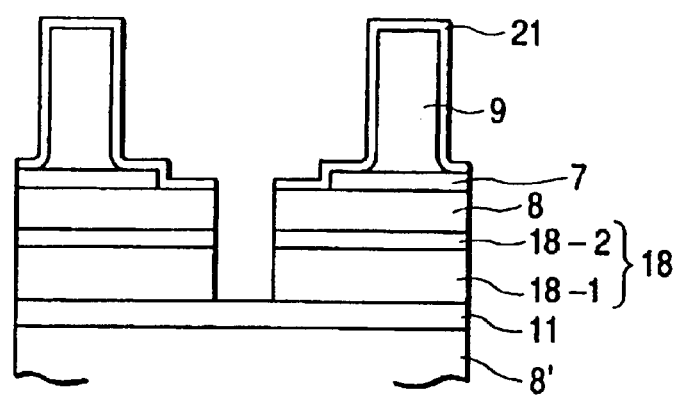
FIGS. 34H, 34I and 34J are schematic step diagrams showing the method for producing the liquid crystal panel of the present invention.
Figure 34I:
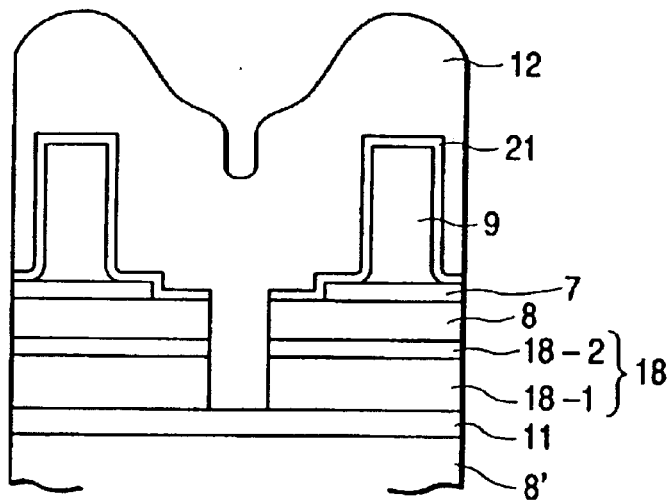
Figure 34J:
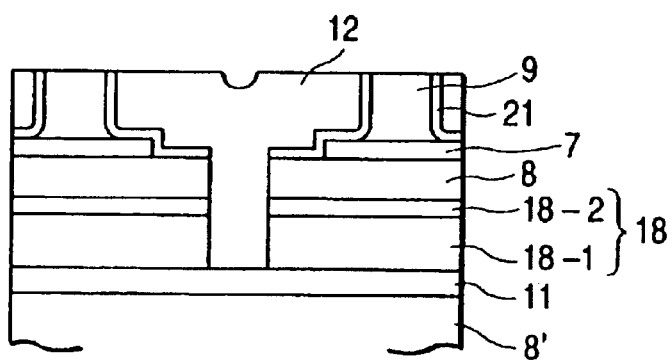

FIGS. 34H to 34J are the same as FIGS. 30H to 30J, which were detailed in Embodiment 7.

As described above, the present embodiment excludes the discontinuity surface of the capacitor film 21, which was present in the conventional example; because the resistance against dielectric breakdown thereof is purely dependent only on the quality of the film, the resistance is thus improved, as compared with the conventional technology, whereby the electrical failure due to capacitor leakage is decreased drastically.

The present embodiment employs a P—SiN film of 4000 Å as the capacitor film 21, and the P—SiN film can be thinned in the scope in which the resistance against dielectric breakdown can be assured as described above. Therefore, a reduction of cost can be realized by decreasing deposition time in FIG. 33G and decreasing etching time in FIG. 34H.

Further, in the case of the vertical structure of the insulating layer 9, breakdown at the root of the insulating layer 9 sometimes occurred because of insufficient mechanical strength thereof during the steps of FIGS. 33F, 33G, 34H and 34I; on the other hand, the strength is enhanced by the taper shape of the present embodiment, which solved the problem of failure in separation between pixels because of the breakdown at the root of the insulating layer 9.

Ninth Embodiment

Figure 35:
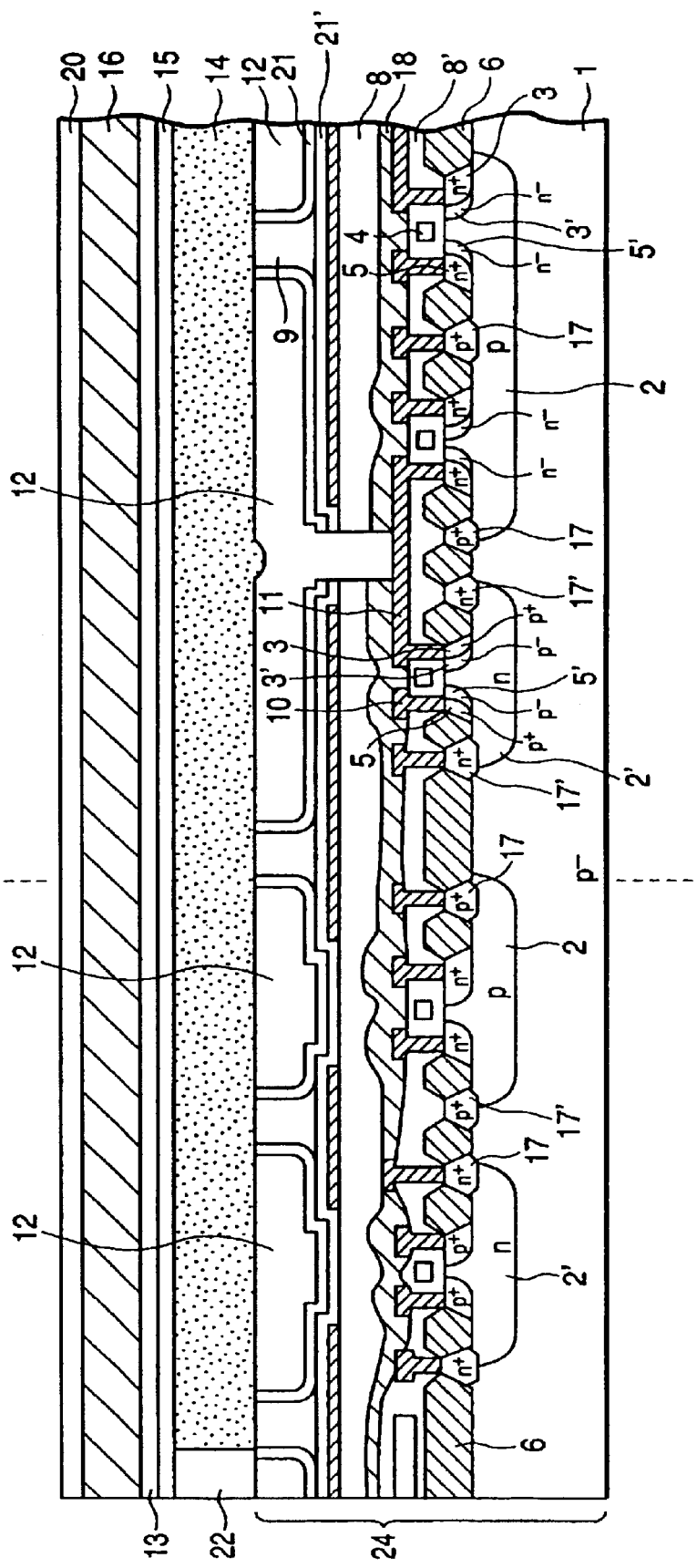
FIG. 35 is a sectional view of a liquid crystal panel which makes use of the present invention.
Figure 36A:
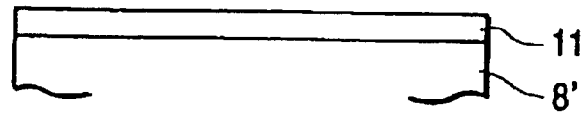
FIGS. 36A, 36B, 36C and 36D are schematic step diagrams showing a method for producing the liquid crystal panel of the present invention.
Figure 36B:
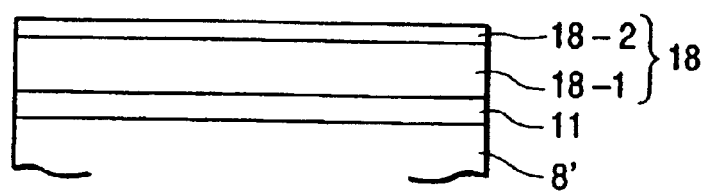
Figure 36C:
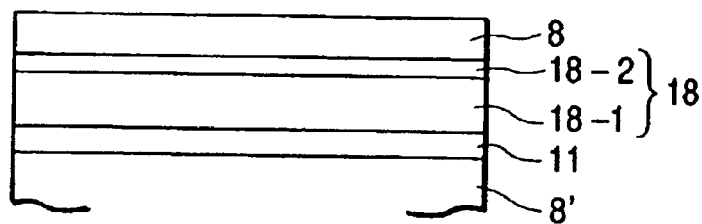
Figure 36D:
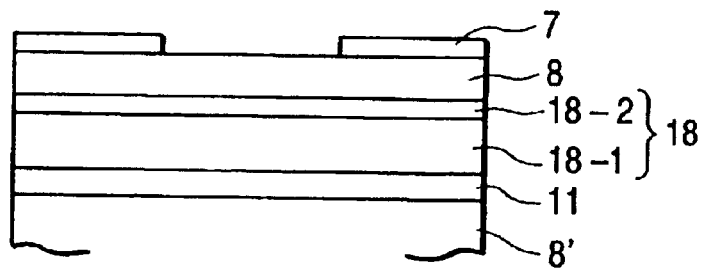

A liquid crystal panel which makes use of the present invention is illustrated in FIG. 35. The reference symbols denote the same parts as in FIG. 27. The present example is a combination of Embodiment 7 with Embodiment 8.

A method for producing the pixel electrode structure, including the method for separation between the pixel electrodes, will be described using FIGS. 36A to 36D to FIGS. 38H to 38J.

FIGS. 36A to 36D and FIG. 37E are the same as those in FIGS. 28A to 28D and FIG. 29E, and the detailed steps are as described in Embodiment 7.

Figure 37E:
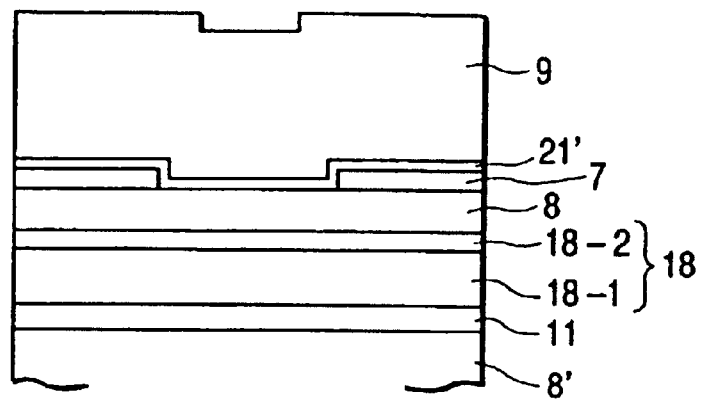
FIGS. 37E, 37F and 37G are schematic step diagrams showing the method for producing the liquid crystal panel of the present invention.
Figure 37F:
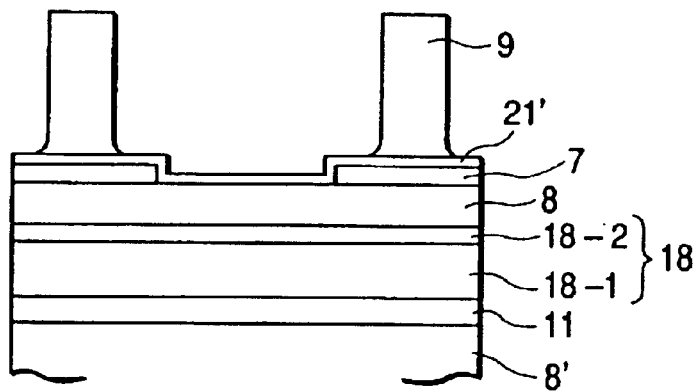

In FIG. 37F, the root of the insulating layer 9 is etched in the round taper structure by etching similar to that in FIG. 33F. The etching technique was detailed in Embodiment 8, but the etching conditions in step 4 are modified so that an etching rate of P—SiN is 900 Å/min against 2700 Å/min of the rate of P—SiO, so as to assure the etch selectivity of about 3. In the present embodiment, film loss of the P—SiN film as an etching stop layer is less than in Embodiment 7. Therefore, variations were smaller in capacitance than in Embodiment 7, where the film 21' was used as a capacitor film.

Figure 37G:
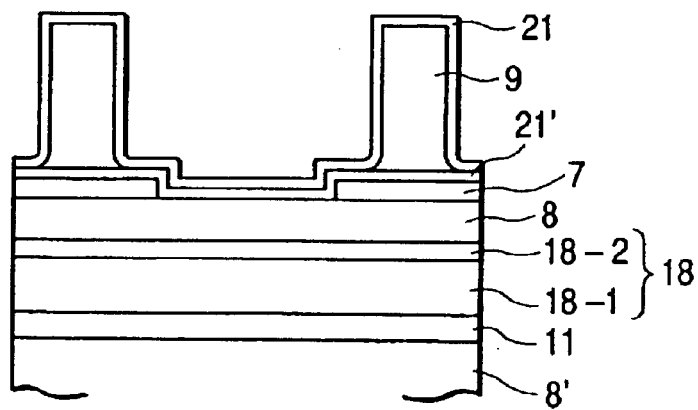

In the subsequent step of FIG. 37G, a film of PSiN is deposited in a thickness of 2000 Å. Since the root of the insulating layer 9 is of the round taper structure, the P—SiN film is formed without discontinuity surface, as in Embodiment 8.

Figure 38H:
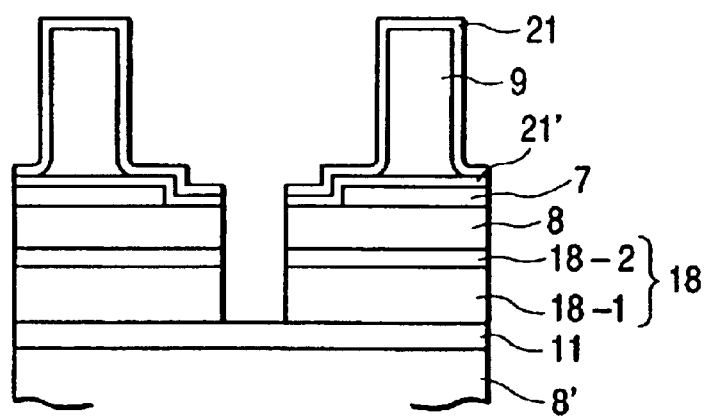
FIGS. 38H, 38I and 38J are schematic step diagrams showing the method for producing the liquid crystal panel of the present invention.
Figure 38I:
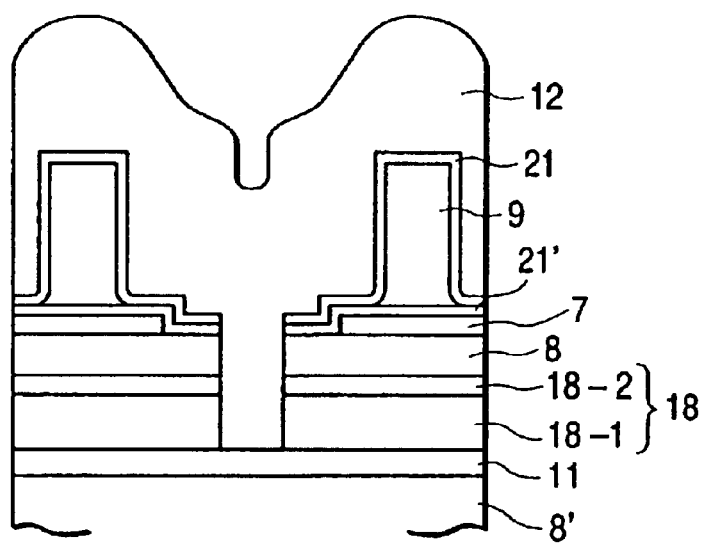
Figure 38J:
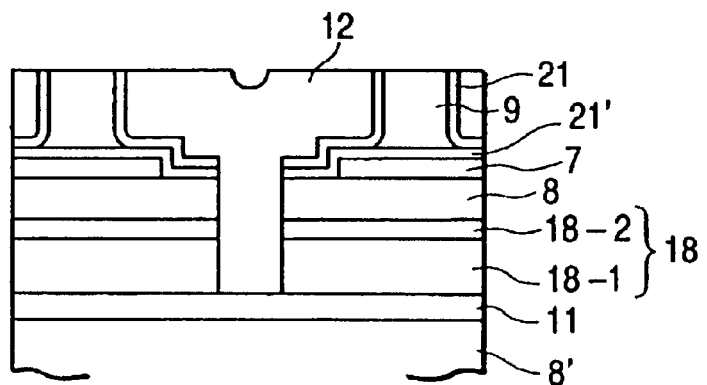
Figure 39A:
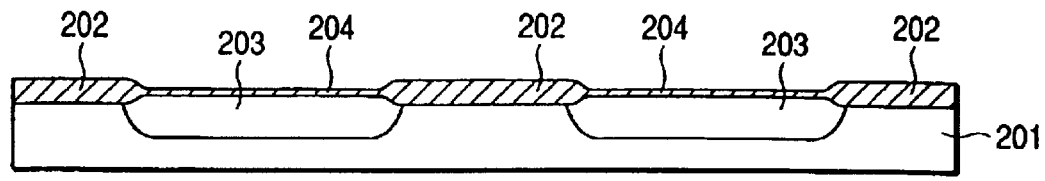
FIGS. 39A, 39B, 39C, 39D and 39E are sectional views of the production steps of an active matrix substrate and a liquid crystal element.
Figure 39B:
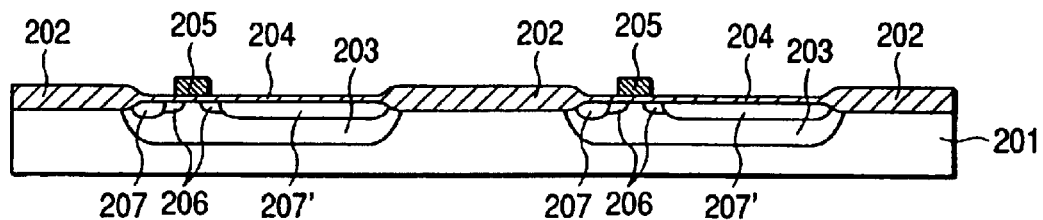
Figure 39C:
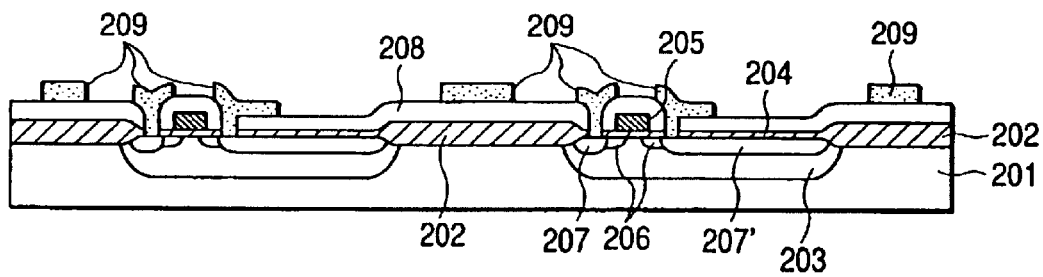
Figure 39D:
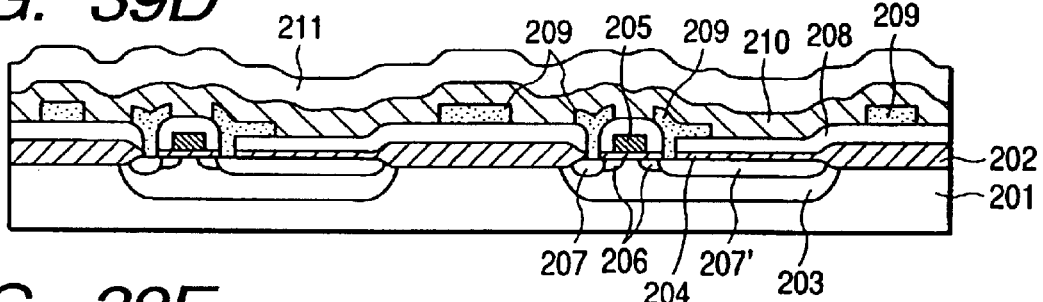
Figure 39E:
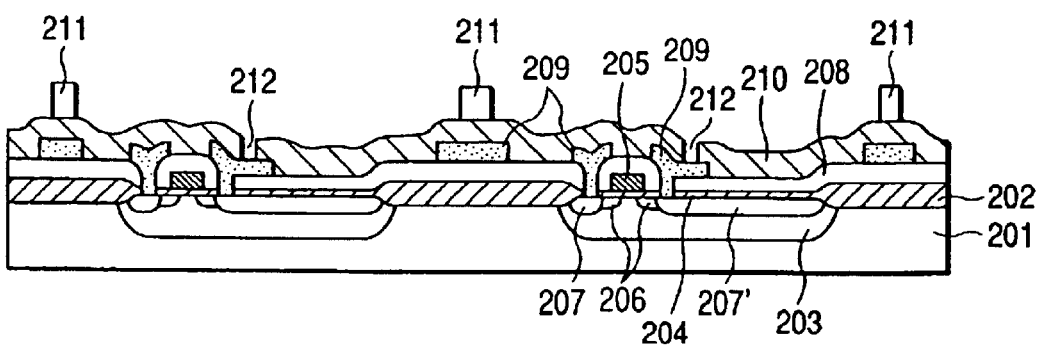
Figure 40F:
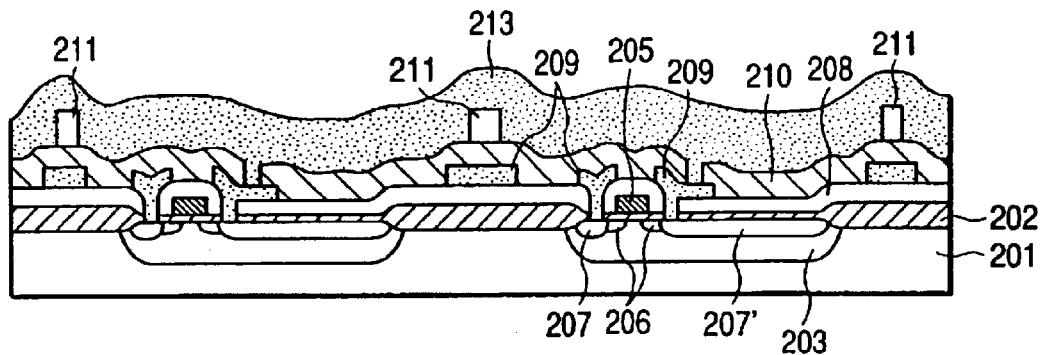
FIGS. 40F, 40G and 40H are sectional views of the production steps of the active matrix substrate and the liquid crystal element.
Figure 40G:
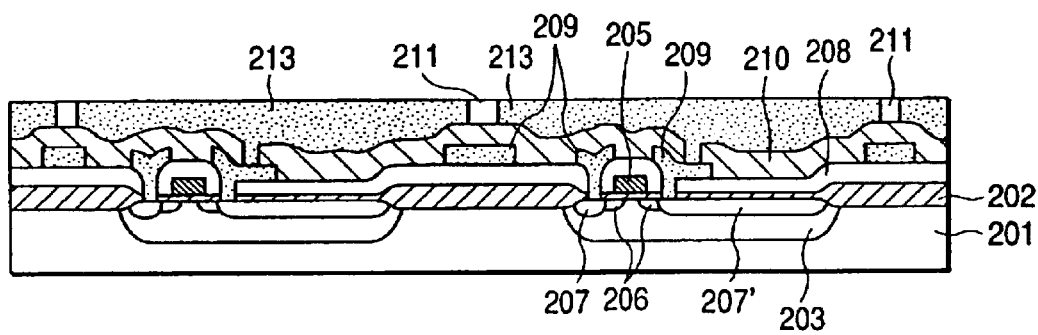
Figure 40H:
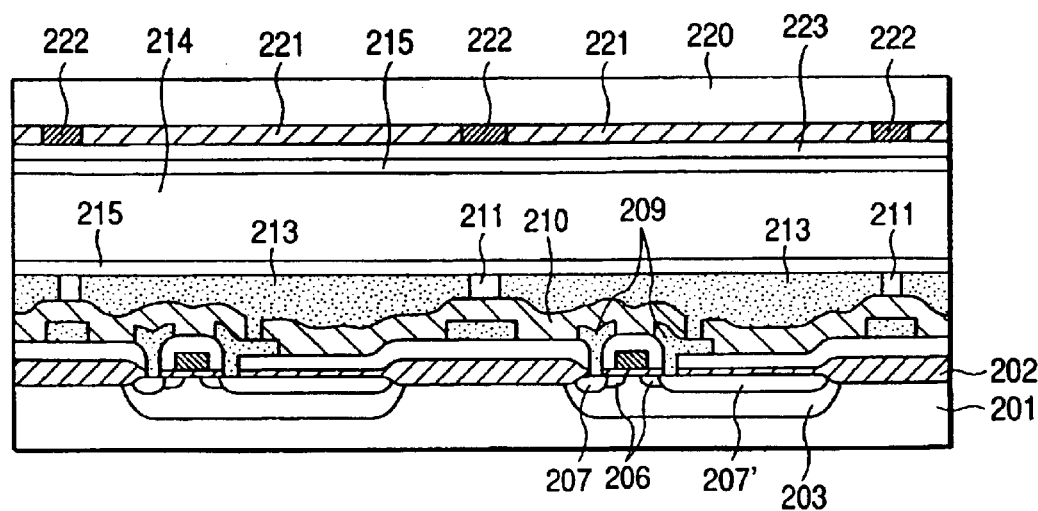
Figure 41:
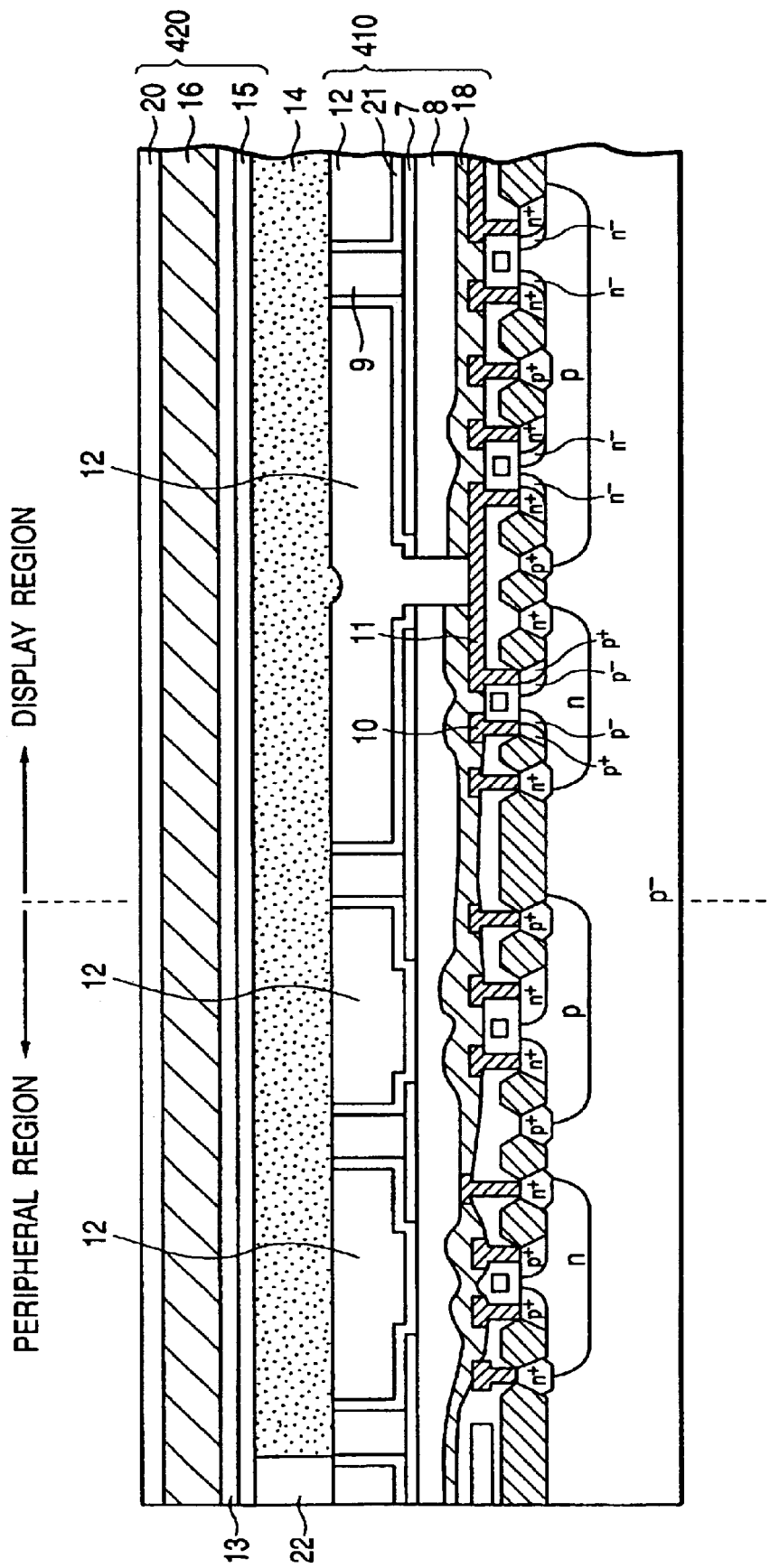
FIG. 41 is a sectional view of a liquid crystal panel according to conventional technology.
Figure 42:
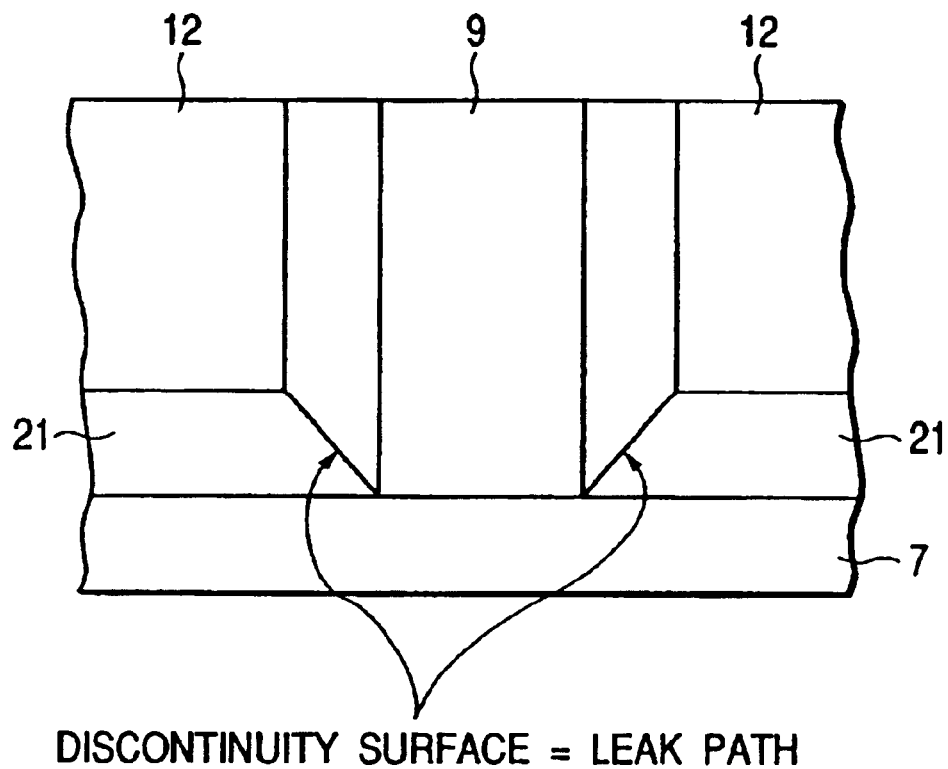
FIG. 42 is a sectional view of the liquid crystal panel according to conventional technology.

The steps of FIGS. 38H to 38J are the same as those of FIGS. 30H to 30J and are as described in Embodiment 7.

Thanks to the above techniques, the present embodiment can enjoy the both effects of Embodiment 7 and Embodiment 8 and implement stable formation of a capacitor.

It is noted that the liquid crystal display devices stated in Embodiment 5 and Embodiment 6 can also be constructed using the matrix substrates as described in Embodiment 7 to Embodiment 9.

As detailed above, the present invention improves the mechanical strength and the heat resistance at the base of the separation regions between the pixels of the liquid crystal display element and increases the reflectance. Therefore, the liquid crystal display device made increases the quantity of light to provide a brighter display image and increases the contrast as well. The present invention can enhance reliability while preventing the cause of alignment failure in the rubbing step of an alignment film in the packaging step and degradation of the quality of display image due to lowering of the contrast as a consequence of alignment failure. Further, the present invention enhances in-plane uniformity of liquid crystal and also improves gradation. Therefore, the liquid crystal display devices with high luminance, high contrast, and high definition can be produced in high yield, at low cost, and with high reliability.

Further, the present invention improves the dielectric withstand voltage of the capacitor film provided on the substrate, so as to decrease the capacitor leak, thereby decreasing the cost.

Further, the projection-type liquid crystal display device according to the present invention is so adapted that, using the reflective liquid crystal panel with microlenses and the optical system, etc. for irradiating the respective primary color beams in mutually different directions, the reflected beams after modulation by liquid crystal from a set of R, G and B pixels composing one picture element are outgoing through one microlens, whereby the projection display of an excellent color image with high quality can be achieved without RGB mosaic.

Since beams from each pixel are almost paralleled while passing twice through the microlens, a bright projected image can be obtained on the screen, even with a cheap projection lens having a small numerical aperture.

What is claimed is:

1. A matrix substrate having, on a substrate, a plurality of electroconductive members to constitute pixel electrodes arrayed in a matrix pattern, an electrically insulating member disposed between said electroconductive members to separate the pixel electrodes from each other, and an electroconductive film disposed through an electrically insulating film with respect to said electroconductive members to create a capacitor with each of said electroconductive members,
    wherein said electrically insulating member exists immediately over said electroconductive film and said electrically insulating member is formed in a round taper shape near a contact portion therewith.

2. The matrix substrate according to claim 1, wherein said electroconductive film functions as a shielding film.

3. A matrix substrate having, on a substrate, a plurality of electroconductive members to constitute pixel electrodes arrayed in a matrix pattern, an electrically insulating member disposed between said electroconductive members to separate the pixel electrodes from each other, and an electroconductive film disposed through a first electrically insulating film with respect to said electroconductive members to create a capacitor with each of said electroconductive members,
    wherein a second electrically insulating film is further disposed between said electrically insulating member and said electroconductive film and between said electrically insulating film and said electroconductive film, and
    wherein said electrically insulating member is formed in a round taper shape near a contact portion between the pixel electrodes.

4. A liquid crystal display device adapted so that a liquid crystal material is placed between a matrix substrate, said matrix substrate having, on a substrate, a plurality of electroconductive members to constitute pixel electrodes arrayed in a matrix pattern, an electrically insulating member disposed between said electroconductive members to separate said pixel electrodes from each other, and an electroconductive film disposed through an electrically insulating film with respect to said electroconductive members to create a capacitor with each of said electroconductive members, and an opposite substrate having an opposite electrode opposed to said pixel electrodes,
    wherein said electrically insulating member exists immediately over said electroconductive film and said electrically insulating member is formed in a round taper shape near a contact portion therewith.

5. The liquid crystal display device according to claim 4, wherein the liquid crystal display device comprises a plurality of microlenses.

6. The liquid crystal display device according to claim 5, wherein one of said microlenses is disposed in correspondence to two of said pixel electrodes.

7. A projection type liquid crystal display device comprising the liquid crystal display device according to claim 4.

8. The projection type liquid crystal display device according to claim 7, comprising at least three said liquid crystal devices for three colors, wherein a blue beam is separated by a highly reflective mirror and a blue reflecting dichroic mirror and beams of red and green are separated by a red reflecting dichroic mirror and a green/blue reflecting dichroic mirror, so that each beam irradiates the corresponding liquid crystal device.

9. A liquid crystal display device adapted so that a liquid crystal material is placed between a matrix substrate, said matrix substrate having, on a substrate, a plurality of electroconductive members to constitute pixel electrodes arrayed in a matrix pattern, an electrically insulating member disposed between said electroconductive members to separate the pixel electrodes from each other, and an electroconductive film disposed through a first electrically insulating film with respect to said electroconductive members to create a capacitor with each of said electroconductive members, and an opposite substrate having an opposite electrode opposed to said pixel electrodes,
    wherein a second electrically insulating film is further disposed between said electrically insulating member and said electroconductive film and between said electrically insulating film and said electroconductive film, and
    wherein said electrically insulating member is formed in a round taper shape near a contact portion between the pixel electrodes.

10. The liquid crystal display device according to claim 9, wherein the liquid crystal display device comprises a plurality of microlenses.

11. The liquid crystal display device according to claim 10, wherein one of said microlenses is disposed in correspondence to two of said pixel electrodes.

12. A projection type liquid crystal display device comprising the liquid crystal display device according to claim 9.

13. The projection type liquid crystal display device according to claim 12, comprising at least three said liquid crystal devices for three colors, wherein a blue beam is separated by a highly reflective mirror and a blue reflecting dichroic mirror and beams of red and green are separated by a red reflecting dichroic mirror and a green/blue reflecting dichroic mirror, so that each beam irradiates the corresponding liquid crystal device.

14. A matrix substrate having a plurality of electroconductive members to constitute pixel electrodes arrayed in a matrix pattern, an electrically insulating member disposed between the pixel electrodes to separate adjacent pixel electrodes from each other, and an electroconductive film disposed under said electroconductive member, wherein a first electrically insulating film is further disposed between said electrically insulating member and said electroconductive film and between said adjacent pixel electrodes and said electroconductive film, and a second electrically insulating film is further disposed to cover a side of said electrically insulating member and a top of said first electrically insulating film.

15. The matrix substrate according to claim 14, wherein said second electrically insulating film is formed in a second taper shape near a contact portion between said electrically insulating member and said first electrically insulating film.

16. A matrix substrate having a plurality of electroconductive members to constitute pixel electrodes arrayed in a matrix pattern, an electrically insulating member disposed between the pixel electrodes to separate adjacent pixel electrodes from each other, and a light shielding electroconductive film disposed under said electrically insulating member, wherein a first electrically insulating film is further disposed between said light shielding electroconductive film and said electrically insulating member and between said adjacent pixel electrodes and said electroconductive film, and a second electrically insulating film is further disposed to cover a side of said electrically insulating member and a top of said first electrically insulating film, and wherein said pixel electrode, said light shielding electroconductive film, and said first and second electrically insulating films constitute a capacitor.

17. The matrix substrate according to claim 16, wherein said second electrically insulating film is formed in a second taper shape near a contact portion between said electrically insulating member and said first electrically insulating film.

18. A liquid crystal display device comprising:
(i) a matrix substrate, said matrix substrate comprising:
(a) a plurality of electroconductive members constituting a plurality of pixel electrodes arrayed in a matrix pattern,
(b) an electrically insulating member disposed between the plurality of pixel electrodes to separate adjacent pixel electrodes from each other,
(c) an electroconductive film disposed under said electrically insulating member,
(d) a first electrically insulating film disposed between said electroconductive member and said electrically insulating member, and between said adjacent pixel electrodes and said electroconductive film, and
(e) a second electrically insulating film disposed to cover a side of said electrically insulating member and a top of said first electrically insulating film;
ii) a liquid crystal layer;
iii) an opposite electrode; and
iv) a microlens.

19. The liquid crystal display device according to claim 18, wherein said second electrically insulating film is formed in a second taper shape near a contact portion between said electrically insulating member and said first electrically insulating film.

20. a liquid crystal display device comprising:
i) a matrix substrate, said matrix substrate comprising:
(a) a plurality of electroconductive members constituting a plurality of pixel electrodes arrayed in a matrix pattern,
(b) an electrically insulating member disposed between said plurality of pixel electrodes to separate adjacent pixel electrodes from each other,
(c) a light shielding electroconductive film disposed under said electrically insulating member,
(d) a first electrically insulating film disposed between said light shielding electroconductive member and said electrically insulating member, and between said adjacent pixel electrodes and said electroconductive film, and
(e) a second electrically insulating film disposed to cover a side of said electrically insulating member and a top of said first electrically insulating film, wherein said pixel electrode, said light shielding electroconductive film and said first and second electrically insulating films constitute a capacitor;
ii) a liquid crystal layer;
iii) an opposite electrode; and
iv) a microlens.

21. The liquid crystal display device according to claim 20, wherein said second electrically insulating film is formed in a second taper shape near a contact portion between said electrically insulating member and said first electrically insulating film.

* * * * *

UNITED STATES PATENT AND TRADEMARK OFFICE
CERTIFICATE OF CORRECTION

PATENT NO. : 6,809,790 B2
DATED : October 26, 2004
INVENTOR(S) : Yamagishi et al.

It is certified that error appears in the above-identified patent and that said Letters Patent is hereby corrected as shown below:

Title page,
Item [30], Foreign Application Priority Data
"Oct. 24, 1997  (JP) …………..9/292468
Oct. 27, 1997   (JP) …………..9/294467" should read
-- Oct. 24, 1997 (JP) ………….. 9-292468
Oct. 27, 1997   (JP) ………….. 9-294467 --.

Column 5,
Line 58, "comers" should read -- corners --.

Column 11,
Line 43, "below-are" should read -- below are --.

Column 19,
Line 2, "bean" should read -- beam --.
Line 38, "mirror. 241." should read -- mirror 241. --.
Line 61, "BIG" should read -- B/G --.

Column 20,
Line 1, "BIG" should read -- B/G --.

Column 21,
Line 28, "electric:" should read -- electric --.
Line 62, "in," should read -- in --.

Column 22,
Line 8, "twocolor" should read -- two color --.
Line 15, "of:" should read -- of --.

Column 25,
Line 30, "˜layers" should read -- n⁻ layers --.

Column 26,
Line 36, "21 '" should read -- 21' --.
Line 41, "21 '" should read -- 21' --.

Column 28,
Line 28, "$Ta_{205}$" should read -- $Ta_2O_5$ --.
Line 32, "after," should read -- after --.

UNITED STATES PATENT AND TRADEMARK OFFICE
CERTIFICATE OF CORRECTION

PATENT NO.    : 6,809,790 B2
DATED         : October 26, 2004
INVENTOR(S)   : Yamagishi et al.

It is certified that error appears in the above-identified patent and that said Letters Patent is hereby corrected as shown below:

Column 29,
Line 14, "21 '" should read -- 21' --.

Column 34,
Line 26, "a liquid" should read -- A liquid --.

Signed and Sealed this

Thirteenth Day of September, 2005

JON W. DUDAS
*Director of the United States Patent and Trademark Office*